US012677111B2

(12) United States Patent
Paulin et al.

(10) Patent No.: US 12,677,111 B2
(45) Date of Patent: Jul. 7, 2026

(54) DISTRIBUTED DEVICE LOCATION FINDING

(71) Applicant: Apple Inc., Cupertino, CA (US)

(72) Inventors: Mads N. Paulin, Vejle (DK); Scott Lopatin, Santa Cruz, CA (US); Jonathan R. Schoenberg, Fishers, IN (US)

(73) Assignee: APPLE INC., Cupertino, CA (US)

( * ) Notice: Subject to any disclaimer, the term of this patent is extended or adjusted under 35 U.S.C. 154(b) by 374 days.

(21) Appl. No.: 18/346,600

(22) Filed: Jul. 3, 2023

(65) Prior Publication Data

US 2024/0129690 A1 Apr. 18, 2024

Related U.S. Application Data

(60) Provisional application No. 63/376,649, filed on Sep. 22, 2022.

(51) Int. Cl.
*H04W 4/02* (2018.01)
*H04W 4/029* (2018.01)

(52) U.S. Cl.
CPC ........... *H04W 4/023* (2013.01); *H04W 4/029* (2018.02)

(58) Field of Classification Search
CPC ....... H04W 4/023; H04W 4/029; H04W 4/33; H04W 12/069; H04W 12/50; H04W 12/63; H04Q 2209/40; H04Q 9/00
See application file for complete search history.

(56) References Cited

U.S. PATENT DOCUMENTS 4,918,425 A 4/1990 Greenberg et al.
5,659,617 A * 8/1997 Fischer ................. H04L 9/3297
380/258

(Continued)

FOREIGN PATENT DOCUMENTS

CN 101682508 3/2010
CN 102325324 A 1/2012

(Continued)

OTHER PUBLICATIONS

PCT/US2019/048899, "Notification of Transmittal of the International Search Report and the Written Opinion of the International Searching Authority, or The Declaration" mailed Dec. 2, 2019, 5 pgs.

(Continued)

*Primary Examiner* — Santiago Garcia
(74) *Attorney, Agent, or Firm* — Kilpatrick Townsend & Stockton LLP

(57) ABSTRACT

In an embodiment, an electronic device includes a communications radio, memory to store instructions, one or more processors to execute the instructions, where the instructions cause the one or more processors to receive a request for location information for a target accessory device associated with an owner electronic device, wherein the request includes a data packet with at least one public key, receive a beacon signal from a wireless device and determine at least one proximity value to the wireless device from the beacon signal, perform a comparison between a key from the received beacon signal for the wireless device and the at least one public key, and selectively send location information to the owner electronic device based on the comparison result, where the location information includes the at least one proximity value and information on a defined space within a location environment.

22 Claims, 26 Drawing Sheets

(56) References Cited

U.S. PATENT DOCUMENTS

| | | | |
|---|---|---|---|
| 5,910,776 | A | 6/1999 | Black |
| 6,292,660 | B1 | 9/2001 | Hartless et al. |
| 6,345,098 | B1 | 2/2002 | Matyas, Jr. et al. |
| 6,369,706 | B1 | 4/2002 | Anderson et al. |
| 6,754,349 | B1 | 6/2004 | Arthan |
| 6,993,350 | B2 | 1/2006 | Katoh |
| 7,039,427 | B2 | 5/2006 | Tachikawa |
| 7,059,182 | B1 | 6/2006 | Ragner |
| 7,224,987 | B1 | 5/2007 | Bhela et al. |
| 7,274,761 | B2 | 9/2007 | Muller et al. |
| 7,342,497 | B2 | 3/2008 | Chung et al. |
| 7,376,393 | B2 | 5/2008 | Ono et al. |
| 7,388,491 | B2 | 6/2008 | Chand et al. |
| 7,519,377 | B2 | 4/2009 | Tsukamoto |
| 7,558,529 | B2 | 7/2009 | Seshadri et al. |
| 7,657,248 | B2 | 2/2010 | Hodoshima |
| 8,213,389 | B2 | 7/2012 | Bush et al. |
| 8,224,355 | B2 | 7/2012 | Beydler et al. |
| 8,351,937 | B2 | 1/2013 | Lee |
| 8,457,617 | B2 | 6/2013 | Sweeney et al. |
| 8,499,337 | B1 | 7/2013 | Kenny |
| 8,538,401 | B2 | 9/2013 | Kim et al. |
| 8,583,915 | B1 | 11/2013 | Huang |
| 8,873,758 | B2 | 10/2014 | Bradley |
| 8,971,924 | B2 | 3/2015 | Pai et al. |
| 9,009,794 | B2 | 4/2015 | Dykeman et al. |
| 9,077,521 | B2 | 7/2015 | Machani |
| 9,104,896 | B2 | 8/2015 | Pai et al. |
| 9,277,353 | B2 | 3/2016 | Merriam |
| 9,277,386 | B1 | 3/2016 | Masiero et al. |
| 9,316,717 | B2 | 4/2016 | Gicklhorn et al. |
| 9,323,916 | B1 | 4/2016 | Wu et al. |
| 9,357,348 | B2 | 5/2016 | Evans et al. |
| 9,420,423 | B1 | 8/2016 | Mendelson |
| 9,426,749 | B2 | 8/2016 | Cordeiro et al. |
| 9,432,802 | B2 | 8/2016 | Matsushita et al. |
| 9,439,056 | B2 | 9/2016 | Chukka et al. |
| 9,443,366 | B2 | 9/2016 | Rayner |
| 9,456,298 | B2 | 9/2016 | Lee et al. |
| 9,462,109 | B1 | 10/2016 | Frazier Fields et al. |
| 9,516,620 | B1 | 12/2016 | Upp et al. |
| 9,520,045 | B2 | 12/2016 | Hawkins |
| 9,544,075 | B2 | 1/2017 | Altman et al. |
| 9,557,185 | B2 | 1/2017 | Kimes |
| 9,565,255 | B2 | 2/2017 | Kapoor et al. |
| 9,641,622 | B2 | 5/2017 | Kapoor et al. |
| 9,706,032 | B2 | 7/2017 | Pai et al. |
| 9,762,316 | B2 | 9/2017 | Kukuiski et al. |
| 9,769,601 | B2 | 9/2017 | Zelinka |
| 9,779,596 | B2 | 10/2017 | Ingrassia et al. |
| 9,781,106 | B1 | 10/2017 | Vitus et al. |
| 9,801,059 | B2 | 10/2017 | Ziv et al. |
| 9,820,093 | B2 | 11/2017 | Mayor et al. |
| 9,848,075 | B1 | 12/2017 | Ahmad et al. |
| 9,860,932 | B2 | 1/2018 | Kapoor et al. |
| 9,922,531 | B1 | 3/2018 | Doxey et al. |
| 9,961,507 | B1 | 5/2018 | Mendelson |
| 10,015,836 | B2 | 7/2018 | Kapoor et al. |
| 10,022,066 | B2 | 7/2018 | Tomiha |
| 10,022,086 | B1 | 7/2018 | Kahn et al. |
| 10,042,595 | B2 | 8/2018 | Behzadi et al. |
| 10,110,642 | B2 | 10/2018 | Numakami |
| 10,149,159 | B1 * | 12/2018 | Perfitt ................... H04L 9/3265 |
| 10,256,928 | B2 * | 4/2019 | Ko ....................... H04B 17/318 |
| 10,298,398 | B2 * | 5/2019 | Deshpande .......... H04W 12/02 |
| 10,366,692 | B1 | 7/2019 | Adams et al. |
| 10,368,378 | B2 | 7/2019 | Foster et al. |
| 10,410,485 | B2 | 9/2019 | Ingrassia et al. |
| 10,448,211 | B1 | 10/2019 | Shen et al. |
| 10,506,517 | B2 | 12/2019 | Dai Javad et al. |
| 10,600,310 | B2 | 3/2020 | Hawkins |
| 10,667,313 | B2 | 5/2020 | Maguire et al. |
| 10,701,203 | B2 | 6/2020 | Fiorini et al. |
| 10,771,898 | B2 | 9/2020 | Dusan et al. |
| 10,841,736 | B1 | 11/2020 | De La Broise |
| 10,855,483 | B1 | 12/2020 | Ramesh et al. |
| 10,862,684 | B2 | 12/2020 | Hong et al. |
| 10,956,975 | B1 | 3/2021 | Abdul Gaffar et al. |
| 10,970,989 | B1 | 4/2021 | Quibelan et al. |
| 10,992,755 | B1 | 4/2021 | Tran |
| 11,051,105 | B2 | 6/2021 | Dusan et al. |
| 11,088,830 | B2 | 8/2021 | Gu et al. |
| 11,107,088 | B2 | 8/2021 | Radocchia et al. |
| 11,202,168 | B2 | 12/2021 | Evans et al. |
| 11,265,716 | B2 | 3/2022 | Klinkner et al. |
| 11,282,351 | B2 | 3/2022 | Ingrassia, Jr. et al. |
| 11,288,562 | B2 | 3/2022 | Purba |
| 11,310,652 | B2 | 4/2022 | Norp et al. |
| 11,356,799 | B2 | 6/2022 | Haney |
| 11,595,784 | B2 | 2/2023 | Mohalik |
| 11,606,669 | B2 | 3/2023 | Lopatin et al. |
| 11,622,237 | B2 | 4/2023 | Diem |
| 11,641,563 | B2 | 5/2023 | Lopatin et al. |
| 11,716,603 | B2 | 8/2023 | Lee et al. |
| 11,743,715 | B2 * | 8/2023 | Luo ..................... H04W 12/04 |
| | | | 726/26 |
| 11,863,671 | B1 | 1/2024 | Sierra et al. |
| 11,889,302 | B2 | 1/2024 | Victa et al. |
| 11,941,930 | B2 * | 3/2024 | Chun ................... H04L 9/0866 |
| 2002/0144215 | A1 | 10/2002 | Hoskote et al. |
| 2003/0065918 | A1 | 4/2003 | Willey |
| 2003/0092437 | A1 | 5/2003 | Nowlin et al. |
| 2003/0182584 | A1 | 9/2003 | Banes et al. |
| 2004/0162027 | A1 | 8/2004 | Chang |
| 2004/0249817 | A1 | 12/2004 | Liu et al. |
| 2005/0021767 | A1 | 1/2005 | Cai |
| 2005/0154896 | A1 | 7/2005 | Widman et al. |
| 2005/0159134 | A1 * | 7/2005 | Suzuki .................. H04W 12/50 |
| | | | 455/410 |
| 2005/0190098 | A1 | 9/2005 | Bridgelall et al. |
| 2005/0285739 | A1 | 12/2005 | Velhal et al. |
| 2006/0039337 | A1 | 2/2006 | Hodoshima |
| 2006/0111835 | A1 | 5/2006 | Baker et al. |
| 2007/0139199 | A1 | 6/2007 | Hanlon |
| 2007/0249374 | A1 | 10/2007 | Hu et al. |
| 2007/0283151 | A1 | 12/2007 | Nakano et al. |
| 2007/0283395 | A1 | 12/2007 | Wezowski |
| 2008/0004798 | A1 | 1/2008 | Troxler et al. |
| 2008/0119953 | A1 | 5/2008 | Reed et al. |
| 2008/0120196 | A1 | 5/2008 | Reed et al. |
| 2009/0058670 | A1 | 3/2009 | Sweeney et al. |
| 2009/0150674 | A1 | 6/2009 | Richardson et al. |
| 2009/0315767 | A1 | 12/2009 | Scalisi et al. |
| 2009/0323972 | A1 | 12/2009 | Kohno et al. |
| 2009/0325599 | A1 | 12/2009 | Vuori |
| 2010/0079249 | A1 | 4/2010 | Pan |
| 2010/0159833 | A1 | 6/2010 | Lewis et al. |
| 2010/0184378 | A1 | 7/2010 | Wakefield |
| 2010/0245054 | A1 | 9/2010 | Kim |
| 2010/0289620 | A1 | 11/2010 | Aminger et al. |
| 2011/0124326 | A1 | 5/2011 | Kudo |
| 2011/0316692 | A1 * | 12/2011 | Aubert .................. G01S 5/0295 |
| | | | 340/539.1 |
| 2012/0054493 | A1 | 3/2012 | Bradley |
| 2012/0083209 | A1 | 4/2012 | Giles et al. |
| 2012/0100868 | A1 | 4/2012 | Kim et al. |
| 2012/0275361 | A1 | 11/2012 | Berenberg et al. |
| 2012/0310391 | A1 | 12/2012 | Sanders |
| 2012/0328061 | A1 | 12/2012 | Chow |
| 2013/0023238 | A1 | 1/2013 | Kaplan et al. |
| 2013/0034004 | A1 | 2/2013 | Mannemala et al. |
| 2013/0104035 | A1 | 4/2013 | Wagner et al. |
| 2013/0111555 | A1 | 5/2013 | Leneel |
| 2013/0171986 | A1 | 7/2013 | Shimizu |
| 2013/0271902 | A1 | 10/2013 | Lai et al. |
| 2013/0275873 | A1 | 10/2013 | Shaw et al. |
| 2013/0290191 | A1 | 10/2013 | Dischamp et al. |
| 2013/0290522 | A1 | 10/2013 | Behm, Jr. |
| 2013/0343542 | A1 | 12/2013 | Rosati et al. |
| 2014/0111307 | A1 | 4/2014 | Ingrassia et al. |
| 2014/0222685 | A1 | 8/2014 | Middleton et al. |
| 2014/0379584 | A1 | 12/2014 | Ward |
| 2015/0019124 | A1 | 1/2015 | Bandyopadhyay et al. |
| 2015/0072618 | A1 | 3/2015 | Granbery |

(56) References Cited

U.S. PATENT DOCUMENTS

| | | |
|---|---|---|
| 2015/0189596 A1 | 7/2015 | Stephens |
| 2015/0271676 A1* | 9/2015 | Shin ...................... H04W 12/06 |
| | | 713/168 |
| 2015/0277852 A1 | 10/2015 | Burgis |
| 2015/0289207 A1 | 10/2015 | Kubo et al. |
| 2015/0334569 A1 | 11/2015 | Rangarajan et al. |
| 2015/0350140 A1 | 12/2015 | Garcia et al. |
| 2015/0350820 A1 | 12/2015 | Son et al. |
| 2015/0356030 A1 | 12/2015 | Zahand et al. |
| 2015/0382140 A1 | 12/2015 | Cho et al. |
| 2016/0006577 A1 | 1/2016 | Logan |
| 2016/0037439 A1 | 2/2016 | Shamis et al. |
| 2016/0057572 A1 | 2/2016 | Bojorquez Alfaro et al. |
| 2016/0057625 A1 | 2/2016 | Andrada et al. |
| 2016/0069991 A1 | 3/2016 | Das et al. |
| 2016/0080591 A1 | 3/2016 | Asakura |
| 2016/0087959 A1 | 3/2016 | Park |
| 2016/0088143 A1 | 3/2016 | Cohn et al. |
| 2016/0094947 A1 | 3/2016 | Shen et al. |
| 2016/0140335 A1 | 5/2016 | Proulx et al. |
| 2016/0164973 A1 | 6/2016 | Kapoor et al. |
| 2016/0174023 A1 | 6/2016 | Cavallaro et al. |
| 2016/0180392 A1 | 6/2016 | Liu et al. |
| 2016/0189507 A1 | 6/2016 | Rayner |
| 2016/0205556 A1 | 7/2016 | Borghei |
| 2016/0212538 A1 | 7/2016 | Fullam et al. |
| 2016/0234213 A1 | 8/2016 | Kim et al. |
| 2016/0242192 A1 | 8/2016 | Llosa et al. |
| 2016/0248564 A1 | 8/2016 | Qi et al. |
| 2016/0302137 A1 | 10/2016 | Escott et al. |
| 2016/0330095 A1 | 11/2016 | Numakami |
| 2016/0344712 A1 | 11/2016 | Ding et al. |
| 2016/0352518 A1 | 12/2016 | Ford et al. |
| 2016/0357385 A1 | 12/2016 | Dan et al. |
| 2016/0360350 A1 | 12/2016 | Watson et al. |
| 2016/0371507 A1 | 12/2016 | Jakobsson |
| 2017/0006417 A1 | 1/2017 | Canoy et al. |
| 2017/0078408 A1 | 3/2017 | Lepp et al. |
| 2017/0126818 A1 | 5/2017 | Kang |
| 2017/0127340 A1 | 5/2017 | Dooey et al. |
| 2017/0134898 A1* | 5/2017 | Vega ...................... H04W 12/50 |
| 2017/0171181 A1 | 6/2017 | Britt |
| 2017/0228935 A1 | 8/2017 | Foster et al. |
| 2017/0272415 A1 | 9/2017 | Zhao et al. |
| 2017/0330031 A1 | 11/2017 | Wilson et al. |
| 2018/0013815 A1 | 1/2018 | Gold |
| 2018/0025595 A1 | 1/2018 | Ingrassia et al. |
| 2018/0035374 A1 | 2/2018 | Borden et al. |
| 2018/0091184 A1* | 3/2018 | Malarky ................. H04B 1/40 |
| 2018/0176748 A1 | 6/2018 | Kim et al. |
| 2018/0183591 A1 | 6/2018 | De Laat et al. |
| 2018/0183596 A1 | 6/2018 | Deshpande et al. |
| 2018/0184286 A1 | 6/2018 | Patterson |
| 2018/0199138 A1 | 7/2018 | Dusan et al. |
| 2018/0213585 A1* | 7/2018 | Moritomo ............ H04W 76/15 |
| 2018/0219872 A1 | 8/2018 | Sugashima et al. |
| 2018/0227284 A1 | 8/2018 | Sugano et al. |
| 2018/0262907 A1 | 9/2018 | Alanis et al. |
| 2018/0288208 A1 | 10/2018 | Lee et al. |
| 2018/0317266 A1 | 11/2018 | Britt et al. |
| 2018/0343561 A1 | 11/2018 | Patterson |
| 2018/0348718 A1 | 12/2018 | Richardson et al. |
| 2019/0028281 A1 | 1/2019 | Turissini et al. |
| 2019/0028445 A1 | 1/2019 | McLaughlin et al. |
| 2019/0034920 A1 | 1/2019 | Nolan et al. |
| 2019/0037469 A1 | 1/2019 | Krishnan et al. |
| 2019/0058966 A1 | 2/2019 | Puppala et al. |
| 2019/0069243 A1 | 2/2019 | Bean et al. |
| 2019/0116173 A1 | 4/2019 | Robison et al. |
| 2019/0124469 A1 | 4/2019 | Roy et al. |
| 2019/0191301 A1 | 6/2019 | Fang et al. |
| 2019/0213528 A1 | 7/2019 | Gupta et al. |
| 2019/0238243 A1* | 8/2019 | Ko ...................... H04B 17/318 |
| 2019/0242966 A1* | 8/2019 | Tyers ...................... G01S 1/06 |
| 2019/0246253 A1 | 8/2019 | Ryu et al. |
| 2019/0289059 A1 | 9/2019 | Vanahalli et al. |
| 2020/0034835 A1 | 1/2020 | Kim |
| 2020/0074822 A1 | 3/2020 | Ingrassia, Jr. et al. |
| 2020/0107164 A1* | 4/2020 | Lopatin ................. G01S 5/0295 |
| 2020/0145244 A1 | 5/2020 | Hollinger et al. |
| 2020/0177595 A1 | 6/2020 | Rakshit et al. |
| 2020/0187001 A1 | 6/2020 | Ard et al. |
| 2020/0226908 A1 | 7/2020 | Doxey et al. |
| 2020/0242662 A1 | 7/2020 | Middleton et al. |
| 2020/0344549 A1 | 10/2020 | Wegener |
| 2021/0044957 A1 | 2/2021 | Norp et al. |
| 2021/0136846 A1 | 5/2021 | Ponnusamy et al. |
| 2021/0203747 A1 | 7/2021 | Gorsica, IV et al. |
| 2021/0204115 A1 | 7/2021 | Gorsica, IV et al. |
| 2021/0250355 A1 | 8/2021 | Galdo et al. |
| 2021/0256833 A1 | 8/2021 | Daouta et al. |
| 2021/0334851 A1 | 10/2021 | Proctor, Jr. et al. |
| 2021/0400045 A1 | 12/2021 | Kondeti |
| 2021/0400793 A1* | 12/2021 | Baker ...................... H04W 4/06 |
| 2022/0021684 A1 | 1/2022 | Mensah et al. |
| 2022/0039054 A1* | 2/2022 | Balasubramanian ... H04L 67/12 |
| 2022/0052847 A1 | 2/2022 | Gonzalez Cervantes et al. |
| 2022/0070667 A1 | 3/2022 | Victa et al. |
| 2022/0078029 A1 | 3/2022 | Galdo et al. |
| 2022/0165139 A1 | 5/2022 | Ingrassia, Jr. et al. |
| 2022/0200789 A1 | 6/2022 | Lalande et al. |
| 2022/0224300 A1 | 7/2022 | Knode |
| 2022/0256633 A1 | 8/2022 | Gu et al. |
| 2022/0327196 A1 | 10/2022 | Trapani |
| 2022/0369022 A1 | 11/2022 | Jorgovanovic et al. |
| 2022/0386076 A1 | 12/2022 | Lopatin et al. |
| 2022/0394431 A1 | 12/2022 | Lopatin et al. |
| 2022/0394660 A1 | 12/2022 | Werner et al. |
| 2022/0397659 A1* | 12/2022 | Ha ...................... H04W 4/80 |

FOREIGN PATENT DOCUMENTS

| | | |
|---|---|---|
| CN | 104833945 | 8/2015 |
| CN | 106412816 | 2/2017 |
| CN | 106792501 A | 5/2017 |
| CN | 107328424 | 11/2017 |
| CN | 108223229 A | 6/2018 |
| CN | 108520552 | 9/2018 |
| CN | 109596118 | 4/2019 |
| CN | 111436040 | 7/2020 |
| CN | 112068512 | 12/2020 |
| CN | 114071357 | 2/2022 |
| EP | 1296155 | 3/2003 |
| EP | 2020784 | 2/2009 |
| GB | 2472192 A | 2/2011 |
| JP | H11262065 | 9/1999 |
| JP | 2007150904 | 6/2007 |
| JP | 2018191522 | 12/2018 |
| JP | 2021025798 | 2/2021 |
| KR | 20140044916 | 4/2014 |
| KR | 20170013833 | 2/2017 |
| KR | 20180086118 | 7/2018 |
| KR | 2019-0141998 A | 12/2019 |
| WO | 2010126846 | 11/2010 |
| WO | 2012030733 | 3/2012 |
| WO | 2013036488 | 3/2013 |
| WO | 2013163334 | 10/2013 |
| WO | 2014005004 | 3/2014 |
| WO | 2014042507 A1 | 3/2014 |
| WO | 2016032610 | 3/2016 |
| WO | 2016036453 A1 | 3/2016 |
| WO | 2017107077 | 6/2017 |
| WO | 2018001518 A1 | 1/2018 |
| WO | 2018118026 A1 | 6/2018 |
| WO | 2018135919 | 7/2018 |
| WO | 2018156555 | 8/2018 |
| WO | 2018160863 A1 | 9/2018 |
| WO | 2019232420 A2 | 12/2019 |
| WO | 2020214701 A1 | 10/2020 |
| WO | 2020214708 A1 | 10/2020 |
| WO | 2020214709 A1 | 10/2020 |
| WO | 2020214711 A1 | 10/2020 |

(56) References Cited

FOREIGN PATENT DOCUMENTS

| | | |
|---|---|---|
| WO | 2022046527 | 3/2022 |
| WO | 2022256438 | 12/2022 |

OTHER PUBLICATIONS

A. Korolova et al., "Cross-App Tracking Via Nearby Bluetooth Low Energy Devices", A presentation proposal for PrivacyCon 2017, Published Mar. 13, 2018, 12 pgs.

PCT/US2020/028318, "PCT Notification of Transmittal of the International Search Report and the Written Opinion of the International Searching Authority, or the Declaration", Mailed Jul. 8, 2020, 16 pages.

PCT/US2020/028326, "PCT Notification of Transmittal of the International Search Report and the Written Opinion of the International Searching Authority, or the Declaration", Mailed Jul. 3, 2020, 12 pages.

PCT/US2020/028327, "PCT Notification of Transmittal of the International Search Report and the Written Opinion of the International Searching Authority, or the Declaration", Mailed Sep. 14, 2020, 17 pages.

PCT/US2020/028329, "PCT Notification of Transmittal of the International Search Report and the Written Opinion of the International Searching Authority, or the Declaration", Mailed Jul. 15, 2020, 13 pages.

Mannan, Mohammad, et al. "Mercury: Recovering forgotten passwords using personal devices." International Conference on Financial Cryptography and Data Security. Springer, Berlin, Heidelberg, 2011 (Year: 2011).

FOFA, "Find One, Find All Key Finder & Remote Control Locators", received from The Wayback Machine—https://web.archive. org/web/20200715080402/http://www.findonefindall.com:80/index. htm, 3 pages.

Kim et al., "In/Out Status Monitoring in Mobile Asset Tracking with Wireless Sensor Networks", received from www.mdpi.com/journal/ sensors, published Mar. 26, 2010, 22 pages.

Fuemmeler et al., "Energy Efficient Multi-Object Tracking in Sensor Networks", received from https://ieeexplore.ieee.org/document/ 5439914, published Mar. 29, 2010, 9 pages.

Cocchi et al., "Subband Neural Networks Prediction for On-Line Audio Signal Recovery", received from https://ieeexplore.ieee.org/ document/1021887, Published Jul. 2002, 10 pages.

PCT/US2022/027681, "PCT Notification of transmittal of the International Search Report and the Written Opinion of the International Searching Authority, or the Declaration", mailed Jul. 28, 2022, 9 pages.

EP22172663.1, "Extended European Search Report" mailed Jan. 25, 2023, 18 pages.

Lopez, Mareo, "The Importance of a Speaker's Resonant Frequency", proaudioland.com, 3 pages, Aug. 2015 (Year: 2015).

Thetileapp.com [online], "Learn How Tile's Tracking Device Helps You Find Your Lost Things," Dec. 9, 2016, retrieved from URL <https://www.thetileapp.com/how-it-works>, 9 pages.

PCT/US2023/017975, "PCT Notification of Transmittal of the International Search Report and the Written Opinion of the International Searching Authority, or the Declaration", mailed Jun. 29, 2023, 12 pages.

International Preliminary Report on Patentability issued in PCT Application No. PCT/US2023/031897, dated Apr. 3, 2025 in 13 pages.

International Search Report and Written Opinion issued in PCT Application No. PCT/US2023/031897, dated Dec. 12, 2023 in 16 pages.

* cited by examiner

400 perform initial pairing with wireless accessory    402 generate public/private key pair and one or more
additional shared secrets    404 send public key to the wireless accessory    406 store public/private key pair to keystore    408 register the wireless accessory with a device
management server    410

900 receive a request to play content for a target accessory device associated with an owner electronic device    902 determine an occupancy value for a defined space    904 adjust playback of the content based on the occupancy value    906

1100 play audio upon request from a mobile device          1102 send a beacon signal, from a wireless device, with at least one public key          1104 perform a bi-directional ranging operation with a smart home device, where the smart home device is selected to communicate with the wireless device by the mobile device          1106 send content to the smart home device          1108

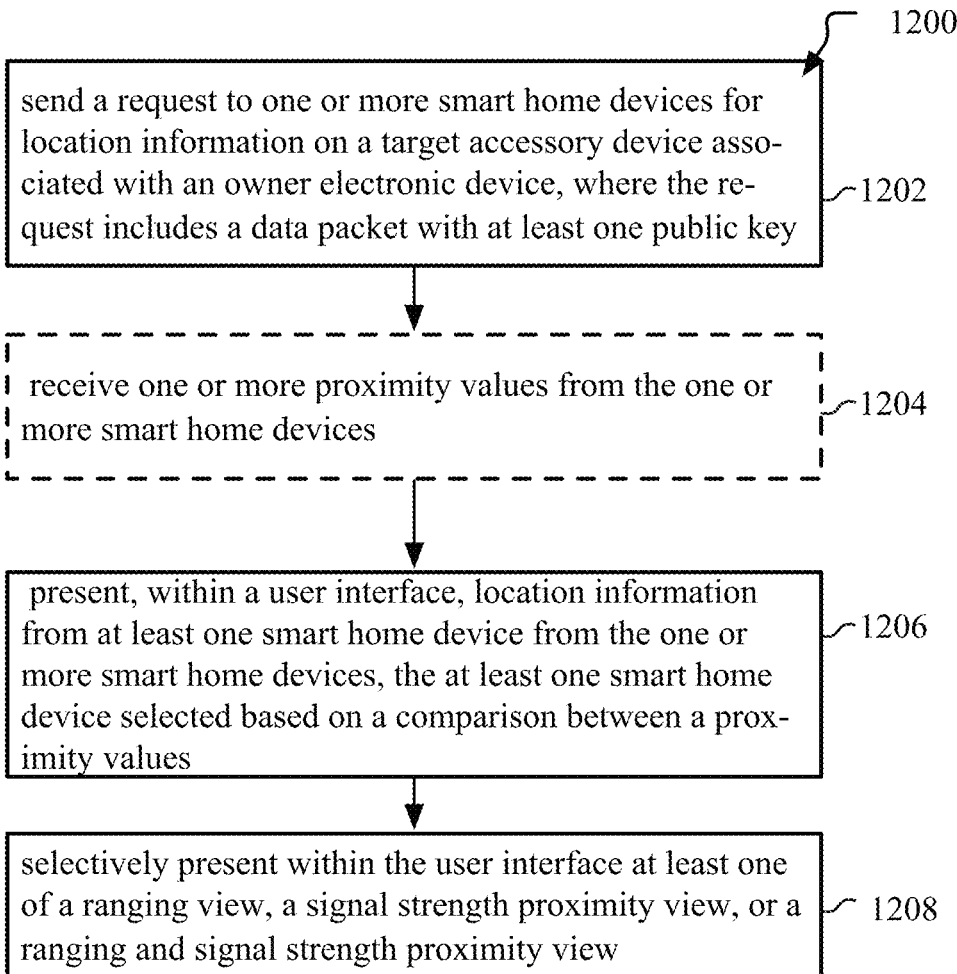

1200 send a request to one or more smart home devices for location information on a target accessory device associated with an owner electronic device, where the request includes a data packet with at least one public key

1202 receive one or more proximity values from the one or more smart home devices

1204 present, within a user interface, location information from at least one smart home device from the one or more smart home devices, the at least one smart home device selected based on a comparison between a proximity values

1206 selectively present within the user interface at least one of a ranging view, a signal strength proximity view, or a ranging and signal strength proximity view

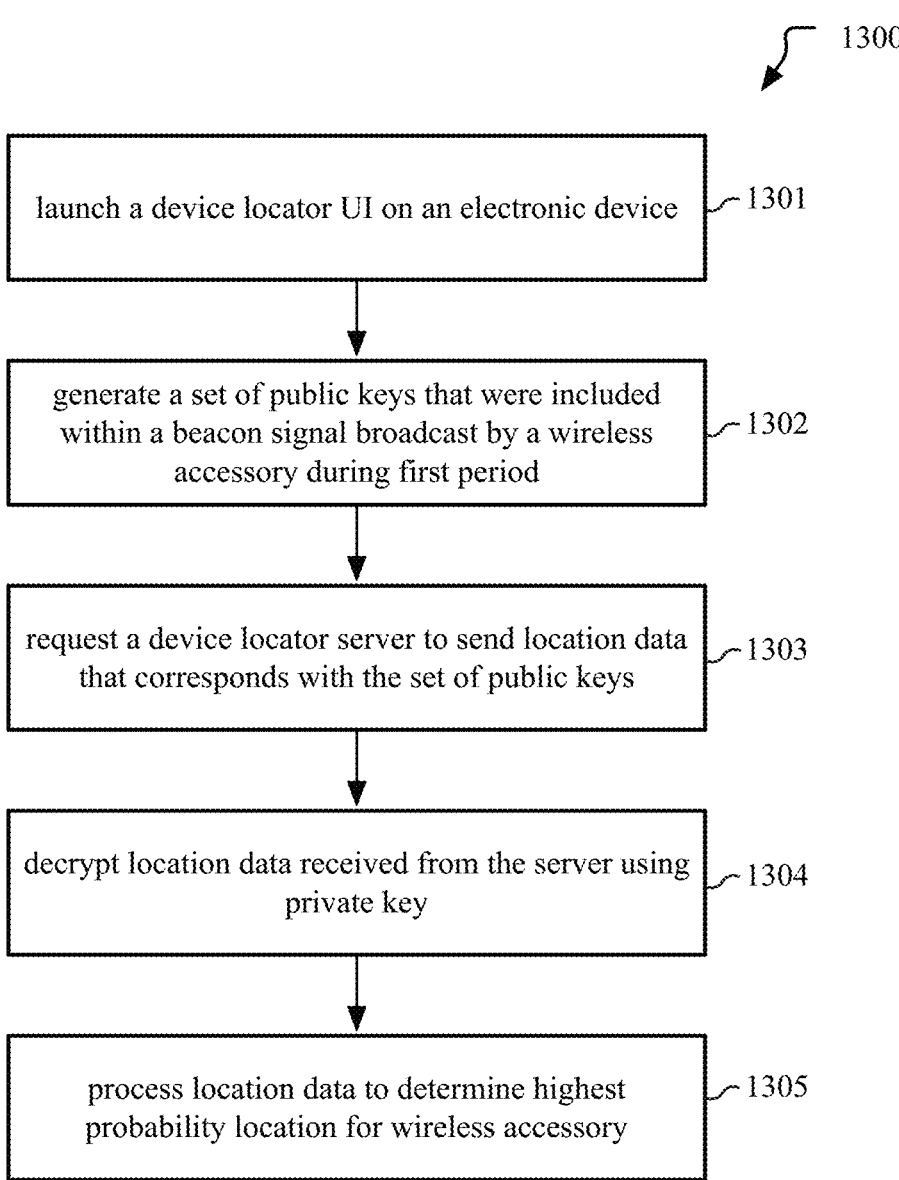

1300 launch a device locator UI on an electronic device — 1301 generate a set of public keys that were included within a beacon signal broadcast by a wireless accessory during first period — 1302 request a device locator server to send location data that corresponds with the set of public keys — 1303 decrypt location data received from the server using private key — 1304 process location data to determine highest probability location for wireless accessory — 1305

*FIG. 13*

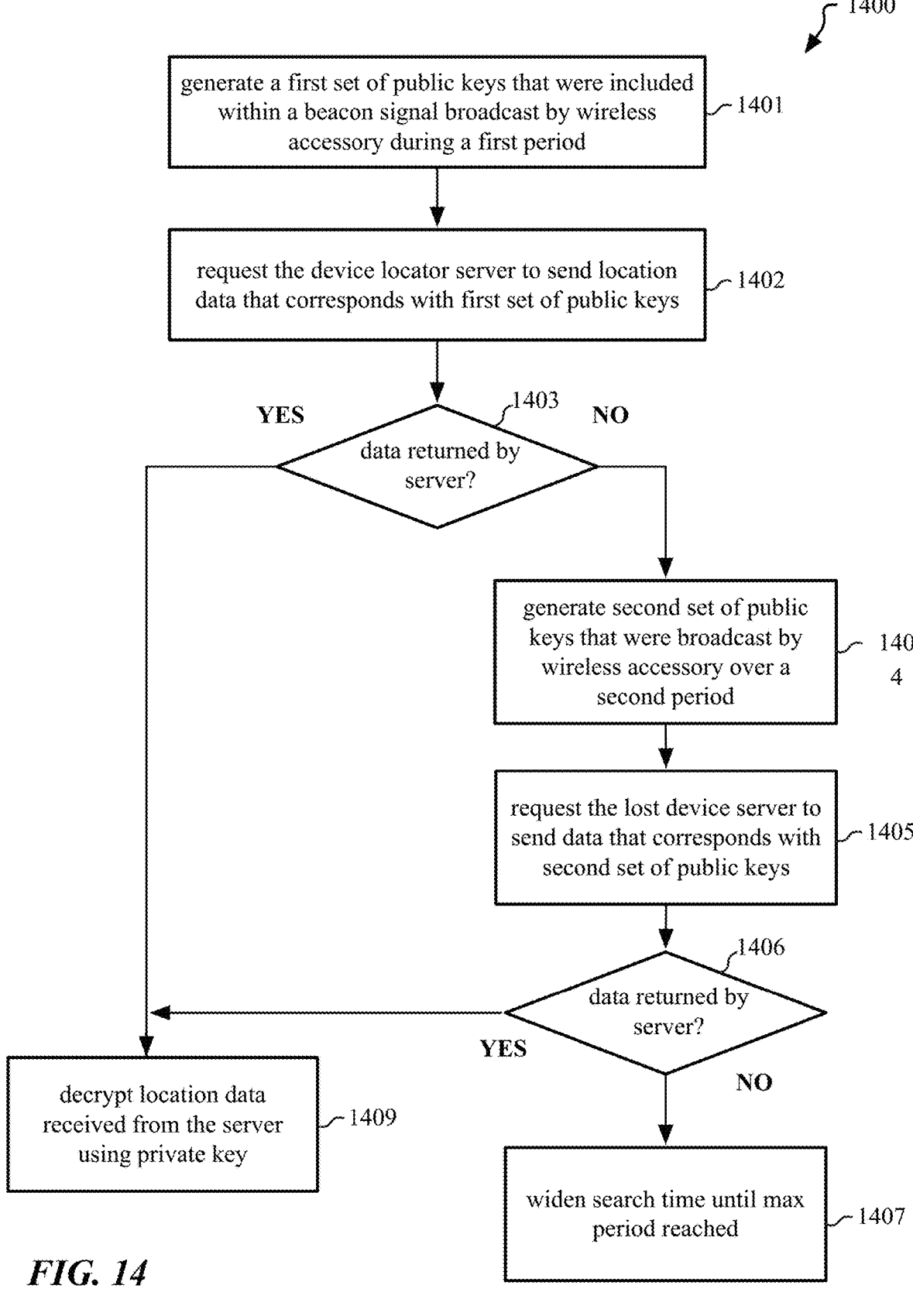

1400 generate a first set of public keys that were included within a beacon signal broadcast by wireless accessory during a first period — 1401 request the device locator server to send location data that corresponds with first set of public keys — 1402

YES ← data returned by server? → NO — 1403 generate second set of public keys that were broadcast by wireless accessory over a second period — 1404 request the lost device server to send data that corresponds with second set of public keys — 1405 data returned by server? — 1406

YES

NO decrypt location data received from the server using private key — 1409 widen search time until max period reached — 1407

*FIG. 14*

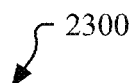
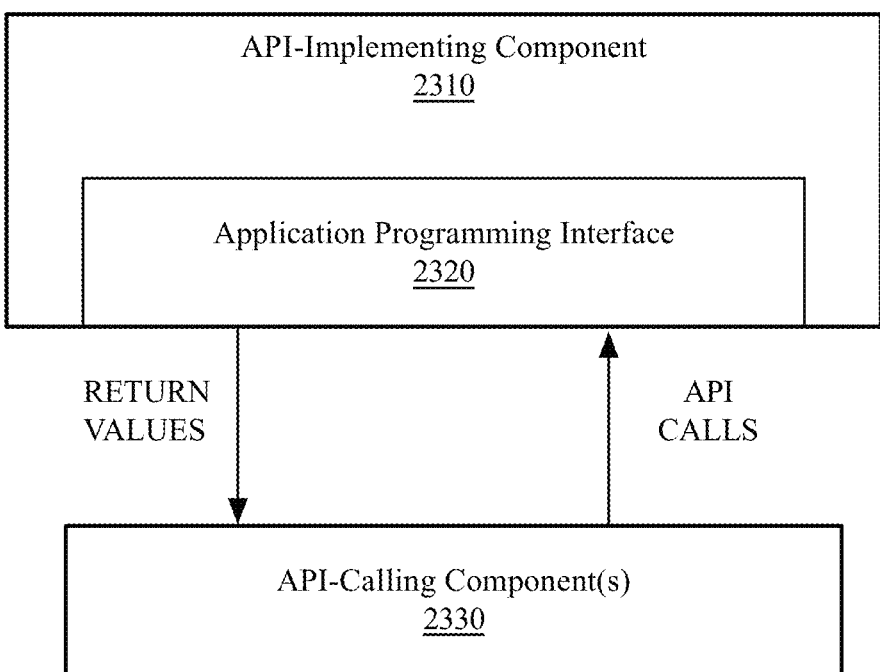
*Fig. 23*

DISTRIBUTED DEVICE LOCATION FINDING

RELATED APPLICATIONS

This application claims the benefit of priority of U.S. Provisional Application No. 63/376,649, entitled "Distributed Device Location Finding," filed Sep. 22, 2022, which is herein incorporated by reference.

FIELD

Embodiments described herein relate to locating devices using device locator services.

BACKGROUND INFORMATION

Previous device locator services do not provide meaningful assistance in locating a device when a connection between the devices has not been established. In particular, before a wireless connection can be established between devices a user is left wandering around a location walking room to room trying to establish the wireless connection to locate a target device. As such, there is a need to provide improved locator services.

SUMMARY

Various embodiments of a machine learning systems will be described herein. Other features and advantages will be apparent from the accompanying drawings and from the detailed description. In an embodiment, an electronic device includes a communications radio, memory to store instructions, one or more processors to execute the instructions, where the instructions cause the one or more processors to receive a request for location information for a target accessory device associated with an owner electronic device and the request includes a data packet with at least one public key, receive a beacon signal from a wireless device and determine at least one proximity value to the wireless device from the beacon signal, perform a comparison between a key from the received beacon signal for the wireless device and the at least one public key, and selectively send location information to the owner electronic device based on the comparison result, where the location information includes the at least one proximity value and information on a defined space within a location environment.

In one or more embodiments, the one or more processors to execute the instructions of the electronic device, where the instructions further cause the one or more processors to determine that the received beacon signal does not contain the at least one public key, and send location information indicating that the electronic device is not in wireless communication range to the target electronic device. In one or more embodiments, the one or more processors to execute the instructions of the electronic device, and the instructions further cause the one or more processors to receive, from the owner electronic device, an indication that the at least one proximity value for the electronic device is a highest value as compared to at least one other proximity value from a set of electronic devices. In one or more embodiments, the one or more processors to execute the instructions of the electronic device, where the instructions further cause the one or more processors to establish a wireless radio connection with the target accessory device. In one or more embodiments, a wireless controller of the electronic device includes a ranging sensor and the one or more processors of a device execute the instructions, the instructions further cause the one or more processors to determine a range and a direction to the target accessory device via the ranging sensor of the wireless controller during a bi-directional ranging operation, determine a target position estimate for the target accessory device relative to the electronic device based on the range and direction to the target accessory device, and send, to the owner electronic device, at least one of the target position estimate for the target accessory device, a defined space identifier for the electronic device, or an indicator for the direction to the target accessory device. In one or more embodiments, the one or more processors to execute the instructions of the electronic device, where the instructions further cause the one or more processors to receive a request from the target accessory device including at least one of a request to play audio, a request to send a target position of the target accessory device to the owner electronic device, or a request to send location information for the electronic device to the owner electronic device. In one or more embodiments, the one or more processors to execute the instructions of the electronic device, where the instructions further cause the one or more processors to send a request, to the target accessory device, to increase a beaconing rate. In one or more embodiments, the one or more processors to execute the instructions of the electronic device, where the instructions further cause the one or more processors to, wherein the one our more wireless ranging operations include a ranging operation performed via an ultra-wideband radio. In one or more embodiments, the one or more processors to execute the instructions of the electronic device, where the instructions further cause the one or more processors to present the signal strength proximity view and the ranging view includes presenting at least one indicator of the proximity value to the target wireless device from the electronic device and the indicator for the direction to the target wireless device along the trajectory in the user interface. In one or more embodiments, the electronic device is a voice activated virtual assistant. In one or more embodiments, the proximity value is a signal strength measurement value. In one or more embodiments, the one or more processors to execute the instructions of the electronic device, where the instructions further cause the one or more processors to detect whether an occupant is proximate to the defined space for the electronic device and adjust playback of content requested by the owner electronic device.

In an embodiment, a method performed by one or more processors of an electronic device to send a beacon signal, from a wireless device, with at least one public key, performing a bi-directional ranging operation with a smart home device, where the smart home device is selected to communicate with the wireless device by an owner electronic device. In one or more embodiments, the method further provides sending, the smart home device, audio content for playback. In one or more embodiments, the method further provides ceasing bi-directional ranging operation with the smart home device, and performing a bi-directional ranging operation with the owner electronic device.

In an embodiment, a method performed by one or more processors of an electronic device to send a request, to one or more smart home devices, for location information on a target accessory device associated with an owner electronic device, where the request includes a data packet with at least one public key, receive one or more proximity values from the one or more smart home devices, and present, via a user interface, location information form at least one smart home device from the one or more smart home devices, the at least one smart home device selected based on a comparison between a proximity values. In one or more embodiments, the method further provides selectively presenting within the user interface at least one of a ranging view, a signal strength proximity view, or a ranging and signal strength proximity view, where presenting the ranging view includes determining a range and a direction to a target accessory device via a ranging sensor of a wireless controller during a bi-directional ranging operation, determining a target position estimate for the target accessory device relative to the owner electronic device based on the range and direction to the target accessory device, and presenting the ranging view comprises displaying at least one of the target position estimate for the target accessory device and an indicator for the direction to the target accessory device.

In an embodiment, an electronic device includes a communications radio, a communications radio, a speaker, memory to store instructions, and one or more processors to execute the instructions, wherein the instructions cause the one or more processors to receive a request for location information for a target accessory device associated with an owner electronic device, where the request includes a data packet with at least one public key, receive a beacon signal from a wireless device and determine at least one signal strength value from the beacon signal, determine that the received beacon signal for the wireless device contains the at least one public key, estimate at least one proximity value to the target accessory device based on the at least one signal strength value, send the at least one proximity value to the owner electronic device, receive a request, from the owner electronic device, to play content for the target accessory device, where the owner device selects the electronic device to play content based on the proximity value, and adjust playback of the content based on an occupancy value for a defined space, the electronic device designated as located proximate to the defined space.

In one or more embodiments, the electronic device further provides adjusting playback includes reducing volume of content based on the occupancy value. In one or more embodiments, the electronic device further provides adjusting playback includes receiving a wireless communication from the owner electronic device and detect an increase in the occupancy value for the defined space, and increasing volume for the playback of the content. In one or more embodiments, the electronic device further provides adjusting playback includes to detect an increase in the occupancy value for the defined space based on at least one of received audio or sensor data, and decrease volume for the playback of the content. In one or more embodiments, the electronic device further provides adjusting playback includes the instructions cause the one or more processors to receive an indication from another smart home device that the owner electronic device is proximate to the defined space for the electronic device, and increasing volume for the playback of the content.

In the description and figures, numerous specific details are described to provide a thorough understanding of various embodiments. However, in certain instances, well-known or conventional details are not described to provide a concise discussion of embodiments. Additionally, reference herein to "one embodiment" or "an embodiment" or "some embodiments" means that a particular feature, structure, or characteristic described in conjunction with the embodiment can be included in at least one embodiment. The appearances of the phrase "embodiment" in various places in the specification do not necessarily all refer to the same embodiment. It should be noted that there could be variations to the flow diagrams or the operations described therein without departing from the embodiments described herein. For instance, operations can be performed in parallel, simultaneously, or in a different order than illustrated.

BRIEF DESCRIPTION OF THE DRAWINGS

FIG. 12 illustrates a flowchart for a method to enable location services for a target accessory device, according to an embodiment.
FIG. 13-15 illustrate flowchart for a method that can be performed by a finder device, according to embodiments.
FIG. 23 is a block diagram illustrating an exemplary API architecture, which may be used in some embodiments.

DETAILED DESCRIPTION

Figure 1:
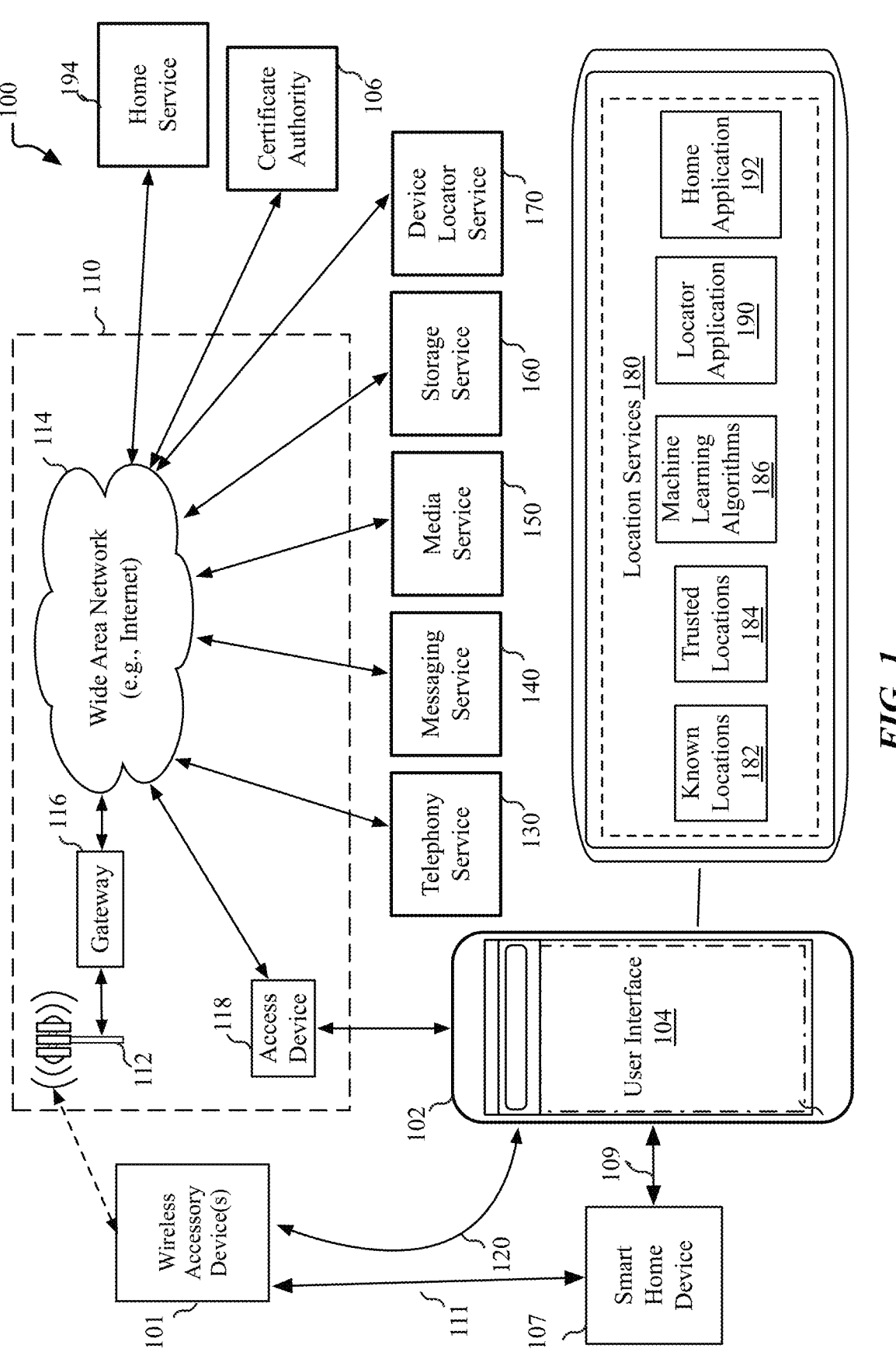
FIG. 1 is a block diagram of a network operating environment for electronic devices, according to an embodiment.

Embodiments described herein generally provide techniques for presenting information on a mobile device to guide and/or providing information from smart home devices located in a location environment to assist a user actively engaged in locating a target device. The mobile device may use various data sources and/or signals to provide information to assist in locating the target device, including signals received from the target device itself, finder devices, and/or one or more smart home devices. The accessibility of the types of signals and audible sounds provided by the target device and the smart home devices may vary as the mobile device is being moved around within a location environment of the target device. In some embodiments, the location environment may consist of a plurality of defined spaces (e.g., rooms, etc.) that are designated with an identifier in order to communicate an area within the location environment that the target device and/or smart home device(s) are located. Embodiments may leverage one or more smart home devices in defined spaces accessible over a network as a distributed set of search agents in order to locate the target device within the location environment and provide the mobile device with location information for the target device acquired by the smart home devices. In some embodiments, the smart home device(s) may play content or amplify audible sounds provided by the target device to aid the user actively engaged in locating the target device.

The one or more smart home devices may communicate with other smart home devices and the mobile device to enable locating of the target device. In particular, the smart home devices may provide information on both the smart home device defined space location within the location environment and the smart home device proximity to the target device. In some embodiments, the smart home device may be requested to play content (e.g., audio, visual, and/or any combination thereof) to assist the mobile device user that is moving around the location environment trying to locate the target device, when the mobile device is not within range to form a wireless connection with the target device and/or receive beacon signals from the target device. For example, the smart home device may amplify a sound that the target device itself is playing or requested to play in order to help the mobile device user to locate the room that is closest to the target device. Various user interface views may be presented within the user interface of the mobile device to represent the information from the one or more smart home devices and/or target device when data sources and/or signals are accessible to provide location information to the mobile device.

In some embodiments, occupancy detection in the defined space (e.g., a room) of the location environment may be used to determine and/or adjust the provision of location services (e.g., playback of content) for locating the target device. Any combination of sensors and/or signals from devices in the location environment may allow for determining if the defined space is occupied. Occupancy detection in the defined space may include the use of signals, user routines, microphones, machine learning, and/or sensors to determine if there is an occupant within a defined space of the location environment. In an embodiment, if the defined space is occupied, then the playback of content may be adjusted, such as with a reduction of volume and/or modification of flashing lights on the smart home device. In another embodiment, the volume of the content played by the smart home device may reduce or increase as the mobile device user moves toward occupying the defined space depending on the implementation.

FIG. 1 is a block diagram of a network operating environment 100 for electronic devices, according to an embodiment. The network operating environment 100 includes multiple electronic devices, such as accessory device(s) 101, a smart home device 107, and a mobile device 102. Accessory device(s) 101 may be paired to mobile device 102. In an embodiment, mobile accessory device 101 may be a set of accessory devices that may be paired to the mobile device 102 and the set of accessory devices may form a device group. Optionally, the device group with accessory devices 101 may be a case with a wired connection to the accessory devices 101 stored within. The case itself may also be an accessory device 101 that may be paired with mobile device 102 in some embodiments. By way of example, accessory device 101 may be collectively sets of devices, such as Apple AirPods® or EarPods®. In another embodiment, the accessory device may itself be a tracking device, such as an Apple AirTag®. In some embodiments, accessory device 101 may not be able to communicate over a wide area network. In other embodiments, devices 101, 102, and 107 can each be an electronic device capable of communicating over a wireless network. Some example mobile electronic devices include but are not limited to the following: a smartphone, a tablet computer, a notebook computer, a wearable computer (e.g., smartwatch or other wearable computing accessory), a mobile media player, a personal digital assistant, AirPods®, EarPods®, AirTag®, locator tags, headphones, head mounted display, health equipment, a speaker, and other similar devices.

Smart home device 107 may be a device associated with a defined space within a location environment. The smart home device 107 may be fixed (e.g., a home appliance, such as a thermostat) to a defined space by way of installation or placement in a defined space (e.g., a room in a home) in some embodiments. Alternatively, the smart home device 107 may be a mobile device that is associated with a defined space by being placed in the defined space and/or registered as being associated with the defined space. Some example smart home devices include, but are not limited to, the following: a smart speaker device, a streaming device, a television, a refrigerator, a thermostat, a dishwasher, a security system, an internet access point or device, a Wi-Fi and/or mesh router, a desktop computer, an air purifier, a light switch, a home hub device, a baby monitor, furniture, an entry system device, a smart lock, a light bulb, a sprinkler system, a health monitor, and/or any other electronic device that may be associated with the defined space.

In some embodiments, the smart home device 107 may be associated with the defined space by storing the defined space identifier in association with the smart home device 107 with a home application 192 and/or a home service 194. By way of example, the home application 192 and/or home service 194 may store the defined space (e.g., hallway, back patio, office, bedroom, front yard, etc.) information (e.g., user defined identifier) within the location environment for the smart home device 107 in a database (e.g., relational database, object-oriented database, file system, etc.). An owner or an administrator for the smart home device 107 may register the smart home device 107 with the home application 192 and/or home service 194 by storing the location information which includes a user defined identifier, in some embodiments. A mobile device 102 may be used to discover the smart home device 107 and provide the ability to register (e.g., by storing smart home device information, etc.) the smart home device 107 with the home application and/or home service 194, in some embodiments. The discovery process may include the use of mobile device 102 to register the smart home device 107 in a defined space where the smart hone device is detected by the mobile device 102. Discovery by the mobile device 102, may include, but is not limited to the following: forming a wireless connection with the smart home device 107, receiving beacon data from the smart home device 107 (e.g., to form a connection, an advertisement, etc.), capturing a representation for the smart home device 107 (e.g., QR code) with the mobile device 102 using a sensor, and/or any other signal that may be used to communicate information for the smart home device 107. Upon discovery, mobile device 102 may facilitate registration of the smart home device 107 in a defined space within the location environment as determined by the mobile device 102. For example, the mobile device 102 may discover the smart home device 107 during a set up process for the smart home device 107. During the discovery and/or set up process, the mobile device 102 may determine the defined space for the smart home device 107 by querying the user via a user interface of the mobile device 102 (e.g., a home application, a smart home device application, etc.) and/or the smart home device 107 to enter location information for the defined space. Each of electronic devices 101, 107, and 102 optionally can include a user interface, such as user interface 104 of mobile device 102. In other embodiments, electronic device 101, as an accessory device, and/or smart home device 107 may not have a user interface.

Electronic devices 101, 102, and 107 may be a third-party device that utilizes an application programming interface to access device locator services. The third-party device may be provided by a different device manufacturer or be part of a different ecosystem (e.g., operating system) from electronic devices 101, 102, and/or 107. Electronic devices 101, 102 and 107 can communicate over one or more wired and/or wireless networks 110 to perform data communication. For example, a wireless network 112 (e.g., cellular network, Wi-Fi network) can communicate with a wide area network 114, such as the Internet, by use of a gateway 116. Likewise, an access device 118, such as a mobile hotspot wireless access device, can provide communication access to the wide area network 114. The gateway 116 and access device 118 can then communicate with the wide area network 114 over a combination of wired and/or wireless networks.

In some implementations, both voice and data communications can be established over the wireless network 112 and/or the access device 118. For example, mobile device 102 can place and receive phone calls (e.g., using VoIP protocols), send and receive e-mail messages (e.g., using POP3 protocol), and retrieve electronic documents and/or streams, such as web pages, photographs, and videos, over the wireless network 112, gateway 116, and wide area network 114 (e.g., using TCP/IP or UDP protocols). In some implementations, mobile device 102 can place and receive phone calls, send and receive e-mail messages, and retrieve electronic documents over the access device 118 and the wide area network 114. In some implementations, mobile device 101 and/or mobile device 102 can be physically connected to the access device 118 using one or more cables, for example, where the access device 118 is a personal computer. In this configuration, mobile device 101 or mobile device 102 can be referred to as a "tethered" device. In one embodiment, mobile device 101 can communicate with mobile device 102 and/or smart home device 107 via a wireless peer-to-peer connection 120. The wireless peer-to-peer connection 120 can be used to synchronize data between the devices.

Electronic devices 101, 102 and 107 can communicate with one or more services, such as a telephony service 130, a messaging service 140, a media service 150, a storage service 160, a device locator service 170, certificate authority 106, and home service 194 over the one or more wired and/or wireless networks 110. For example, the telephony service 130 can enable telephonic communication between mobile devices or between a mobile device and a wired telephonic device. The telephony service 130 can route voice over IP (VoIP) calls over the wide area network 114 or can access a cellular voice network (e.g., wireless network 112). The messaging service 140 can, for example, provide e-mail and/or other messaging services. The media service 150 can, for example, provide access to media files, such as song files, audio books, movie files, video clips, and other media data. The storage service 160 can provide network storage capabilities to mobile device 101 and mobile device 102 to store documents and media files. The device locator service 170 can enable a user to locate a lost or misplaced device that was, at least at some point, connected to the one or more wired and/or wireless networks 110. The home service 194 can enable a user to manage smart home devices 107 with the user of a home application 192. Other services can also be provided, including a software update service to update operating system software or client software on the mobile devices. In one embodiment, the messaging service 140, media service 150, storage service 160, the home service 194, and device locator service 170 can each be associated with a cloud service provider, where the various services are facilitated via a cloud services account associated with the electronic devices 101, 102, and 107.

In some embodiments, accessory device 101 and/or device group 101, smart home device 107, and mobile device 102 may be registered with a certificate authority 106. In some embodiments, the certificate authority 106 is an entity that issues digital certificates, and the service may be implemented using a set of servers managed by a device manufacturer, service provider, or a registration service. The certificate provided by the certificate authority 106 may attest to the validity of received verifiable information about the device, such as a particular manufacturer for the device, a serial number, an identifier for a device group or other identifier, an indicator that device is part of a device group, and/or any other verifiable information. In some embodiments, a device manufacturer may establish the device group by grouping serial numbers of accessory devices in the device group. In further embodiments, the certificate can be encrypted by the device 101, 107, and/or 102 prior to being sent to a third party and may be decrypted at an attestation service (e.g., certificate authority or another attestation service) when the third-party requests verification of information provided by accessory device 101, mobile device 102, smart home device 107, and/or devices within device group. In some embodiments, a secure token may be provided in requests to pair by an accessory device 101. Additional examples of paired devices using location services may be found in U.S. patent application Ser. No. 17/219,595, filed Mar. 21, 2021, entitled "Secure Pairing and Pairing Lock for Accessory Devices," which is incorporated by reference herein in its entirety.

Electronic devices 101, 102, and smart home device 107 may have applications, services, and functionality locally accessible on the devices including location services 180. In particular, mobile devices 101, 107, and/or 102 may have a device locator application (e.g., a "Find my" application) 190 to utilize device locator services 170 and location services 180. Locally accessible data may be stored on known locations 182 and safe or trusted locations 184. In some instances, machine learning algorithms 186 may be used to identify user routines, known locations 182, and/or trusted locations 184. Although cluster analysis is provided as an example of machine learning algorithms that may be used, those with skill in the art will recognize that other algorithms may be used to identify potential known or trusted locations. By way of example, cluster data analysis may be used to identify and classify and provide semantic labels for locations or defined spaces, such as locations frequented by a user. Safe or trusted locations 184 may be designated explicitly or confirmed as such by a user of the mobile device 102 after data analysis. Additionally, user routines may be defined explicitly by a user of the mobile device 102. In other instances, the known locations 182, the trusted locations 184, and user routines may be classified offline and provided by device locator service 170, a home application or service, or a third-party (e.g., a database with map information, a home hub device, etc.).

On-device heuristics and/or machine learning models may be used to infer relationships between a user and locations (e.g., including defined spaces) based on analysis of the locally stored data on frequented locations including frequently visited locations by the user, known locations, routines, and/or any other locations. For example, a frequently visited location such as a home, a vehicle, a workplace, any location frequented by a user with mobile device (e.g., accessory devices, 101 and mobile device 102) and/or any other location designated as a trusted location 184 by the user. Known locations 182 may be business locations, public spaces, parks, museums, front yard, back yard, and/or any other location that may be frequented by a user. Boundary information for the respective stored locations may be stored along with classification type for the location and any semantic label assigned to the location. Stored information may include a defined set of boundaries or a radius distance around a point location to allow for creation of a geofence for the location. The geofence is a virtual perimeter for a real-world geographic area. Global positioning system (GPS) may be used to create a virtual fence around a location and track the physical location of the electronic devices 101, 102 and 107 within the geofence boundary as well as entry and exit of the bounded area.

Machine learning algorithms 186 may include on-device heuristics, machine learning algorithms, or a combination thereof to analyze and assign a label regarding movement or travel of a device to be designated as being "in transit" state, "moving" state, or "settled" state in a defined space for a time period. Analysis may be performed using a variety of signals from data sources available to the mobile device 102, including, but not limited to, the following: sensor data, positioning data, calendar data, transit card usage data, application data, historical data on patterns/routines of travel, and/or any other data accessible to the mobile device 102. In some embodiments, a mobile device 102 may be classified with a "settled" semantic label after remaining within the geographic boundaries that define a location (e.g., the trusted location 184) for a defined time period. Positioning data for the mobile device 102 may remain within the boundaries of a geofence for a particular location for a duration of time (e.g., 5 minutes). Sensor data, such as accelerometer data, may indicate that the mobile device 102 is at rest to support an inference of being settled.

Application data may support the inference that the mobile device 102 is settled, such as the mobile device being located at a calendar appointment location. Application data indicating a type of application in use may also provide an inference of the device being settled, such as using a media application and/or a smart home device. Historical data for the user on routines or patterns in travel may be used to determine whether the mobile device 102 is settled in a defined space, such as a bedtime routine at a home or hotel location. Mobile device 102 may be classified as with an "in transit" label based on prior behavior, patterns, or routines for the user and analyzed on mobile device 102. For example, the user may have routine of going to work around the same time every day and an "in transit" state may be assigned if the data on the device supports that the pattern is being repeated. In the simplest case, a speed at which the mobile device is moving or entering and exiting known geographic areas (e.g., using geofences) may allow for the inferring that the mobile device 102 is in transit. If the mobile device 102 is detected as accelerating in known areas of transit (e.g., on roads, highways, train routes, etc.), then the mobile device 102 may be given the status of "in transit." Similarly, if transit applications/cards are used/in use, then the mobile device 102 may be designated as "in transit".

Figure 2:
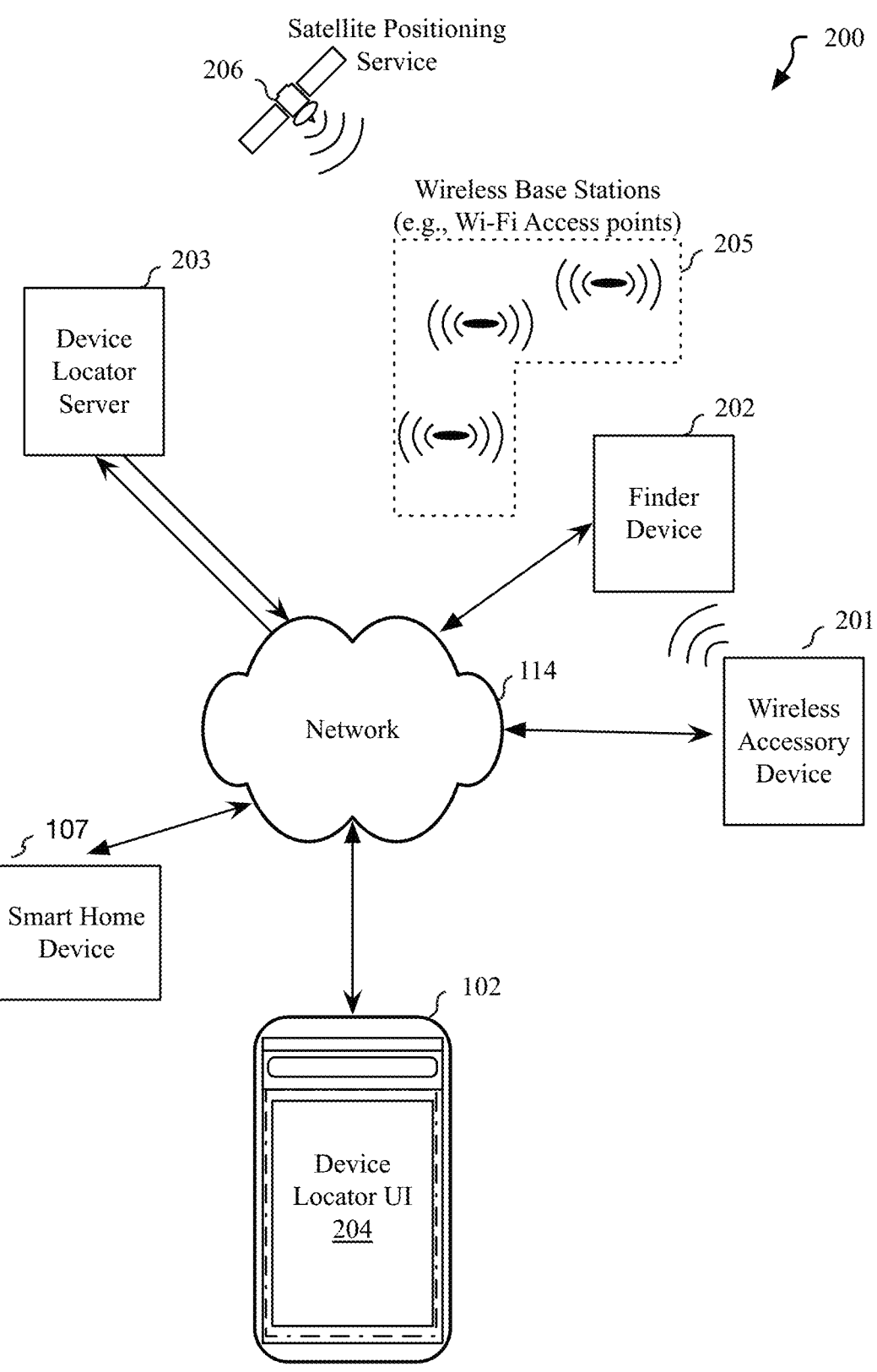
FIG. 2 illustrates a system to locate a wireless accessory device, according to an embodiment.

FIG. 2 illustrates a system 200 to locate a wireless accessory device 201, according to an embodiment. In one embodiment, the wireless accessory device(s) 201 is another embodiment of accessory device(s) 101 (and optionally a case) that may be paired as part of a device group. In other embodiments, accessory device 201 are separate accessory devices that are not part of a device group and are each paired separately to mobile device 102. Each accessory device 201 includes one or more wireless transceivers and can communicate, either directly or indirectly (e.g., through another device or computer) with a companion device (e.g., mobile device 102) over a wireless network or peer-to-peer communication link. Accessory device(s) 201 may provide a beacon signal for one or more accessory devices and/or each accessory device 201 may be independently and separately capable of being found by each providing the beacon signal. Some examples of wireless accessory devices 201 include but are not limited to wireless earbuds, EarPods, AirPods, input devices, a charging device, a case for accessories, headphones, headsets, fitness equipment, health equipment, display devices, external hard drives, other wearable devices (e.g., smartwatches, fitness bands, optical head-mounted displays) adapters, speakers, and/or any other mobile devices. Paired groups of accessories may be the same type of device (e.g., speakers, AirPods, fitness weights, etc.) or different types of devices (e.g., smartphone and credit card reader, etc.).

The wireless accessory device 201 can also include other wireless devices such as input devices including, but not limited to credit card reading devices, stylus devices, mouse, keyboard, game controllers and/or remote controls. The wireless accessory 201, in one embodiment, also includes smartphones, tablet computers, laptop computers, smart speaker devices, televisions, or television set top boxes that at least temporarily are unable to access a wide area network, such as the Internet (e.g., wide area network 114 as in FIG. 1). The wireless accessory 201 can also be any other wireless device, including beacons or locator tags that can be attached to other devices to enable the tracking or locating of those devices. In one embodiment, the wireless accessory 201 can be from a device group of accessory devices that are paired with the mobile device 102 and/or smart home device 107 using a wireless technology standard, such as but not limited to Bluetooth. The wireless accessory 201 can also communicate with the mobile device 102 and/or smart home device 107 over wireless technologies including the implementation of any wireless standards and protocols, such as Wi-Fi direct, Zigbee, or AirPlay. While the companion device to which the wireless accessories 201 are paired is generally referred to as a mobile device 102, companion devices are not limited to mobile devices. Companion devices, in some embodiments, can also include laptop or desktop devices and can additionally include some wearable accessories, such as but not limited to a smart watch device or a wearable display.

In one embodiment, the wireless accessory 201 can periodically transmit a wireless beacon signal. The wireless accessory 201 can transmit the beacon signal using one of a variety of wireless technologies described herein (e.g., Bluetooth, Wi-Fi, etc.) and in one embodiment can also beacon using an ultra-wide band (UWB) radio technology. The beacon signal can be transmitted using a single wireless technology, one of multiple selectable wireless technologies, or multiple simultaneous wireless technologies. The beacon signal can transmit a beacon identifier that includes information to specifically identify the individual wireless accessory 201, and/or a device group. In one embodiment, the beacon identifier is a public encryption key associated with the device.

The beacon signal can also convey information about the wireless accessory 201 and/or smart home device 107, such device status information and/or verifiable information. Device status information in the beacon signal may include, but is not limited to the following: a beacon type, a device classification, a battery level, any pre-defined device status, a device state, a lost status, an alarm status, a separated from owner status, a near-owner status, a proximate to one or more accessory devices in a device group status, a wired or wireless connection status, a physically connected to one or more accessory devices in a device group status, a pairing status indicating whether accessory device is paired or not paired, a pending pairing status, a battery life state, a charging status, a near-smart home device status, and/or any other status information. The near-owner status can indicate that the wireless accessory 201 has detected the nearby presence of the mobile device 102 associated with the owner of the accessory. The lost or "separated from owner" status can indicate that the wireless accessory 201 has determined itself to be lost or has been placed into a lost state by the owner of the device. The alarm status can indicate that the wireless accessory 201 was placed in a state that the device should trigger an alarm if moved from a current location. The near-smart home device status may indicate that the wireless accessory device 201 is in communication with smart home device 107 for the owner device and/or a finder device.

In some embodiments, verifiable information may include any information that may be needed to establish trust or authority that a pairing process, a setup process, a device discovery process, and/or a finding process may proceed with the device presenting the verifiable information. By way of example, verifiable information may include information established by a device manufacturer, such as a serial number or a set of serial numbers in a device group or a smart home device. In some embodiments, the verifiable information may include status or state information for the device. The verifiable information may include, but is not limited to, the following: a device type, a member of device group, a serial number, a device group, serial numbers of other devices within a device group, state or status information, a software version, and/or any other verifiable information. Verifiable information may be sent to the certificate authority 106 or other attestations service to verify received information presented by the device to another device. Verifiable information may be encrypted and/or sent with a token to allow for further verification of the device.

In some embodiments, the beacon signal from the wireless accessory 201 can be detected by the smart home device 107. A mobile device 102 may send a request to smart home device(s) 107 to perform a beacon scan to determine if the smart home device(s) 107 can detect a beacon signal sent from a wireless accessory device 201. The mobile device 102 may directly communicate with the smart home device 107 and/or communicate via the request via the device locator server 203. In some embodiments, the mobile device 102 may authorize sending a data packet with the request that contains one or more public keys to identify advertisements from the wireless accessory device 201. If the smart home device 107 detects the beacon signal from the wireless accessory device 201, then the smart home device 107 may communicate that the beacon signal was received by the smart home device 107 to the mobile device 102 (e.g., directly or via the device locator server 203, etc.) and/or other smart home devices 107. For example, if the beacon signal from the wireless accessory device 201 includes an advertisement with a key from the one or more public keys sent by the mobile device 201 with the request, then the smart home device 107 may respond to the request by sending location information (e.g., ranging data, signal strength information, etc.) for the wireless accessory device 201 to the mobile device 102 and/or the device locator server 203.

In one embodiment, location information for the wireless accessory device 201 received from the smart home device 107 can either be encrypted or transmitted unencrypted to the mobile device 102 and/or device locator server 203. A received signal strength indicator (RSSI) for the beacon signal can be transmitted along with the location data for the wireless accessory device 201 to the mobile device 102. The RSSI data can then be used to determine the distance of the wireless accessory device 201 from the smart home device 107 and assist in triangulation on the mobile device 102. The location information provided to the mobile device 102 may include information on the location of the smart home device 107 within the location environment. Where the RSSI data is transmitted in an unencrypted state, in one embodiment, the device locator server 203 and/or the mobile device 102 can use RSSI information to reduce noise by discarding very weak signals if other, stronger signals are present from other smart home devices 107.

In some embodiments, the smart home device 107 may be used to play audio to aid in locating the wireless accessory device 201. For example, if the smart home device 107 has the strongest signal strength among a set of smart device(s) requested to perform a beacon scan to locate the wireless accessory device 201, then the smart home device 107 may provide a notification (e.g., play audio, play video, turn on a light, etc.) for the mobile device user. In some embodiments, the wireless accessory device 201 may send a request with content for playback and/or settings for the smart home device 107 to perform in order to aid with the mobile device 102 in locating the wireless accessory 201.

In some embodiments, the beacon signal can be detected by a finder device 202, which is locally proximate to the wireless accessory 201 in order to use crowdsourcing to locate a lost wireless accessory 201. In further embodiments, the smart home device 107 may provide additional functionality as a finder device 202. The finder device 202 can be a similar device as the mobile device 102 and can receive and transmit data over a wide area network 114 and receiving and transmitting using similar wireless technologies as the wireless accessory 201 (e.g., Bluetooth, etc.). Particularly, the finder device 202 can receive data using the wireless protocol over which the beacon signal is transmitted. The finder device 202 can determine a location using one or more location and/or positioning services including, but not limited to a satellite positioning service 206 or a terrestrial positioning system using RF signals received from wireless base stations 205 such as Wi-Fi access points or cell tower transmitters of a cellular telephone network. In an embodiment, the finder device 202 periodically stores its location as determined based on the one or more location and/or positioning services. The stored location can be associated with a timestamp for which the location was determined. When the finder device 202 receives a beacon signal from the wireless accessory 201, the finder device 202 can transmit a location for the finder device 202 over the wide area network 114 to a device locator server 203. The timestamp for a determined location for the finder device 202 can be correlated with a timestamp for which a beacon signal was received to associate a geographic location with a received beacon signal.

Where the wireless accessory 201 provides a public key within the beacon signal, the finder device 202 can encrypt the determined location data and transmit the encrypted location data to the device locator server 203 over the wide area network 114. In one embodiment, additional data can either be encrypted and transmitted along with the location data or transmitted unencrypted to the device locator server 203. For example, the RSSI for the beacon signal can be transmitted along with the location data. The RSSI data can then be used to determine the distance of the wireless accessory 201 from the finder device 202 and assist in triangulation on the owner device. Where the RSSI data is transmitted in an unencrypted state, in one embodiment the server can use RSSI information to reduce noise by discarding very weak signals if other, stronger signals are present. In one embodiment, UWB ranging data can also be provided, where such data is available.

In one embodiment, the finder device 202 and/or the smart home device 107 can behave differently upon receiving a beacon signal from a wireless accessory 201 depending upon a device status conveyed by the wireless accessory 201. For standard beacon signals, the finder device 202 can place encrypted location data into a queue and transmit the location data to the device locator server 203 during a periodic transmission window. However, if the wireless accessory 201 is indicating an alarm state, the finder device 202 can transmit the location data to the device locator server 203 immediately. In the case of the smart home device 107 receiving an indication that the wireless accessory device 201 is in the alarm state, the smart home device 107 may immediately play media files on behalf of the wireless accessory device 201. Additionally, the finder device 202 may not transmit the location data to the device locator server 203 if the beacon signal of the wireless accessory 201 indicates that the accessory is near the owner of the accessory. Alternatively, the finder device 202 may delay transmission of encrypted location data.

If the owner of the wireless accessory 201 wishes to locate the wireless accessory device 201, the owner can access a device locator user interface (UI) 204 on the mobile device 102. The device locator UI 204 can be associated with a device locator application that is used to locate electronic devices and accessories that are registered with an online account of the user, such as a cloud services account or another type of online account. The device owner, using the device locator UI 204, can query the device locator server 203 for location data that may have been transmitted to the device locator server by a finder device 202 of the wireless accessory 201. In one embodiment, the mobile device 102 can transmit the public encryption key associated with the wireless accessory 201 to the device locator server 203. The device locator server 203 can then return any stored location data that corresponds with the public encryption key. The location data returned to the mobile device 102 can be encrypted data that is encrypted by the finder device 202 using the public encryption key. The mobile device 102 can use an associated private key to decrypt the encrypted location data. The decrypted location data can then be processed by the mobile device 102 to determine a most probable location for the wireless accessory 201. In various embodiments, the most probable location for the wireless accessory 201 can be determined by triangulation from multiple received locations and using other data, such as a beacon signal RSSI associated with each location and timestamp or UWB ranging data included within the location data.

Figure 3:
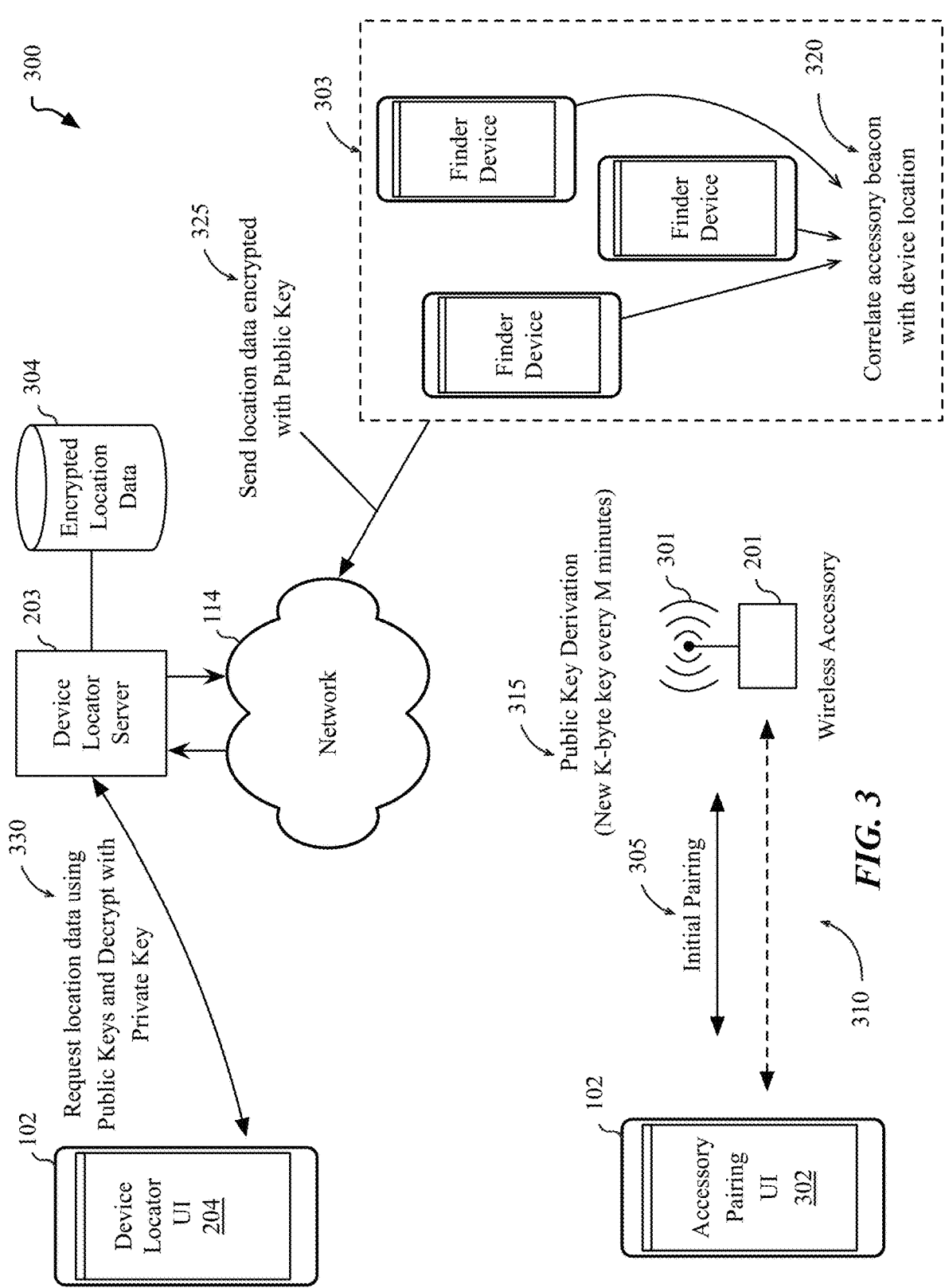
FIG. 3 illustrates a system for pairing and locating a wireless accessory, according to an embodiment.

FIG. 3 illustrates a system 300 for pairing and locating a wireless accessory device, according to embodiments described herein. In one embodiment a mobile device 102 of a user of the wireless accessory 201 (e.g., example of device 101) can present an accessory pairing UI 302 by which the user can pair the mobile device 102 with the wireless accessory 201. During an initial pairing (305) between the mobile device 102 and the wireless accessory 201, a public key exchange (310) can be performed between the mobile device and the wireless accessory 201. In one embodiment, during the public key exchange (310) the mobile device 102 and the wireless accessory 201 exchange public keys of public key pairs generated by the device and the accessory 201. In one embodiment the public key exchange (310) is a one-way transfer, in which the mobile device 102 transmits a public key of a public/private key pair to the wireless accessory 201. Alternatively, or additionally, the public key exchange (310) may be a Diffie-Hellman key exchange in which the device and the accessory establish a shared secret between two parties. In one embodiment, the public key exchange (310) additionally uses elliptic curve cryptography to establish the shared secret. For example, Elliptic-curve Diffie-Hellman (ECDH) can be used to enable the establishment of a public key pair and one or more shared secrets. In one embodiment, the one or more shared secrets include an anti-tracking secret, which can be used by the wireless accessory 201 to periodically derive additional public keys.

After the wireless accessory 201 has been paired with the mobile device 102, the wireless accessory 201 can periodically broadcast a beacon signal 301 that includes device status information and a beacon identifier. In one embodiment, the beacon identifier is a public key derived from a shared secret that is established during the public key exchange (310). Additionally, the wireless accessory 201 can periodically perform a public key derivation (315) to generate a new public key and begin broadcasting the new public key as the beacon identifier. The public key is a K-byte key, with a new K-byte key generated every M minutes. The value K and M can vary between embodiments. In one embodiment, a K value of 28 bytes is used. In one embodiment, a K value of 27 bytes is used. The value K can be determined at least in part based on the beacon length associated with the wireless protocol used to transmit the beacon signal 301. In one embodiment, the beacon signal can transmit a variant of beacon advertisement packet associated with a low-energy radio protocol, such as Bluetooth Low Energy.

The value M, in one embodiment, is 15 minutes, such that a new K-byte key is generated every 15 minutes. The public key can be derived deterministically based on a timestamp and an anti-tracking secret generated during the public key exchange 310. The public key derivation (315) process enables the wireless accessory 201 to use different keys over time, preventing the long-term association with a specific key with a specific device. The key can be derived based on an anti-tracking secret known only to the mobile device 102 and the wireless accessory 201, allowing the mobile device 102, and only the mobile device, to determine which public key will be broadcast by the wireless accessory 201 at any given timestamp. The anti-tracking secret can be generated along with an ECDH public key and transferred to the wireless accessory 201. The anti-tracking secret can then be used to enable the wireless accessory 201 to generate a sequence of public keys $P_i$. In one embodiment, the sequence of public keys $P_i = \lambda_i \cdot P$, which defines a group operation between a scalar or exponent value $\lambda_i$ and group elements, such as, for example, Elliptic Curve points P. The scalar or exponent value $\lambda = KDF(AT, i)$, where KDF is a key derivation function, AT is the anti-tracking secret, and i is a counter or timestamp.

In one embodiment, backtracking resistance can be enabled to protect the anti-tracking secret in the event the wireless accessory 201 is compromised. When backtracking resistance is enabled, the anti-tracking secret is transferred to the wireless accessory 201 but is not retained by the wireless accessory. Instead, the accessory computes a value $\lambda_{i+1} = H(\lambda_i \| time)$, with $\lambda_0 = AT$ and H being a cryptographic hash function. The wireless accessory 201 then stores $\lambda_i$ for a given time period i. If the wireless accessory 201 is compromised, only $\lambda_i$ for current and future values of i is exposed, without exposing the anti-tracking secret AT. In one embodiment, backtracking resistance is performed by periodically writing $\lambda_i$ to non-volatile memory of the wireless accessory 201.

In one embodiment the wireless accessory 201 can transmit the beacon signal 301 every two seconds, although other beacon rates can be used, and the beacon rate can vary under certain circumstances. For example, the wireless accessory 201 can decrease a beacon rate when in a near-owner state. Beacon rate can also vary based on accelerometer triggered events. For example, the wireless accessory 201 can increase the beacon rate when in an alarm state, which can be triggered by the accelerometer on the wireless accessory 201.

The wireless accessory 201 can enter the near-owner state if, after transmitting the beacon signal 301, the wireless accessory 201 receives a reply from the mobile device 102 associated with the user of the accessory, which indicates that the mobile device 102 is within range of the wireless accessory. Additionally, while the wireless accessory is in the near-owner state, the amount of data transmitted by the beacon signal 301 may be reduced. In one embodiment, the rate at which new public keys are generated can also be reduced while the wireless accessory is in the near-owner state.

The wireless accessory 201 can enter an alarm state upon receiving a message from the mobile device 102 that indicates that the wireless accessory 201 should enter the alarm state. When in the alarm state, the wireless accessory can initially enter an armed state in which the wireless accessory 201 can reduce or cease the transmission of locator beacon signals, although other types of wireless signaling can persist. The wireless accessory 201 can remain in the armed state until the state is deactivated by the mobile device 102 or alarm is triggered. The alarm can be triggered, in one embodiment, upon detection of movement, for example, via an accelerometer within the wireless accessory 201. The alarm can also be triggered, in one embodiment, upon detection that the wireless accessory 201 has moved out of range of the mobile device 102 and is no longer in the near-owner state. When the alarm is triggered, the rate at which the beacon signal 301 can be increased, to increase the speed by which the wireless accessory 201 can be located.

The beacon signal 301 transmitted by the wireless accessory 201 can be detected by a set of finder devices 303 (finder devices may be finder device 202) and/or the mobile device 102, which are other electronic devices that can receive the beacon signal transmitted by the wireless accessory and are transmit location and other data associated with the beacon signal 301 to the device locator server 203 via the wide area network 114. In one embodiment the set of finder devices 303 include variants of the mobile device 102 or can be other types of electronic devices. For example, the set of finder devices 303 can perform operations (320) to correlate the beacon signal 301 received from the wireless accessory 201 with a device location associated with the finder device 303. As described with respect to FIG. 2, the device location can be determined via a satellite positioning service or a terrestrial positioning system that uses RF signals received from wireless base stations (e.g., Wi-Fi access points or cell tower transmitters). In one embodiment the set of finder devices 303 can also include stationary devices such as smart speaker devices, televisions, or television set top boxes that can receive the beacon signal 301.

The set of finder devices 303 can encrypt the location data with the beacon identifier (e.g., public key) received within the beacon signal 301 and send the location data (325) to the device locator server 203. The data sent by the set of finder devices 303 is send anonymously and no identifying information for the finder devices is stored with the data sent by the finder devices.

The device locator server 203 can store encrypted location data in a data store 304, which in one embodiment can be a distributed database having multiple nodes. Hashes of the beacon identifier/public key of an accessory can be sent along with encrypted location data. The encrypted location data can be stored to a database node based on a hash of the beacon identifier. The encrypted location data can be indexed by the device locator server 203 using the hash of the beacon identifier. Sending the hash of the beacon identifier instead of the full beacon identifier prevents the storage of the full beacon identifier to the server. Other information can also be sent and stored with the location data, either in an encrypted or unencrypted state. The other information can include timestamps for when the beacon signal 301 was received, RSSI information for the received beacon, and/or ranging information determined, for example, via UWB ranging.

When the user or owner of the wireless accessory 201 wishes to locate the accessory, the user or owner can access the device locator UI 204 on the mobile device 102. The device locator UI 204 can be associated with a locator application 190 or feature of the mobile device 102. The device locator UI 204 may also have a web-based interface that can be accessed from the mobile device 102 or another type of electronic device, such as a laptop or desktop device. The mobile device 102, upon loading the device locator UI 204, can send a request (330) for location data to the device locator server 203. The request 330 can include a set of public keys or public key hashes, which can serve as beacon identifiers for the beacon data. The mobile device 102 can generate the set of public keys based on the secret information held by the mobile device 102 and the wireless accessory 201 and the timestamps over which the mobile device 102 wishes to receive location data. In one embodiment the set of public keys is the sequence of public keys $P_i$ that are generated based on the anti-tracking secret. The sequence of public keys $P_i$ corresponds to a matching sequence of private keys $d_i$. The mobile device 102 can generate the sequence of public keys, as well as the corresponding sequence of public keys $d_i$, where i is a counter or timestamp. In one embodiment, the mobile device 102 can generate and send the previous 24 hours of public keys (or hashes of the 24 hours of public keys) within the request 330. If no data is found for 24 hours of public keys, the mobile device 102 can send generate keys for an earlier period, back to a predetermined location data retention limit.

In one embodiment the encrypted location data is stored and indexed based on a hash of the public key instead of the public key to prevent the provider of the location service data from storing data that can be used to tie the encrypted location data to a specific device, and thus a specific user or user account. The finder device can send the hash of the public key that is broadcast within the beacon signal 301 associated with an observation location. The owner of the device can query the device locator server 203 using a hash of the public key that is determined for a query period.

In some embodiments, if a location query is to be performed via the web-based interface from an electronic device, such as a laptop or desktop device, keys to enable the decryption of the location data may be required to be sent to the electronic device. In one embodiment, decryption keys for the location data may be sent to the server that provides the web-based interface to enable the server to decrypt location data, at least while the location data is being viewed through the web-based interface. Before location data is displayed via the web-based interface, a notice may be presented to inform the user that location decryption keys are being temporarily shared with the web-based interface server to enable location data to be decrypted and presented. In one embodiment, the sharing of the location decryption keys can be performed via an automatic and temporarily delegation of location query rights with a proxy account associated with the web-based interface.

In one embodiment, the wireless accessory 201 can be placed in a light lost mode. In the light lost mode, a set of future public keys can be generated for the wireless accessory and transmitted to the device locator server 203. The device locator server 203 can then notify the mobile device 102 if any location data is received that correspond with a key in the set of future public keys. In one embodiment, a finder device that sends a location for a wireless accessory that is in the light lost mode can be directed by the device locator server 203 to relay a message to the wireless accessory 201 that notifies the wireless accessory that it is in the light lost mode. A similar mechanism can be used to relay a message to the wireless accessory 201 that places the accessory in an explicit lost mode. The explicit lost mode can be enabled by the user via the device locator UI 204. In the explicit lost mode, the wireless accessory 201 cannot be paired with another device unless unlocked by the owner. Additional examples of paired devices using location services may be found in U.S. patent application Ser. No. 16/543,227 filed Aug. 16, 2019 entitled "A System and Method for Locating Wireless Accessories," which is incorporated by reference herein in its entirety.

Figure 4:
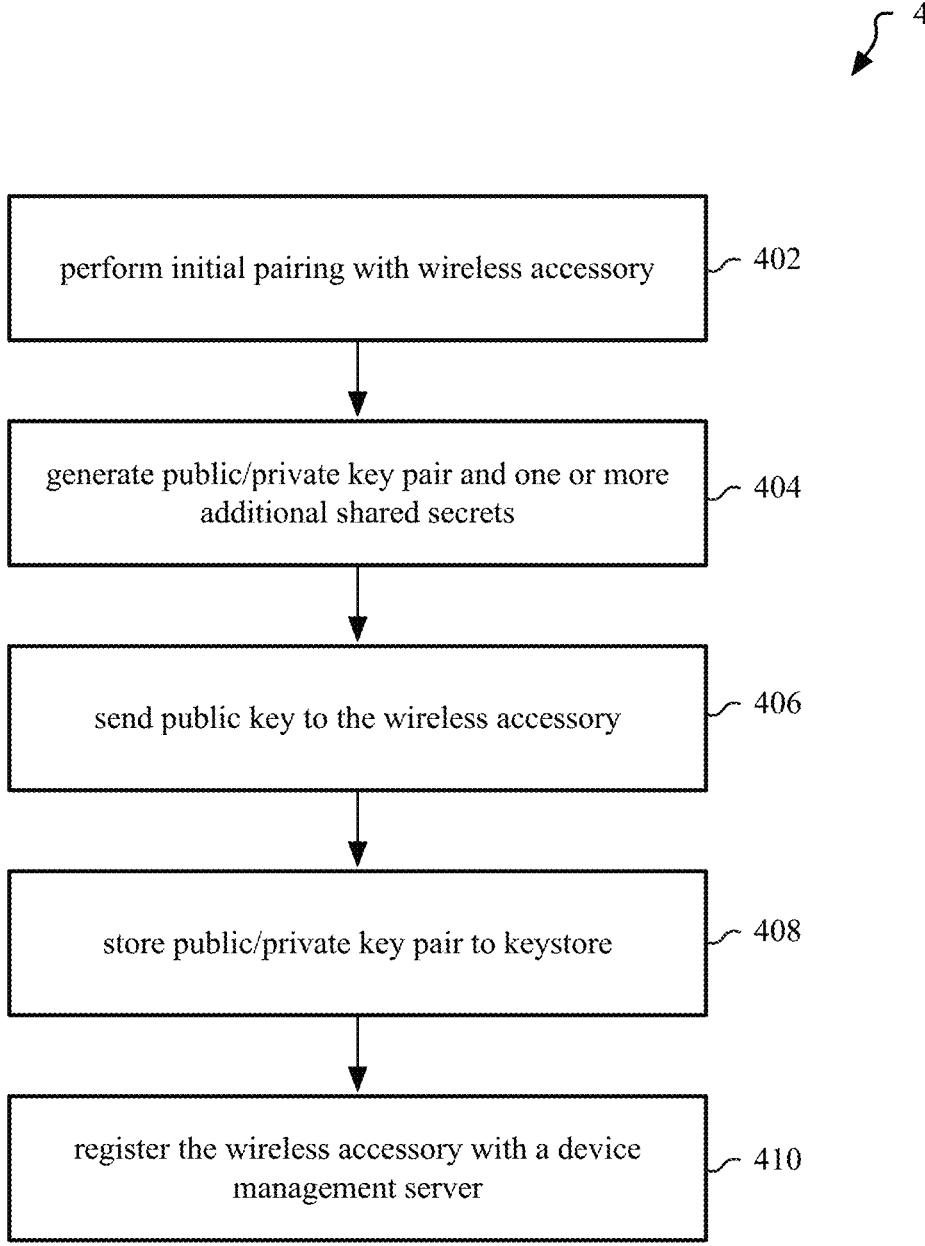
FIG. 4 is a flow diagram illustrating a method for use with device locator systems, according to an embodiment.

FIG. 4 is a flow diagram illustrating a method for use with the device locator systems according to an embodiment described herein. FIG. 4 illustrates a method 400 to pair a mobile device with a wireless accessory. Aspects of method 400 are also illustrated in FIG. 2 and FIG. 3, as described above. For example, the description of the operations below refers to the mobile device 102, wireless accessory 201 and device locator server 203.

As shown in FIG. 4, method 400 includes an operation (402) that performs an initial pairing with a wireless accessory. The initial pairing can be a Bluetooth pairing or another type of pairing using other wireless radio technologies. During the initial pairing, the mobile device and the wireless accessory can exchange identifiers, passkeys, or other credentials that enables a wireless data exchange to be performed between a mobile or another electronic device and the wireless accessory. On one embodiment the initial paring with the wireless accessory can include the exchange of credentials associated with the wireless protocol for which the pairing is performed, allowing all data exchanged wirelessly to have at least a first layer of encryption.

The mobile device can then generate a public/private key pair and one or more additional shared secrets (404). The device can then send the public key and one or more additional shared secrets to the wireless accessory (406). A variety of key generation techniques can be used. In one embodiment, a variant of ECDH is used to generate a public key pair for encryption. In one embodiment, the one or more additional shared secrets can include an anti-tracking secret that enables the wireless accessory to derive a new public key based on an existing public key.

After generating the public/private keypair and one or more additional shared secrets, the mobile device can store public/private key pair to keystore (408). In one embodiment the keystore is a cloud-based keystore that can be synchronized with other devices associated with the same cloud services account, or family of cloud services accounts, to which the mobile device and wireless accessory are associated. The cloud-based keystore allows the wireless accessory to be located by other synchronized devices. The mobile device can then register the wireless accessory with a device management server (410). Registering the wireless accessory with the device management server can form an association between the wireless accessory and the cloud services account to which the mobile device is associated. In some embodiments, the mobile device may register the wireless accessory and the device group 104. Information stored in a device group profile for the device group may also be synchronized between devices tied to a cloud services account (e.g., a user account). The device management server can be associated with other cloud-based servers that are used to facilitate cloud-based services accessible to the mobile device, such as the device locator server 203 of FIG. 2 and FIG. 3.

Figure 5:
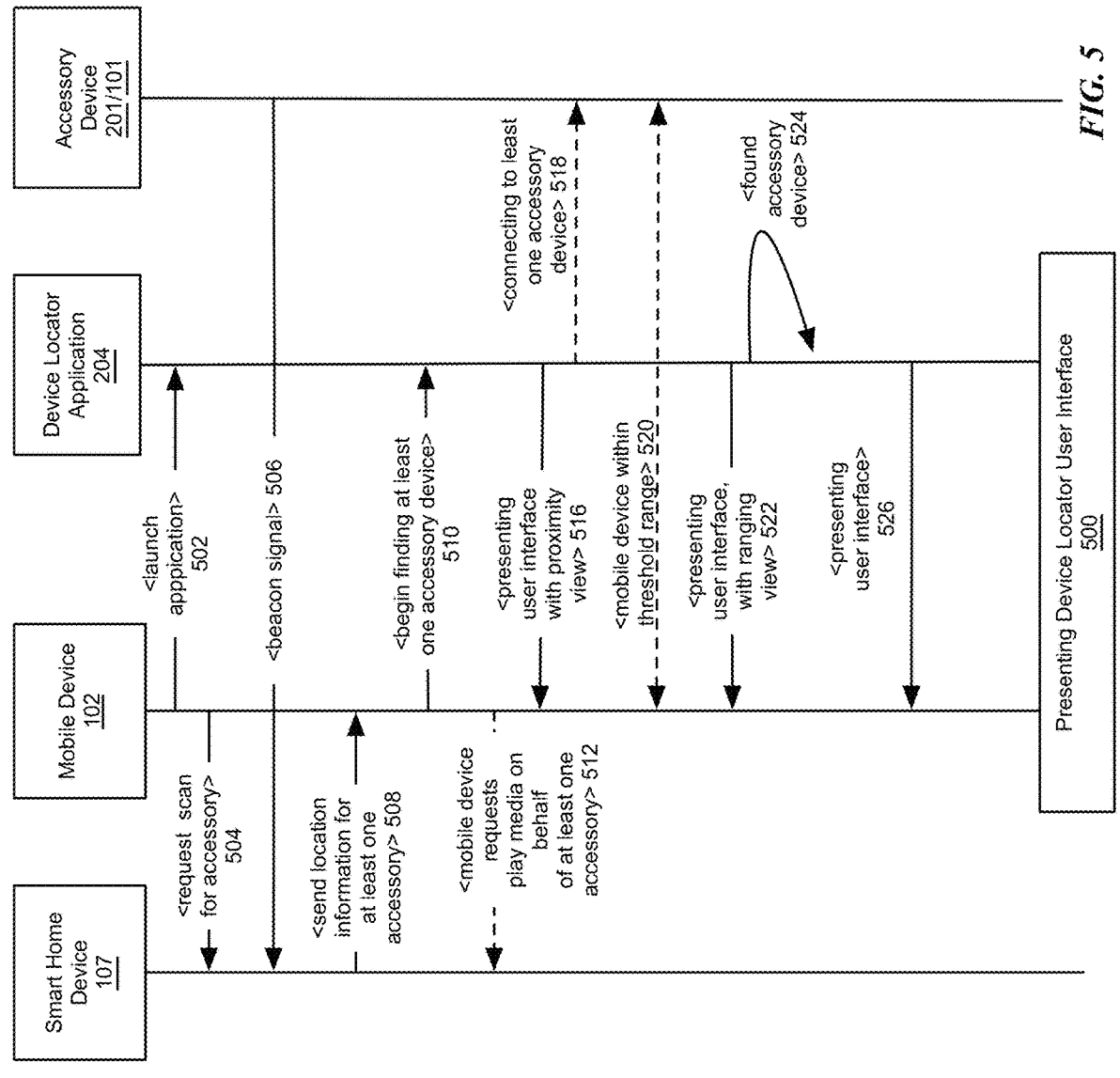
FIG. 5 is a sequence diagram illustrating methods to present a device locator user interface for use with the device locator systems described herein, according to an embodiment.

FIG. 5 is a sequence diagram 500 illustrating methods to present a device locator user interface for use with the device locator systems described herein, according to an embodiment. Mobile device 102 launches the device locator UI 204 (502). Mobile device 102 sends a request for smart home device 107 to perform a beacon scan for advertisements from accessory device 201 (504). The advertisements may be sent prior to launching the device locator UI 204 and/or subsequent to launch of the device locator UI 204. In an embodiment, BLE advertisements are received every two seconds. Signal strength measurements are determined by the smart home device 107 for the beacon signal from the at least one accessory device 201 paired to mobile device 102 (506). The smart home device 107 sends location information for the accessory device 201 to the mobile device 102 (508) and the mobile device 102 begins the finding process for the at least one accessory device (510). The location information may include, but is not limited to, the following data: signal strength information for the received beacon signal, whether or not a beacon signal was detected, the defined space identifier for the location of the smart home device 107, ranging information for the wireless accessory device 201 and/or smart home device 107, battery life expectancy for accessory device 201, device status for the smart home device 107, and/or any other information to aid in locating the accessory device 201.

If the location information for the accessory device 201 from the smart home device 107 indicates that smart home device 107 may aid in locating the accessory device 201 for mobile device 102, then the mobile device 102 may request that the smart home device 107 provide and/or assist in providing location services. In an embodiment, the mobile device 102 may consider a variety of factors to determine which smart home device(s) 107 from a set of smart home device(s) to utilize for location services, including, but not limited to, the following: location information from each smart home device 107, services and/or hardware supported by the smart home device(s) 107, proximity of smart home device 107 to accessory device 201 and/or mobile device 102, and/or device status of the smart home device 107. For example, a smart home device 107 from a set of smart home devices that has one of the higher RSSI values and available processing capabilities (e.g., not executing a higher priority process) may be relied on for the device locator services. In an embodiment, the smart home device 107 may be compared to a threshold RSSI value and must exceed the threshold value to be selected as a smart home device 107 to aid in the finding process.

In some embodiments, optionally, the mobile device 102 sends a request to play media (e.g., a sound, video, etc.) on behalf of the at least one accessory device (512). A wireless radio connection may be formed between the target accessory device 201 and the smart home device 107 (512) allowing for the smart home device 107 to play a sound, in some embodiments.

The mobile device 102 may present a user interface with a proximity view for the device locator UI 204 user interface using the received location information from the smart home device 107 and the location information may be presented with a visual indicator representing the proximity of a target accessory device 201 (516). The visual indicator may correspond to the signal strength measurements from the received advertisements at the smart home device 107 and/or mobile device 102. Optionally, a wireless radio connection may be formed between the target accessory device 201 and the mobile device 102 (518) allowing for the mobile device 102 to request that the target accessory device 201 play a sound (e.g., content, etc.), in some embodiments.

In some embodiments, a wireless radio connection may be formed between the target accessory device 201 and the mobile device 102 and the mobile device may request to a ranging process be performed. When the mobile device 102 is within a threshold range of the target accessory device (520), the ranging process may be performed to determine a distance from and direction to the target wireless accessory device 201. A ranging view for the device locator UI 204 may be presented (522). The ranging view may provide a direction and a calculated distance to the wireless target to aid in finding the accessory device 201. The ranging view may be presented selectively with the proximity view and/or independently within the device locator UI 204. The device locator application 204 user interface may be presented querying the user as to whether the accessory device 201 was found (526).

Figure 6:
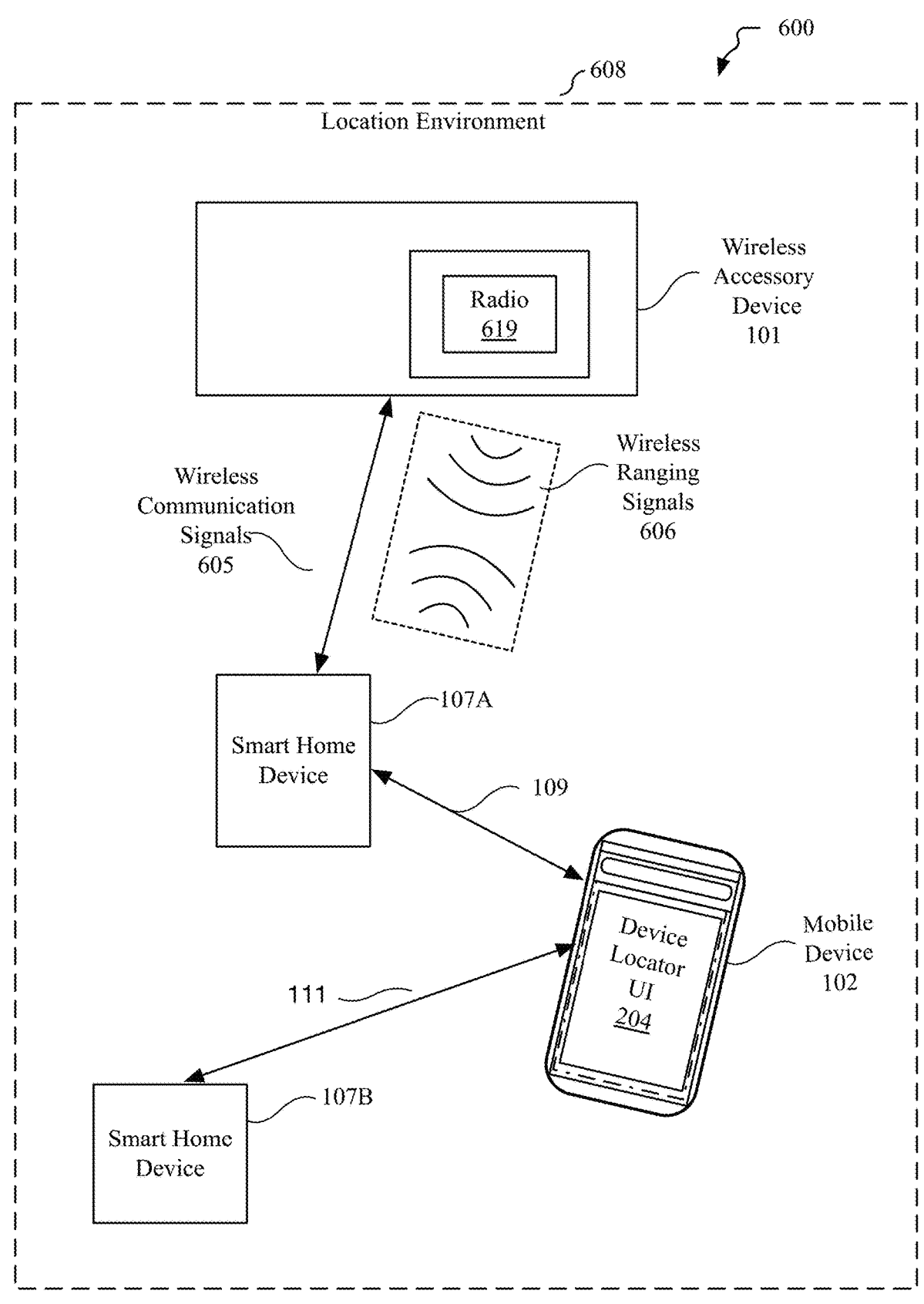
FIG. 6 illustrates a device locator system to enable device location services for a target accessory device, according to an embodiment.
Figure 7:
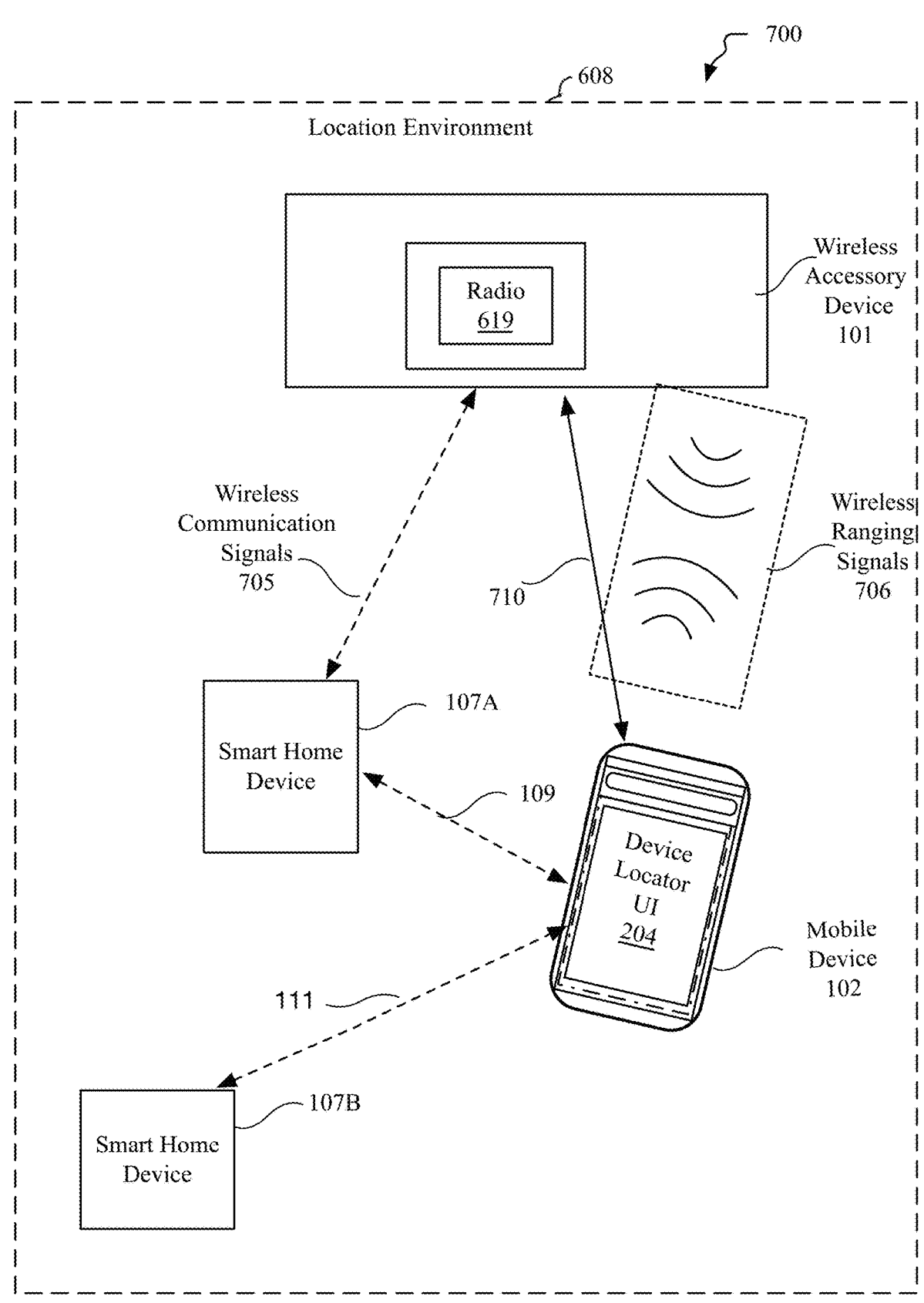
FIG. 7 illustrates a device locator system to enable location services for a target accessory device, according to an embodiment.

FIG. 6 and FIG. 7 illustrate a device locator system to enable device location services for a target accessory device, according to an embodiment. One embodiment provides a system 600 to enhance location finding with a device locator UI 204 when in a location environment 608 with at least one smart home device 107A that is proximate to a target accessory device 101 to be located and/or a smart home device 107B that is not proximate to the wireless accessory device 101. The smart home device 107A may be proximate to aid in locating the wireless accessory device 101, if the smart home device 107A may receive wireless communication signals 605 (e.g., detect beacon signals) from the wireless accessory device 101. The location environment 608 can include a mobile device 102 (e.g., smartphone, wearable, tablet, etc.). The mobile device 102 can communicate wirelessly with one or more smart home device(s) 107 (including 107A and 107B) and/or wireless accessory device 101 that includes a radio 619.

The devices 101, 107, and 102 can communicate wirelessly via wireless communication signals 605 and detecting one another by scanning wireless channels, transmitting and receiving beacons or beacon frames on wireless channels, establishing connections (for example, by transmitting connect requests), and/or transmitting and receiving packets or frames (which may include the request and/or additional information, such as data, as payloads). The wireless communication signals 605 can be carrier signals that conform to wireless communication technologies such as, but not limited to Wi-Fi or Bluetooth. In addition to wireless communication, the mobile device 102, smart home device(s) 107, and/or the wireless accessory device 101 perform wireless ranging operations using wireless ranging signals 606 (as shown between smart home device 107A and wireless accessory device 101). The wireless ranging signals can be, for example, ultra-wideband signals that can be used to determine a distance and/or angle between the wireless accessory device 101 and the smart home device(s) 107 and/or the wireless accessory device 101 and the mobile device 102 using techniques described herein. In one embodiment, data provided by the wireless ranging signals 606 can be correlated with other metrics, such as an RSSI of the wireless communication signals 605. In one embodiment, a communications processor of the mobile device 102 and/or smart home device 107 can fuse multiple types of ranging to provide a unified distance and/or angle estimate based on multiple types of radio data.

In some embodiments, the mobile device 102 can provide a device locator UI 204 that presents a map and/or a view of the location environment 608. Mobile device 102 can send a request (e.g., requests as shown with 109 to 107A and 11 to 107B) to one or more smart home device(s) 107A and 107B to perform a beacon scan to detect the wireless accessory device 101. Smart home devices 107A and 107B may send location information including RSSI information and/or ranging information to the mobile device 102 in response to the request. In some embodiments, the smart home devices 107A and 107B may communicate and access a map or container of wireless accessory device 101 location information to determine which smart home device 107 should be prioritized for communicating location information to the mobile device 102. Smart home device 107B does not detect beacon signals from wireless accessory device 101 and may communicate that no signal was detected to aid in locating the wireless accessory device 101 as eliminating a location in the location environment 608. Alternatively, as shown, smart home device 107A detects beacon signals (e.g., wireless communication signals) and exchanges ranging signals 606 with wireless accessory device 101. As a result, the location information from smart home device 107A may be used by the mobile device 102 to locate the wireless accessory device 101. In this way, the smart home devices 107 may act as a network of distributed search agents for locating the wireless accessory device 101.

In some embodiments, the mobile device 102 may display a map and/or a view with a virtual representation of the wireless accessory device 101. The virtual representation can streamline the process of locating the wireless accessory device 101 by user of the mobile device 102. For example, using a direction indicator that points to a detected location of the wireless device 101 as provided by location information from the smart home device(s) 107 can simplify the process of finding the approximate location of the wireless accessory device 101. The direction indicator can be displayed with a map of the location environment 608, where the map can include the virtual representation of the wireless accessory device 101. When the mobile device 102 is proximate to the wireless accessory device 102, such that beacon signal including wireless communication signals and/or ranging signals as shown in FIG. 7, a proximity view and/or a ranging view of the location environment 608 can be presented, which can allow the user to identify the wireless accessory device 101.

In some embodiments, the smart home device 107A may play a media file (e.g., an audio file) on behalf of the wireless accessory device 101 to assist the user of the mobile device 102 to find the location of the wireless accessory device 101. In one scenario, the wireless accessory device 101 may be concealed by an item. The item may be, for example, a jacket or another article of clothing and the wireless accessory device 101 may be a smartphone or tablet device that is in a pocket of the item. The item and the wireless accessory device 101 may each be within a container, such as a backpack, storage chest, item of luggage, or another item that make reduce the efficiency of audio-based location techniques that rely on the wireless accessory device 101 to play a sound that can be heard by a user.

In another scenario, the wireless accessory device 101 may be a beacon peripheral or locator tag that is attached to the item. To find the item, the user can use the device locator UI 204 on the mobile device 102 to find the wireless device 201, enabling the user to locate the item to which the wireless device 201 is attached. The proximity enhancements described herein can be used to augment the device locator UI 204, allowing the user to quickly determine the location of the item, via the wireless device 201, in scenarios where the item may be concealed by a container or another physical item.

In one embodiment, the mobile device 102 and/or the smart home device 107 can establish a secure wireless communication connection (e.g., a Bluetooth connection as shown with 606) with the wireless device 101 and command the wireless device 101 to begin a wireless ranging process, for example, using the wireless ranging signals 606, which can be UWB signals. FIG. 7 illustrates a system 700 to enable distributed device location finding for a target accessory device, according to an embodiment when the mobile device 102 is close enough in proximity to exchange communication signals 710 and wireless ranging signals 706. Optionally, the mobile device 102 may utilize location information (e.g., RSSI and/or ranging information) from the smart home devices 107 (as shown with communication via 109 and 111).

The wireless ranging signals 606 enable the mobile device 102 to receive measurements of range and angles to the wireless accessory device 101. In some embodiments, the mobile device 102 may request that the target wireless accessory device 101 to increase the rate of sending advertisements (e.g., from every 2 s to every 30 ms) to aid in finding the wireless accessory device 101.

In an embodiment, prior to establishing a secure wireless communication connection and/or with an established wireless connection, signal strength measurements may be determined from received advertisements and may aid in directing a user to the wireless device 101. Additionally, location information from the smart home device 107A on the defined space within the location environment 608 may provide sufficient directions for the user to move within range to establish wireless communication signals and ranging signals to locate the wireless accessory device 101.

In embodiments described herein, wireless ranging can be performed using any standard or proprietary ranging technique, or any combination of standard and/or proprietary ranging techniques. A wireless ranging operation can be performed to determine a distance between devices (e.g., between an initiator and a responder), a direction between devices, or both. For example, a Time of Flight/Time of Arrival (ToF/ToA) can be determined for one or more messages between the devices, which can be used to establish a measure of distance. The one or more messages can have any format and can be transmitted using any wireless protocol. In some embodiments, ToF/ToA can be determined using a bi-directional exchange of two or more messages. In some embodiments, one or more messages used to perform ranging can be secured, e.g., by encrypting or otherwise protecting at least a portion of the content. Further, in some embodiments, the direction of the source of one or more wireless signals can be determined using a technique such as Angle of Arrival (AoA). For example, AoA estimation can be performed using multiple receive elements (e.g., elements of an antenna array) to measure the different times (TDOA) and/or different phases (PDOA) of arrival of a signal. Additionally, or alternatively, in some embodiments, directionality can be determined by measuring Doppler shifts to establish a frequency difference of arrival (FDOA). Wireless ranging techniques can be applied individually or in combination to perform a single ranging operation. Further, wireless ranging techniques can be applied individually or in combination to perform on-going ranging operations, such as continuous or intermittent ranging, and a history of measurements can be captured and used in performing operations based on range and/or direction.

The incoming measurements can be processed to reduce measurement noise and stabilize the estimated location of the lost item. In one embodiment, the mobile device 102 can use a sensor fusion technique that relies upon multiple streams of measurements to arrive at a best estimate of device location. For example, incoming range and/or angle measurements can be fused with position and orientation measurements of the mobile device 102. The position and orientation measurements can be gathered using visual-inertial odometry (VIO), which determines the device location and orientation using an IMU and computer vision using camera data. The VIO data enables software on the mobile device 102 to be aware of the movement and orientation of the device. Combining the VIO data with the range and/or angle measurements determined via the wireless ranging signals 606 and/or 706 and/or enables estimation of the most likely position of the wireless accessory device 101 and allows the user to be pointed towards the wireless accessory device 101. Additionally, combining the VIO data with the signal strength measurements via the wireless communication signals 605 and/or 710 may aid in directing the user to the wireless device 101 with the proximity view and/or in combination with the ranging view. VIO data may be particularly useful in scenarios where one or more of the range or angle measurements may be inaccurate due to multipath signal propagation effects.

The algorithm for determining the position of a lost item can be accessed via the device locator UI 204. When a user intends to locate an item, the user can select the item from a list of registered devices and select a "find" button that is presented via the device locator UI 204. In various embodiments, multiple user interfaces may be presented. Some interfaces resemble a two-dimensional compass like view with a two-dimensional arrow guiding the user to the target item or device to be found. The proximity view and/or combination of proximity and ranging view of the device locator UI 204 may provide an arrow guiding the user in addition to presenting the trajectory that the user has taken in their search with proximity indicators presented along the path taken.

Figure 8:
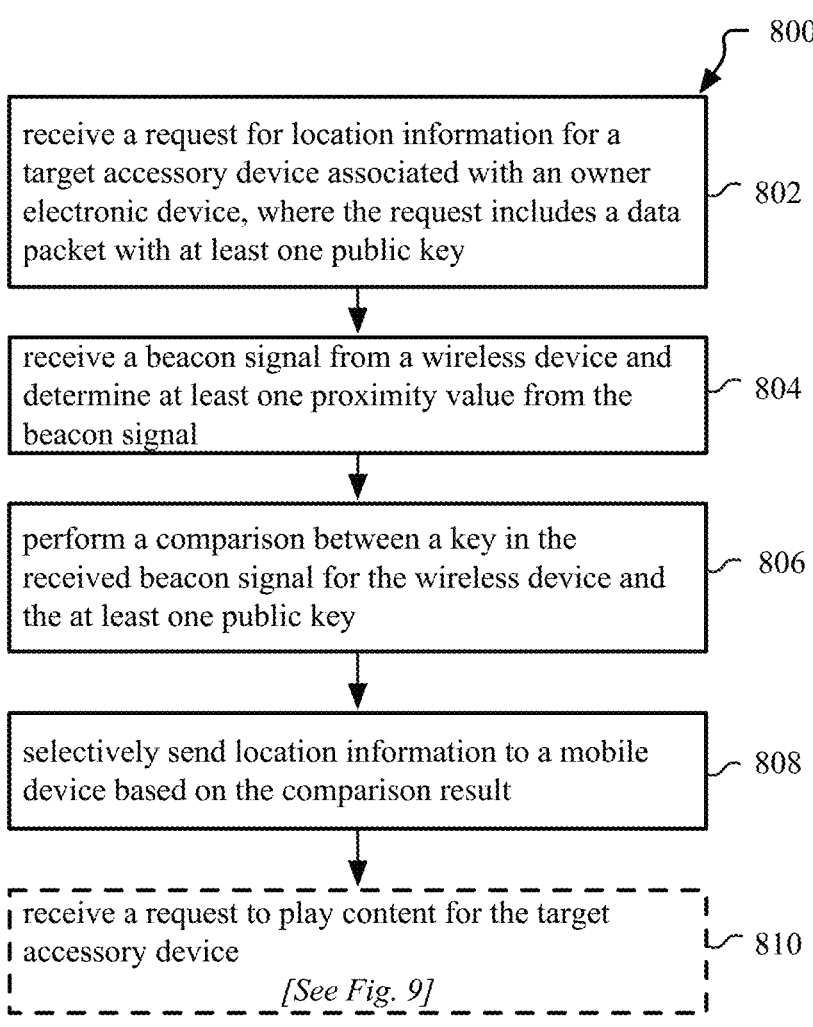
FIG. 8 illustrates a flowchart for a method to enable location services for a target accessory device, according to an embodiment.

FIG. 8 illustrates a flowchart 800 for a method to enable location services for a target accessory device, according to an embodiment. A smart home device 107 receives a request for location information for a target accessory device 101 associated with an owner mobile device 102 (802). The request may include a data packet with at least one public key associated with the target accessory device 101. The data packet with the at least one public key may enable the smart home device 107 to identify a wireless device in communication range as the target accessory device 101 associated with the owner mobile device 102 (e.g., public keys as shown and described in reference to FIG. 3 with wireless accessory 201). In some embodiments, the request may include a data packet that contains a set of rolling public keys that are expected from the target accessory device over time. The set of rolling public keys enable the smart home device 107 to identify the target accessory device 101 over a period of time that correspond to each rolling key from the set of rolling public keys.

The smart home device 107 may receive the request from the mobile device 102, the device locator service 170, another smart home device 107 in the location environment, and/or directly from a user via an interface (e.g., a voice user interface with verbal commands, a user interface, etc.). In an embodiment, the smart home device 107 is a voice activated virtual assistant and the smart home device 107 may receive a verbal command for location information for the target accessory device 101 that is interpreted as a request for location information which includes a data packet with the at least one public key for the target accessory device 101. The mobile device 102 and/or device locator server 170 may either directly send the at least one public key to the smart home device 107 and/or provide access to the at least one public key via a user account. The at least one public key may be associated with a user account and the smart home device 107 may access the at least one public key for the target accessory device 101 from the user account associated with the owner mobile device 102. For example, if the smart home device 107 has access to the user account for the owner of the mobile device 102, then the smart home device 107 may identify beacon signals from the target accessory device 101 using one or more rolling public keys (e.g., rolling public key for wireless accessory 201 in FIG. 3) for the target accessory device 101 that is paired with the mobile device 102.

The smart home device 107 receives a beacon signal from a wireless device and determines at least one proximity value from the beacon signal (804). The proximity value may be a representation for an estimated distance, a relative distance, and/or a relative position from the target accessory device 101. The wireless device is a candidate for the target accessory device 101 within the location environment and the proximity value may be calculated before, after, and/or in parallel with determining whether the wireless device is the target accessory device 101 in step 806. The proximity value may be used to prioritize the use of one or more smart home devices over another smart home device 107 for providing location information to assist the mobile device 102 in locating the target accessory device 101.

In some embodiments, multiple factors may be used to determine a proximity value, including, but not limited to: a processing power availability for handling requests from the mobile device 102, hardware capabilities of the smart home device 107 (e.g., UWB ranging capability, speaker, wireless communication capabilities, a microphone, etc.), a RSSI value, ranging data, sensor data, proximity to the mobile device 102 (e.g., smart home device 107 within wireless communication range to the mobile device 102), and/or any combination thereof. For example, the smart home device 107 may determine at least one proximity value to the wireless device (e.g., candidate target accessory device 101) based on the at least one signal strength value. In an embodiment, the signal strength value is a representation of the proximity of the smart home device 107 to the target accessory device 101 by providing a value that represents a relative distance to the candidate target accessory device and may be used as a proximity value for the smart home devices 107. In such a case, the higher the proximity value (e.g., signal strength value) as compared to the proximity values from other smart home devices 107, the greater likelihood that the smart home device 107 from a set of smart home devices is the closest smart home device to the target accessory device 101. Other factors may be used for a final calculation in the example, such as communication range to the mobile device 102 and ranging capabilities. In another example, if the smart home device 107 does not receive a beacon signal or determines that the received beacon signal does not contain the at least one public key, then the smart home device 107 sends a proximity value to the owner mobile device 102 with a representation indicating that the target accessory device 101 is not in wireless communication range to the smart home device 107.

In yet another example, the smart home device 107 has a wireless controller including a ranging sensor and the smart home device 107 performs ranging operations via an ultra-wideband radio. The smart home device 107 determines a range and a direction to the target accessory device 101 via the ranging sensor of the wireless controller during a bi-directional ranging operation. The smart home device 107 determines a proximity value that represents a target position estimate for the target accessory device 101 relative to the smart home device 107 based on the range and direction to the target accessory device 101. In some embodiments, the proximity value may be weighted higher for a smart home device that has ranging capabilities and is within range of the target accessory device 101 to perform bidirectional communication and determine a range and direction to the target accessory device 101.

The smart home device 107 determines whether the received beacon signal for the wireless device contains the at least one public key (806). A comparison is performed between the at least one public key and a key within the received beacon signal, if any. If the received key matches at least one public key associated with the target accessory device 101, then the wireless device is the target accessory device 101 associated with the mobile device 102. In some embodiments, the smart home device 107 may have a set of public keys for the target accessory device 101 that are expected to be broadcast over periods of time.

In some embodiments, as shown in FIG. 3 with wireless accessory 201, the target accessory device 101 (e.g., an implementation of wireless accessory 201) periodically broadcasts a beacon signal 301 that includes device status information and a beacon identifier. The beacon identifier is a public key derived from a shared secret (e.g., anti-tracking secret) that is established during the public key exchange between the mobile device 102 and target accessory device 201 as shown in FIG. 3. Additionally, the target accessory device 101 can periodically perform a public key derivation to generate a new public key and begin broadcasting the new public key as the beacon identifier. The public key is a K-byte key, with a new K-byte key generated every M minutes. As such, the mobile device 102 may provide the set of public keys expected for multiple periods of time (e.g., M minute periods of time).

The smart home device 107 sends the location information based on the comparison result (808). If the wireless device is the target accessory device as determined by the key comparison (806), then the location information for the target accessory device 101 is sent to the mobile device 102. In some embodiments, location information is sent to the mobile device 101 when the proximity value exceeds a threshold value for proximity values. The smart home device 107 sends to the mobile device 102 location information including, but not limited to the following: at least one of the target position estimate for the target accessory device 101, a location of the smart home device 107, at least one proximity value, and/or an indicator for the direction to the target accessory device 101. For example, the RSSI for the beacon signal can be transmitted along with the location data for the wireless accessory device 101 and/or the smart home device 107. In an embodiment, the mobile device 102 may receive all location information from the smart home devices 107 and prioritizes receipt of location information from smart home devices 107 with comparatively higher proximity values. Alternatively, the mobile device 102 may receive location information from a prioritized list of smart home devices 107 with comparatively higher proximity values as determined by a smart home device 107 and/or the device locator server 170 that receives proximity values from the smart home devices 107. The location information provided to the mobile device 102 may include information on the location of the smart home device 107 within the location environment. For example, the RSSI data can then be used to determine the distance of the wireless accessory 201 from the smart home device 107 and assist in triangulation on the mobile device 102.

If the smart home device 107 receives, from the mobile device 102, an indication that the smart home device 107 has a higher proximity value (e.g., is prioritized for providing location information) as compared to at least one other proximity value from a set of smart home electronic devices, then the smart home device 107 establishes a wireless radio connection with the target accessory device 101 and may perform tasks on behalf of the target accessory device 101.

In an embodiment, the smart home device 107 may have a wireless controller including a ranging sensor. The smart home device 107 may perform ranging operations via an ultra-wideband radio. The smart home device 107 determines a range and a direction to the target accessory device 101 via the ranging sensor of the wireless controller during a bi-directional ranging operation. The smart home device 107 determines a target position estimate for the target accessory device 101 relative to the smart home device 107 based on the range and direction to the target accessory device 101. The smart home device 107 receives requests from the target accessory device 101 including at least one of a request to play audio, send target position of the target accessory device 101 to the owner mobile device 102, and/or send location information for the smart home device 107 to the owner mobile device 102. The smart home device 107 may request, the target accessory device 101, increase a beaconing rate to provide more data in order to locate the target accessory device 101.

In an embodiment, presenting the signal strength proximity view and the ranging view includes presenting at least one indicator of the proximity value to the target wireless accessory device 101 and the indicator for the direction to the target wireless accessory device 101 along the trajectory in the device locator UI 204.

Figure 9:
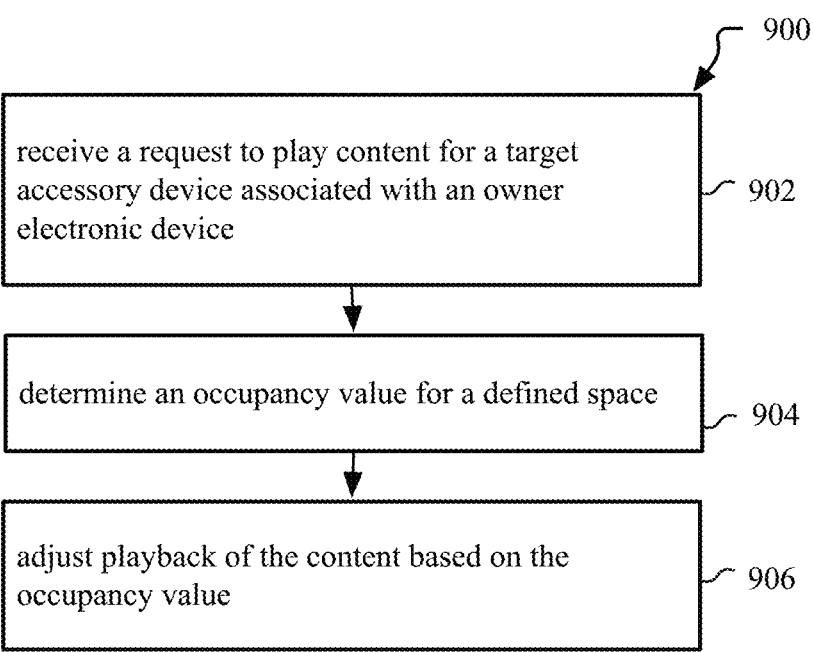
FIG. 9 illustrates a flowchart for a method to enable location services for a target accessory device, according to an embodiment.

FIG. 9 illustrates a flowchart 900 for a method to enable location services for a target accessory device, according to an embodiment. A request is received by the smart home device 107 to play content for a target accessory device 101 associated with an owner electronic device 102 (902). In an embodiment, one or more smart home devices 107 that are designated as proximate to the target accessory device 101 may receive the content for playback from the target accessory device 101, mobile device 102, another smart home device 107, and/or the device locator server 170. In some embodiments, the smart home device 107 may have access to a user account with content for playback designated for the target accessory device 101.

The smart home device 107 determines an occupancy value for the defined space (904). The smart home device 107 may use sensors, microphones, wireless signals from mobile devices, known user routines, machine learning, and/or any other method for determining whether the defined space is occupied. In some embodiments, received radar data and/or audio data may be used by the smart home device 107 to detect a person is in a defined space, entering a defined space, and/or leaving a defined space within the location environment. Content playback settings may be specified for various conditions, including, but not limited to the following: number of occupants, identified occupant (e.g., established connection with a user device), volume preferences, privacy concerns, and/or preferences for particular defined space. In an embodiment, when the user of the mobile device 102 is detected entering the defined space, the playback of the content may be adjusted. The user of the mobile device 102 may be detected with any of the following: a sensor (e.g., microphone, radar, audio data, etc.), within range to exchange wireless communication signals or establish a wireless connection with one or more smart home devices 107, provide a voice command to the smart home device 107, voice recognition for owner of the mobile device 102, or mobile device 102 owner routine. The smart home devices 107 may communicate with other smart home devices 107 about the movement of occupants (including the user of the mobile device 102). The smart home devices 107 may have a map for the locations in defined spaces of the other smart home devices 107 and know which smart home device 107 is proximate to another smart home device 107.

Playback of the content is adjusted based on the occupancy value (906). The playback of the content may be adjusted by increasing or decreasing volume, increasing or decreasing speed of playback, altering brightness, switching content, turning off a screen, and/or any other adjustment to playback of content. In an embodiment, the content is not played if someone other than a user of the mobile device 102 is located in the defined space. In some embodiments, all smart home devices 107 proximate to the target accessory device 101 may play the content to aid the mobile device 101 actively searching. For example, the playback may cease or be adjusted to be lower as the user enters the defined space and/or forms a wireless connection with the target accessory device 101 and/or smart home device 107.

Figure 10A:
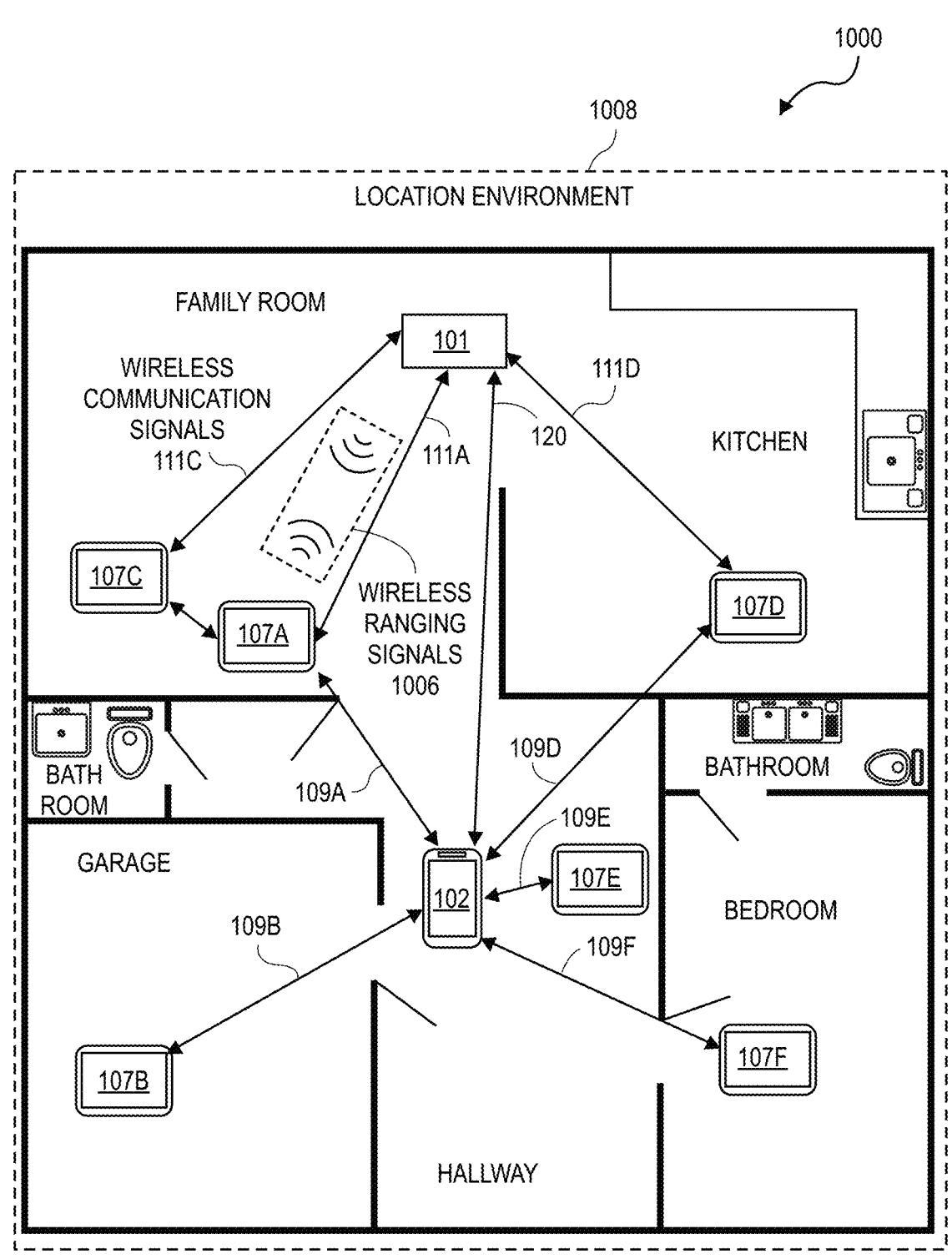
FIG. 10A-B illustrates device locator systems to enable location services for a target accessory device, according to an embodiment.
Figure 10B:
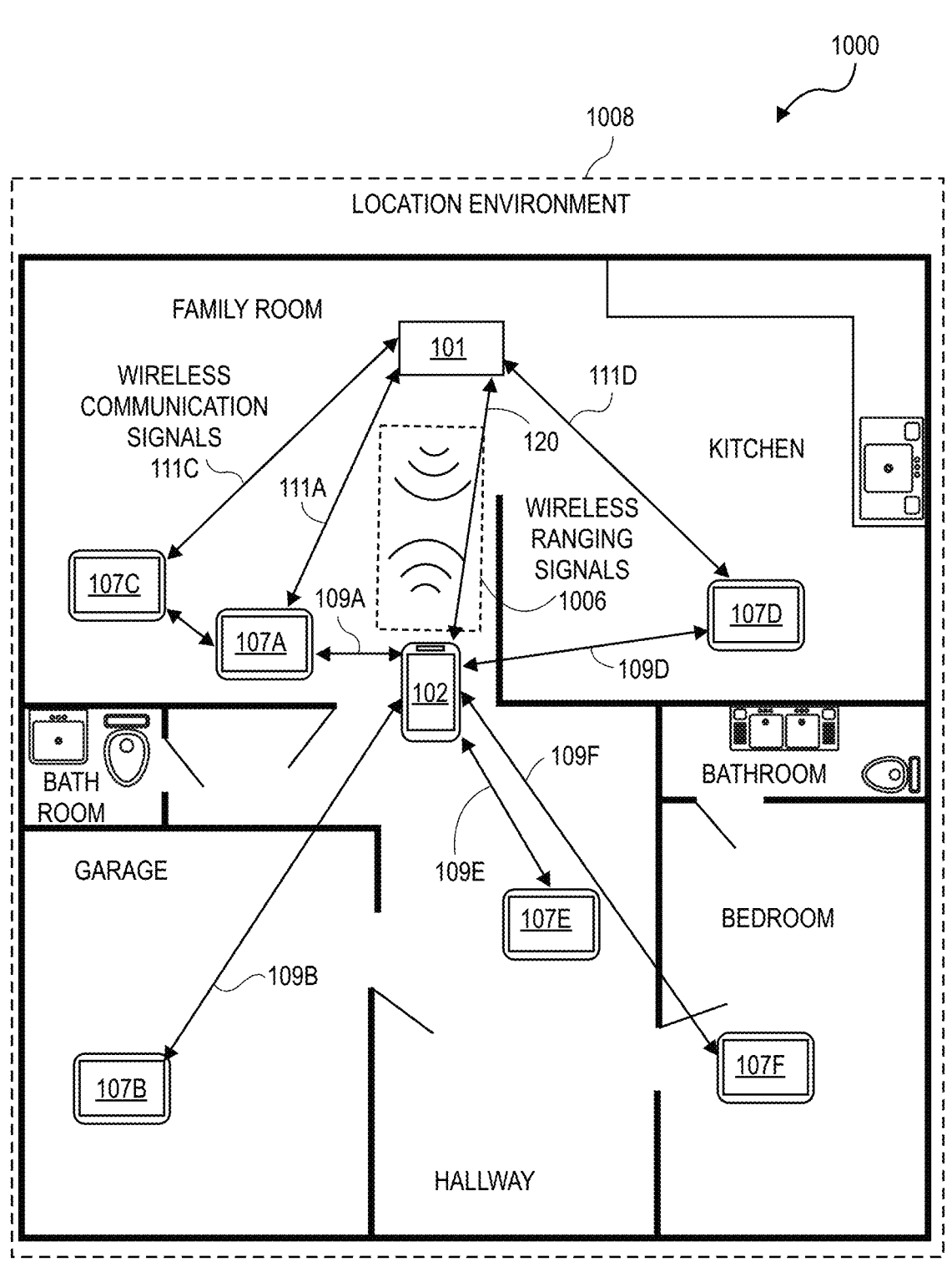

FIGS. 10A-10B illustrates a system 1000 to enable distributed device location finding for a target accessory device, according to an embodiment. As shown in FIG. 10A, one embodiment provides a system 1000 to enhance location finding with a device locator UI 204 when in a location environment 1008 with at least one smart home device (e.g., 107A, 107C, and 107D) that is proximate to a target accessory device 101 to be located and/or a smart home device (e.g., 107B, 107E, and 107F) that is not proximate to the wireless accessory device 101. The mobile device 102 may request 109 (e.g., request shown 109A-F) each of the smart home devices 107 (e.g., 107A-F) to act as a network of search agents to detect beacon signals (e.g., illustrated with communication signals 111A, 111C, and 111D) from accessory device 101 and provide location information in response. The request from the mobile device 102 may include a data packet with one or more public keys that the mobile device 102 expects the accessory device 101 to contain within beacon signals. Each of the smart home devices 107 may attempt to detect and respond to the request with RSSI values (if any) and location information for the defined space of the smart home device 107. The location information may include the defined space in the location environment, such as the room name in the location environment 1008 as shown with "Family Room," "Kitchen", "Bedroom," "Hallway," "Garage," and/or "Bathroom." The defined space within a location environment 1008 may be assigned when the smart home device 107 is registered during set up and the association to the defined space for each smart home device 107 may be stored in a database, in an embodiment. The smart home devices 107A, 107C, and 107D may be proximate to the wireless accessory device 101 to aid in locating the wireless accessory device 101, if the smart home devices 107 receive wireless communication signals 111 (e.g., 111A, 111C, and 111D, detect beacon signals) from the wireless accessory device 101. As shown, wireless ranging signals 1006 may optionally be sent between smart home device 107A and accessory device 101 and the ranging information may be provided with location information sent to the mobile device 102 to aid in locating the accessory device 101. The location information in response to the request may be sent to the mobile device 102, the device locator server 170, and/or communicated to other smart home devices 107 in the location environment 1008. In the location environment 1008 of FIG. 10A, smart home devices 107A, 107C and 107D may provide location information with RSSI values and a comparison between the received RSSI values may be performed by the mobile device 102, smart home device(s) 107, and/or the device locator server 170 to determine which of the smart home devices 107 may assist mobile device 102 in locating the accessory device 101. In an embodiment, the smart home device 107 may communicate location information by synchronizing data across the devices using approaches provided in co-pending U.S. patent application Ser. No. 16/420, 892, filed May 23, 2019, entitled "Data Synchronization across Multiple Devices," which is incorporated by reference herein its entirety.

The location information from the various smart home devices 107 may be used to update the device locator UI 204 for locating the accessory device 101. The location information may be used to update the device locator UI 204 with identifiers for the defined space corresponding to the smart home device(s) 107, estimates on distance and direction of the accessory device 101 as determined by the smart home devices 107 and/or by the mobile device 102 with the location information from the smart home devices 107, and/or ranging information. The location information may be used to update the proximity and/or ranging views of the device locator UI 204.

In some embodiments, the smart home devices (e.g., 107A and/or 107C) that have available processing capabilities my play a media file on behalf or in combination with accessory device 101 to supplement and/or amplify the audio for accessory device 101. Optionally, smart home devices 107A and 107C may be paired as a group with mobile device 102 and communicate location information to the mobile device 102 as shown with 109A. As mobile device 102 is moved closer to accessory device 101, the mobile device 102 may receive beacon signals as shown with wireless communication signals 120 from accessory device 101 and/or form a wireless connection (e.g., BLE, etc.) with accessory device 101. The wireless communication signals can be used to provide a proximity view on the device locator UI 204 and ranging information 1006 exchanged between the smart home device 107A and the accessory device 101 may be used to create a ranging view on the device locator UI 204 from the perspective of the smart home device 107A and/or the mobile device 102. As shown in FIG. 10B, the mobile device 102 moves closer to the accessory device 101 and may be able to exchange wireless ranging signals 1006 directly with the accessory device 101 to provide a ranging view on the device locator UI 204.

Figure 11:
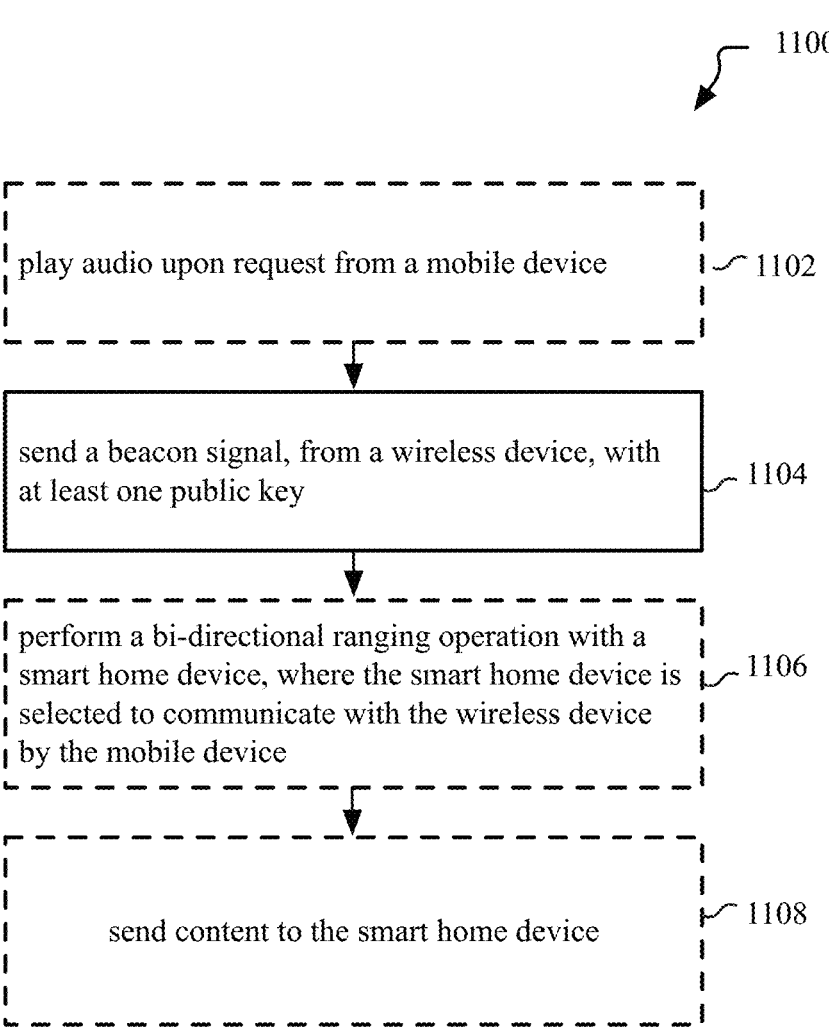
FIG. 11 illustrates a flowchart for a method to enable location services for a target accessory device, according to an embodiment.

FIG. 11 illustrates a flowchart 1100 for a method to enable location services for a target accessory device from the perspective of the target accessory device 101, according to an embodiment. Various signals and content (e.g., audio content) may be provided by the target wireless accessory 101 to the smart home device 107 to aid in assisting the mobile device 102 to locate the target wireless accessory 101. Optionally, the mobile device 102 requests that the target accessory device 101 plays audio. In some embodiments, the audio played by the target accessory device 101 can be encoded with information that allows the smart home device 107 to recognize the target accessory device 101.

In some embodiments, the accessory device 101 sends a beacon signal with at least one public key (1104). As shown in FIG. 3, the accessory device 101 sends a beacon signal that contains a key from a set of rolling public keys that are expected from the accessory device over time. The rolling public key enable the smart home device 107 to identify the accessory device 101 over a period of time that correspond to each rolling key from the set of rolling public keys. Additionally, the target accessory device 101 can periodically perform a public key derivation to generate a new public key and begin broadcasting the new public key as the beacon identifier. The public key is a K-byte key, with a new K-byte key generated every M minutes. As such, the mobile device 102 may provide the set of public keys expected for multiple periods of time (e.g., M minute periods of time).

Optionally, the accessory device 101 performs a bi-directional ranging operation with a smart home device 107 (1106). The smart home device 107 is selected to communicate with the accessory device 101 by an owner mobile device 102, a set of smart home devices 107, and/or the device locator server 170. In an embodiment, the smart home device 107 is selected after comparison of proximity values of candidate smart home devices 107. The proximity value may need to meet a threshold value for a proximity value and/or have a higher value than proximity values of other smart home devices 107. The ranging process may be performed between the smart home device 107 and the target accessory device 101 to determine a distance from and direction to the target accessory device 101. When the mobile device 102 is within wireless communication range to the target accessory device 101, then the smart home device 102 may provide to the mobile device 102 ranging information and the mobile device 102 may perform bi-directional ranging operations with the target accessory device 101 directly. Ranging information from the smart home device 107 and the mobile device 102 may be used to present the ranging view, proximity view and/or a combination thereof described herein.

Optionally, in an embodiment, the location and direction of the target accessory device 101 may be estimated by the smart home device 107 with the use of at least one microphone when the target accessory device 101 plays audio. In an embodiment, the smart home device 107 may have one or more directional microphones in order to estimate that the audio played by the target accessory device 101 came from a particular location or direction.

In an embodiment, the accessory device 101 sends, the smart home device 107, media content (e.g., audio, video, etc.) to play on behalf of the accessory device 101 (1108). The accessory device 101 may receive a request to send media content to the smart home device 107 to amplify a sound that the accessory device is able to provide with speakers.

FIG. 12 illustrates a flowchart 1200 for a method to enable location services for a target accessory device, according to an embodiment. The mobile device 102 (e.g., an owner electronic device) sends a request to one or more smart home devices 107 for location data for a target accessory device 101 associated with an owner electronic device (e.g., mobile device 102) (1202). The mobile device 102 may be the owner electronic device or a mobile device 102 that has been given privileges to search on behalf of the owner electronic device for a period of time. The request may be wirelessly communicated to the smart home device 107 and/or via an interface (e.g., a voice user interface with verbal commands, a user interface, etc.). In an embodiment, the smart home device 107 is a voice activated virtual assistant and the smart home device 107 may receive a verbal command for location information for the target accessory device 101 that is interpreted as a request for location information which includes a data packet with the at least one public key for the target accessory device 101. The mobile device 102 and/or device locator server 170 may either directly send the at least one public key to the smart home device 107 and/or provide access to the at least one public key via a user account. The at least one public key may be associated with a user account of the owner electronic device and/or a user account of another mobile device granted access to a set of keys to locate the target accessory device by the owner electronic device. The smart home device 107 may access the at least one public key for the target accessory device 101 from the user account associated with the owner mobile device 102. For example, if the smart home device 107 has access to the user account or a shared user account (e.g., a family account, a trusted friend account, etc.) for the owner of the mobile device 102, then the smart home device 107 may identify beacon signals from the target accessory device 101 using one or more rolling public keys (e.g., rolling public key for wireless accessory 201 in FIG. 3) for the target accessory device 101 that is paired with the mobile device 102.

The mobile device 102 receives one or more proximity values from one or more smart home devices (1204). The proximity value may be a representation for an estimated distance, a relative distance, and/or a relative position from the target accessory device 101. The wireless device is a candidate for the target accessory device 101 within the location environment and the proximity value may be calculated before, after, and/or in parallel with determining whether the wireless device is the target accessory device 101 in step 806. The proximity value may be used to prioritize the use of one or more smart home devices over another smart home device 107 for providing location information to assist the mobile device 102 in locating the target accessory device 101.

The mobile device presents within a user interface location information from at least one smart home device from the one or more smart home devices based on a comparison between a proximity value and a threshold value (1206). In an embodiment, the mobile device 102 may consider a variety of factors to determine which smart home device(s) 107 from a set of smart home device(s) to utilize for location services, including, but not limited to, the following: location information from each smart home device 107, services and/or hardware supported by the smart home device(s) 107, proximity of smart home device 107 to accessory device 201 and/or mobile device 102, and/or device status of the smart home device 107. For example, a smart home device 107 from a set of smart home devices that has one of the higher RSSI values and available processing capabilities (e.g., not executing a higher priority process) may be relied on for the device locator services. In an embodiment, the smart home device 107 may be compared to a threshold RSSI value and must exceed the threshold value to be selected as a smart home device 107 to aid in the finding process.

Figure 21:
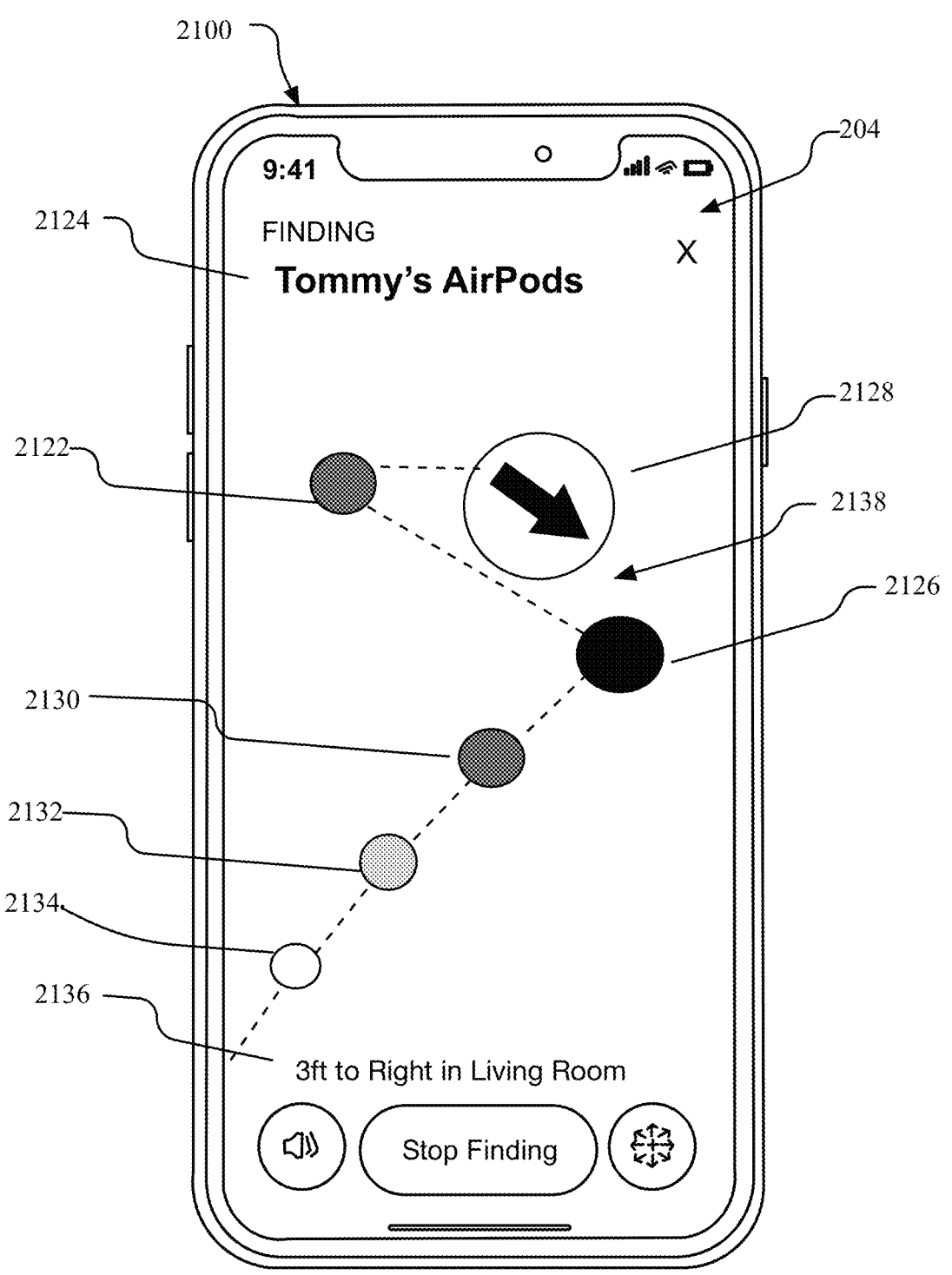
Figure 22:
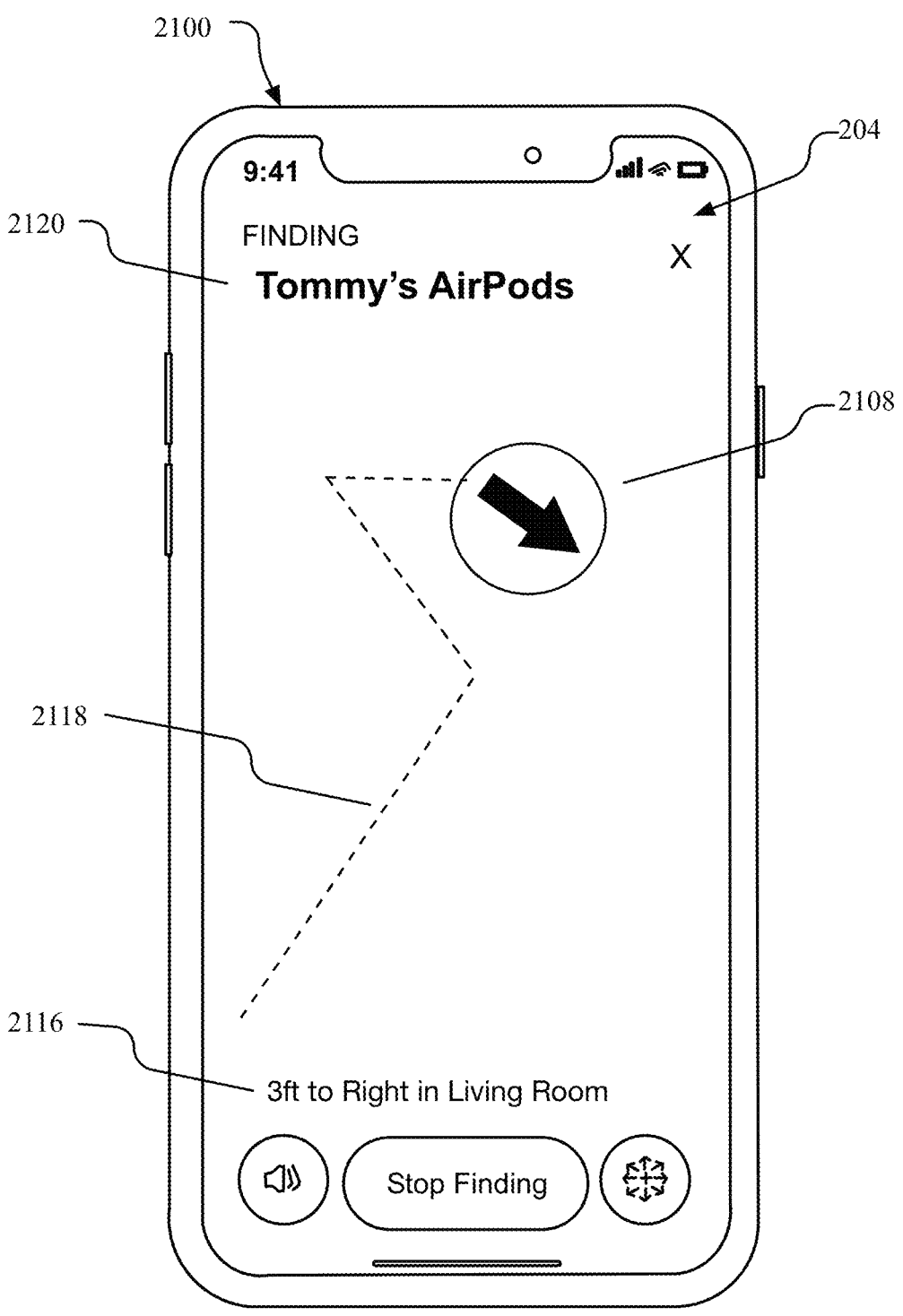

At least one of a ranging view, a proximity view, or a ranging and proximity view are selectively presented within the user interface of the owner electronic device 102 (1208). Location information may be used to provide proximity and/or ranging information. In some embodiments, the user interface 204 may indicate the defined space (e.g., room) that the smart home device 107 is located in. In another embodiment, signal strength and/or ranging data may be used to assist the user in locating the target accessory device 101. For example, in an embodiment, signal strength measurements from signals received at the smart home device 107 and/or mobile device 102 may be used to represent locations that are proximate to the target accessory device 101. Optionally, within the user interface 204, proximity indicators may be displayed to indicate when the mobile device 102 is proximate to the target device as the user is moving through the location environment. FIGS. 21 and 22 described below illustrate a device locator user interface 204 on mobile device 2100, according to embodiments described herein. A "proximity view" 2104 as shown in FIG. 21 may present proximity information using visualization techniques to present the proximity information in relation to a target wireless accessory device. In an embodiment, the proximity view 2104 has visual indicators, such as user interface elements, positioned along a trajectory 2118 presented within the user interface 204 to represent a path the user has taken in their search. In some embodiments, the mobile device may move to be within a threshold range of the target device allowing for a ranging process using communication between the mobile device and the target device to determine a distance from and direction to the target device. As shown in FIG. 22, a "ranging view" 2120 of the user interface 204 may provide a distance measurement 2116 in addition to the direction or defined space identifier 2108 to the target device that may be selectively displayed. The proximity view 2104 for finding the target device may be used when ranging data for a ranging view 2120 is not available due to a target device not being within a threshold range of the mobile device, a target device transmitter not being in a field of view of a receiver at the mobile device, and/or a mobile device does not have a nearly unobstructed view to the target device, in some embodiments. In some embodiments, user interface 204 proximity view may present ranging information using ranging measurements and present an arrow 2128 indicating the direction of the target wireless accessory device 201 and the distance 2136 to the target wireless accessory device 201.

FIG. 13 illustrates a flowchart 1300 for a method to enable location services for a target accessory device, according to an embodiment. As shown in FIG. 13, method 1300 includes an operation in which an electronic device launches a device locator UI (1301). In response to launching the device locator UI, the electronic device, which can be a mobile device as described herein, or another electronic device associated with the same cloud services account as the mobile electronic device, can perform an operation to generate a set of public keys that were included within a beacon signal broadcast by a wireless accessory during a first period (1302). The first period can be, for example, a previous 24 hours. The electronic device is aware of the frequency in which the wireless accessory is to generate new public keys and, using a shared secret generated with the wireless accessory, can generate a set of public keys that correspond with the keys that were generated by the wireless accessory over the first period. The electronic device can then send the set of public keys within a request for the device locator server to send location data that corresponds with the set of public keys (1303). In one embodiment, location data sent by the server in response to the request will be encrypted using the public key transmitted as the beacon identifier of the wireless accessory. The electronic device can decrypt the encrypted location data received by the server using the private key generated during the initial pairing with the wireless accessory (1304). The electronic device can then process the location data to determine the highest probability location for the wireless accessory (1305). In an embodiment, the location data may include data for accessory devices 201 in the device group.

Processing the location data can include a variety of different operations. In one embodiment the location data includes latitude and longitude information along with a timestamp for which the location was determined. The electronic device can triangulate based on the timestamps and remove noise or outlier locations. In one embodiment the location data specifies the location of the finder device that detected the beacon. The location data can additionally include UWB ranging information and/or RSSI information for the beacon detected by the finder device. The electronic device can analyze the UWB ranging information and/or RSSI information in context with the device locations to develop a more accurate location for the wireless accessory. Data that can be transmitted by a finder device and used for location processing is shown in FIG. 14 and described below.

As shown in FIG. 14, method 1400 includes operations that can be performed if the device locator server does not have location data to provide to the electronic device in response to a request. In the case of a device group, the electronic device (e.g., mobile device 102) may provide the location data on devices in the device group. The electronic device can generate a first set of public keys that were included within a beacon signal broadcast by wireless accessory during a first period (1401). The first period can be, for example, 24 hours, although other initial search periods can be used. The electronic device can perform a subsequent operation to request the device locator server to send location data that corresponds with first set of public keys (1402). If the data is returned by the server (1403, "yes"), the electronic device can decrypt the location data received from the server using the private key that corresponds with the set of public keys (block 1409).

If data is not returned by the server (1403, "no") the electronic device can generate a second set of public keys that were included within a beacon signal broadcast by the wireless accessory during a second period (1404). The second period can be the 24, 48, or another number of hours before the first period. The electronic device can then request for the device locator server to send data that corresponds with the second set of public keys (1405). If, in response to the request, data is returned by the server (1406, "yes"), method 1400 can proceed to block 1409, in which the electronic device decrypts the received data. If data is not returned by the server (1406, "no"), or the server sends a reply that indicates data is not available, method 1400 includes for the electronic device can widen the search time by requesting successively older time periods until the max period is reached (1407).

Figure 15:
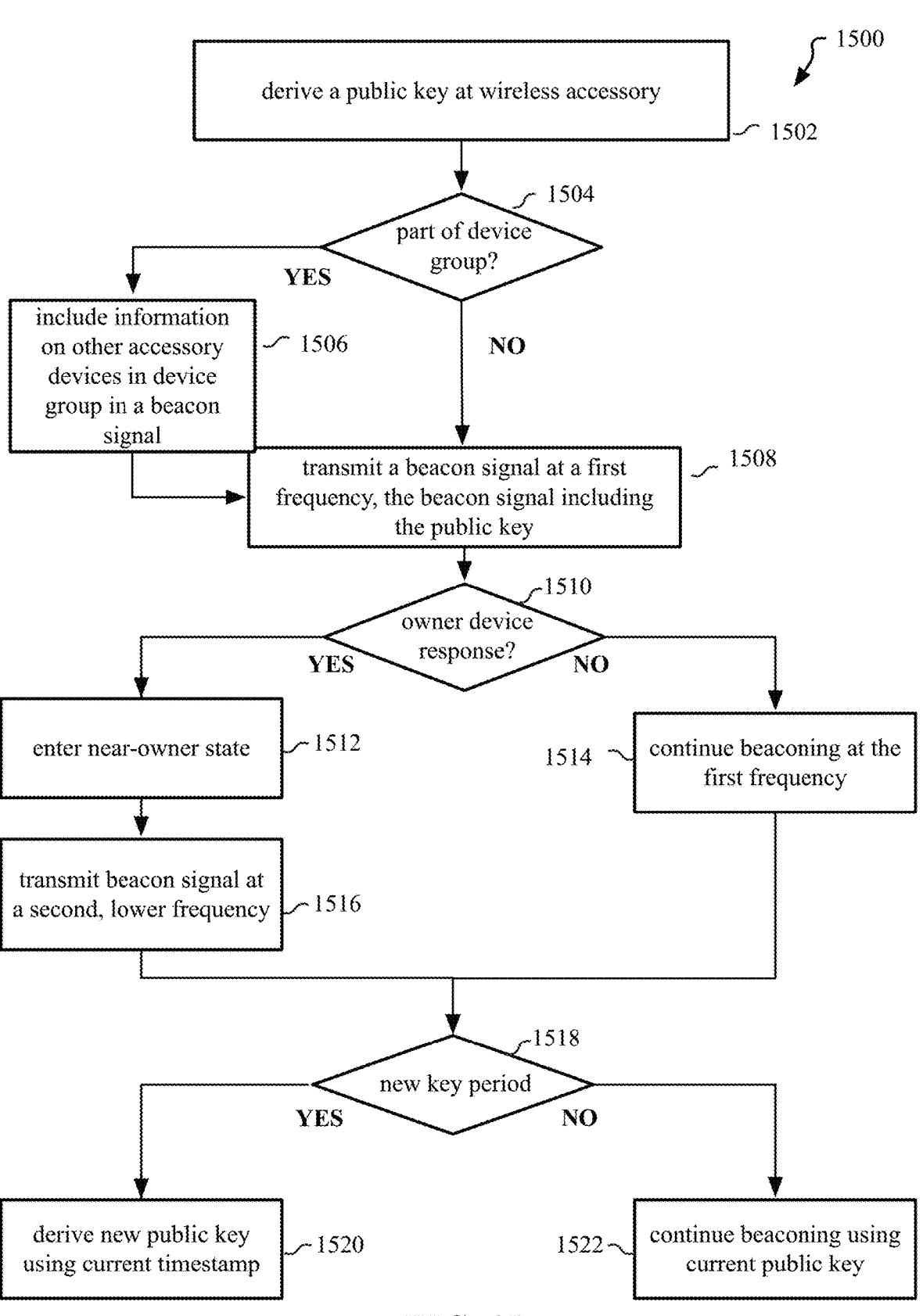

FIG. 15 is a flow diagram illustrating a method 1500 of broadcasting a signal beacon at a wireless accessory, according to an embodiment. Aspects of method 1500 are also illustrated in FIG. 2 and FIG. 3. Method 1500 includes for the wireless accessory to derive a public key (block 1502). The public key can be derived based on a shared secret and a timestamp determined based on a clock or time keeping device of the wireless accessory. Optionally, a determination is made as to whether the wireless accessory is part of a device group (1504). If the wireless accessory is part of a device group, the status information and/or verifiable information for other accessory devices 201 in the device group is provided in the beacon signal (1506). The wireless accessory may indicate status information and/or verifiable information, such as whether any other wireless accessory in the device group is proximate, connected (physically or wirelessly), and/or any other information on the other wireless accessories in the device group 105. In an embodiment, a set of bits included in the beacon signal may represent each accessory in the device group and setting a Boolean value (e.g., true (1) or false (0)) may indicate whether the respective accessory is proximate and/or connected to the accessory device sending the beacon signal. Alternatively, information is not provided on a device group, if the wireless accessory is not part of a device group (1504). The wireless accessory can then transmit a beacon signal at a first frequency, where the beacon signal includes the public key (1508). The first frequency can vary, and in one embodiment is one beacon every two seconds.

After transmitting a beacon signal, the wireless accessory can listen for a response from the owner device (1510). If the wireless signal receives a response from the owner device (1510, "yes"), the wireless accessory can enter a near-owner state (1512) and begin to transmit the beacon signal at a second, lower frequency (1516). If the wireless accessory does not receive a response from the owner device (1510, "no"), the wireless accessory can continue beaconing at the first frequency (1514).

Method 1500 additionally includes for the wireless device, while beaconing, to rotate the public key every M minutes, where the value of M can vary across embodiments and/or based on the device state. Based on a timer expiration, counter, or another mechanism, the wireless accessory can determine whether the accessory has entered a new key period (1518). While the wireless accessory has not entered a new key period (1518, "no"), the accessory can continue beaconing using the current public key (1522). When the wireless accessory detects that it has entered a new key period (1518, "yes") the accessory can derive a new public key using the current timestamp (1520). In one embodiment the new public key can be derived using an existing public key, a timestamp, and an anti-tracking secret.

Figure 16:
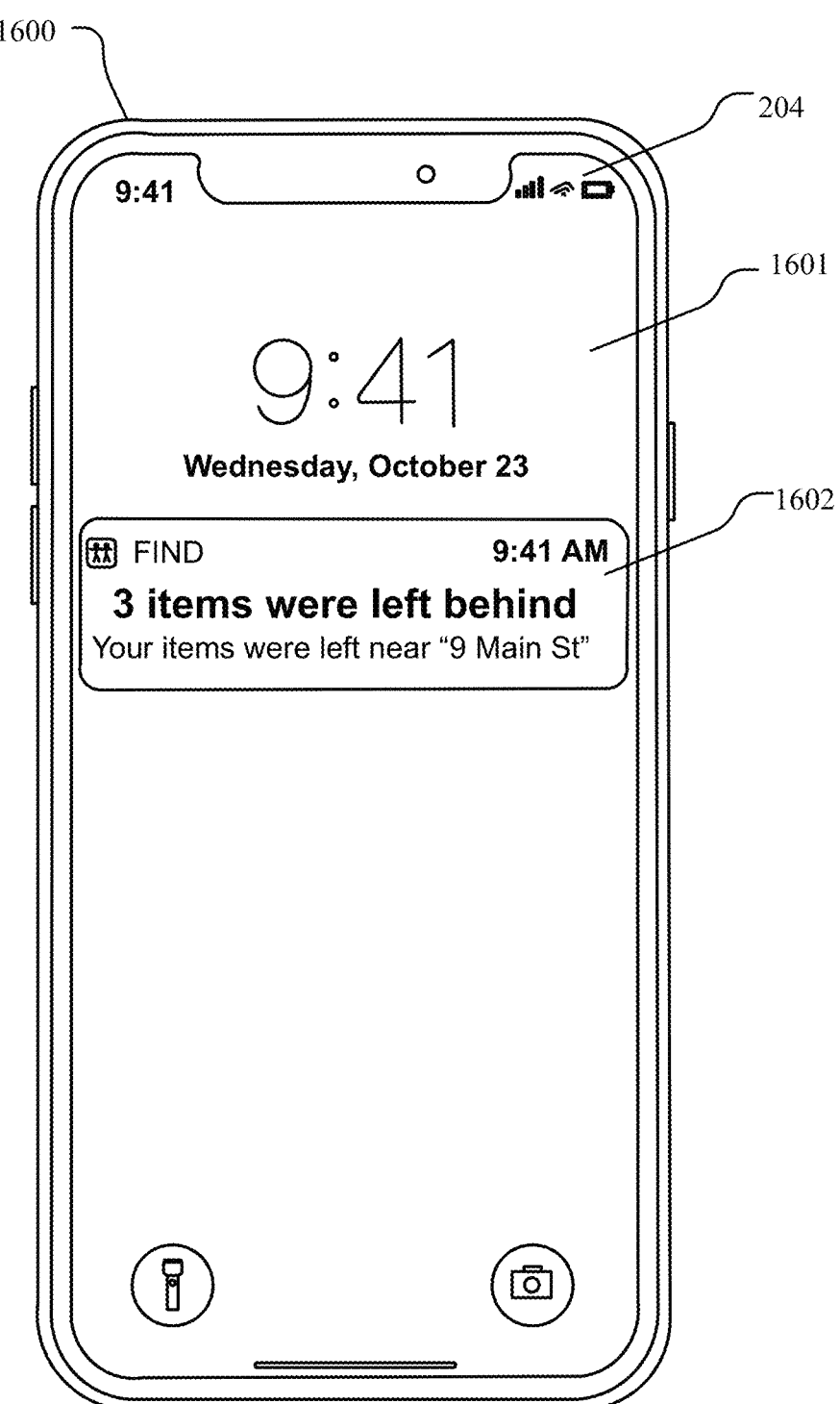
FIGS. 16-22 illustrate device locator user interfaces, according to one or more embodiments.
Figure 17:
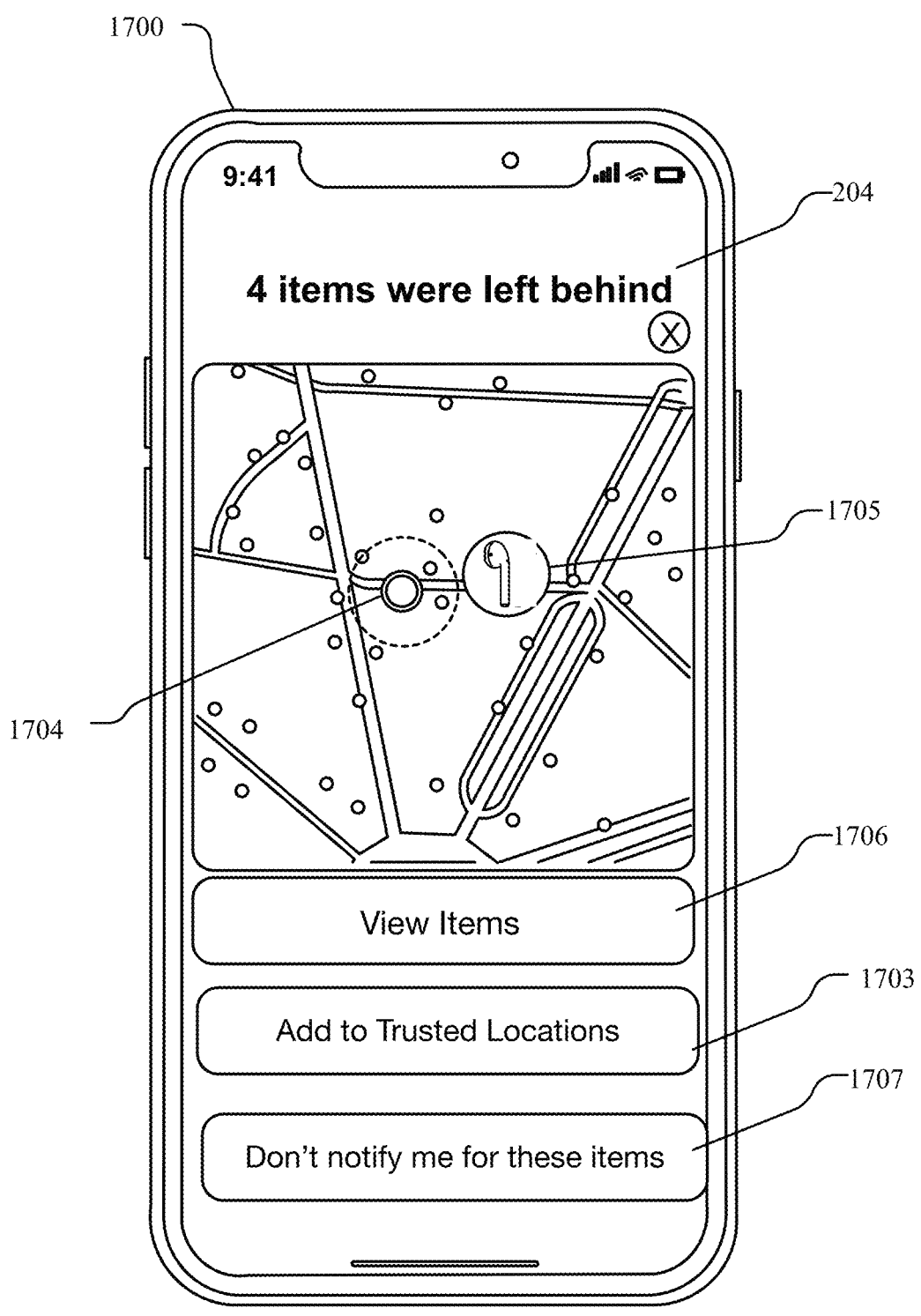

FIG. 16-21 illustrate a device locator UI 204, according to an embodiment. FIG. 16 shows a first graphical user interface of the device locator UI 204, according to an embodiment, which shows a notification for various wireless accessories of a user. The device locator UI 204 can cause the presentation of separation notifications 1602 on the home screen 1601 of the electronic device 1600. FIG. 17 shows a second graphical user interface of the device locator UI 204, according to an embodiment, which enables an accessory device left behind to be viewed on a map, add trusted location, or request cease notifications for items.

Figure 18:
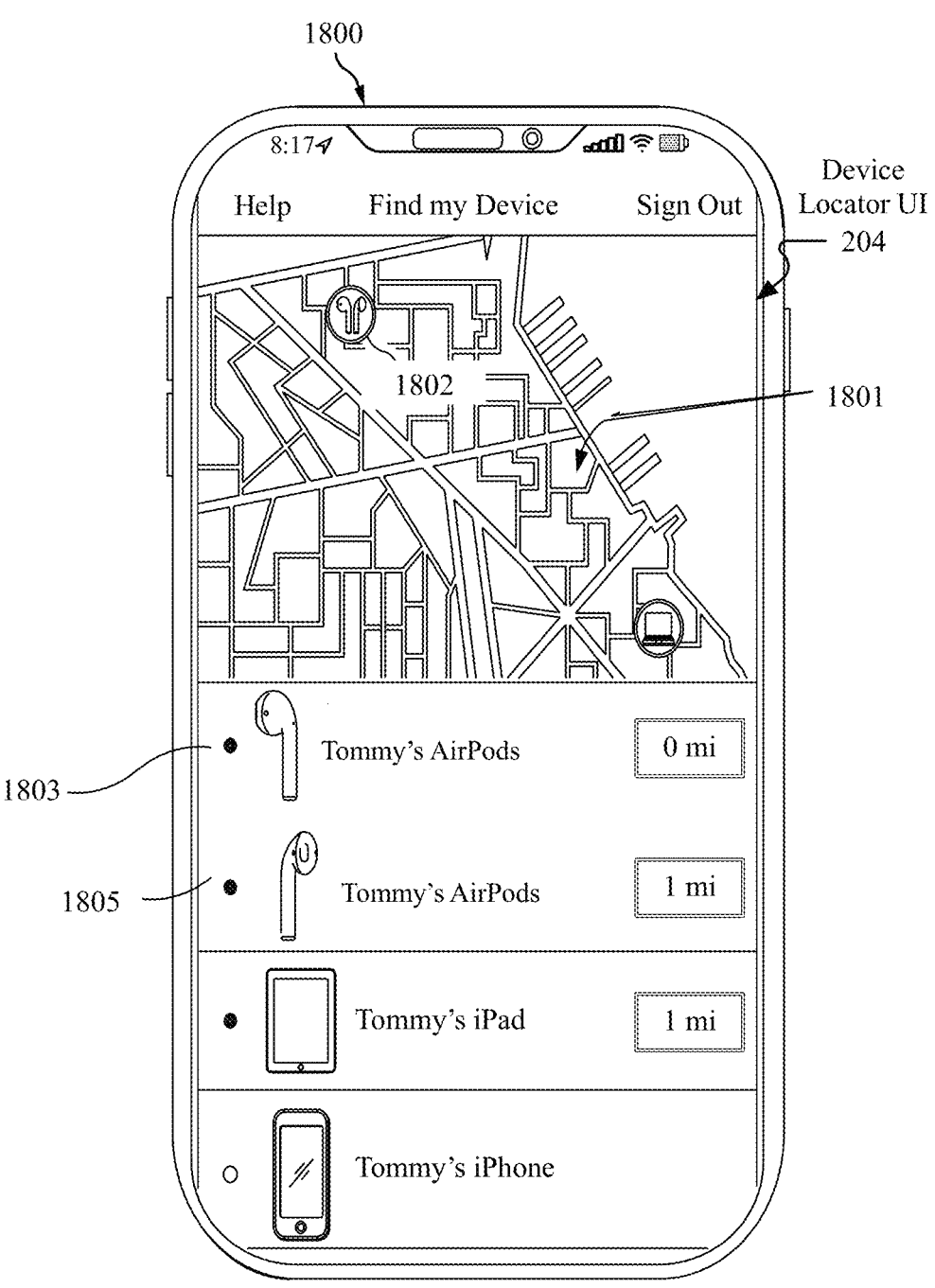
Figure 19:
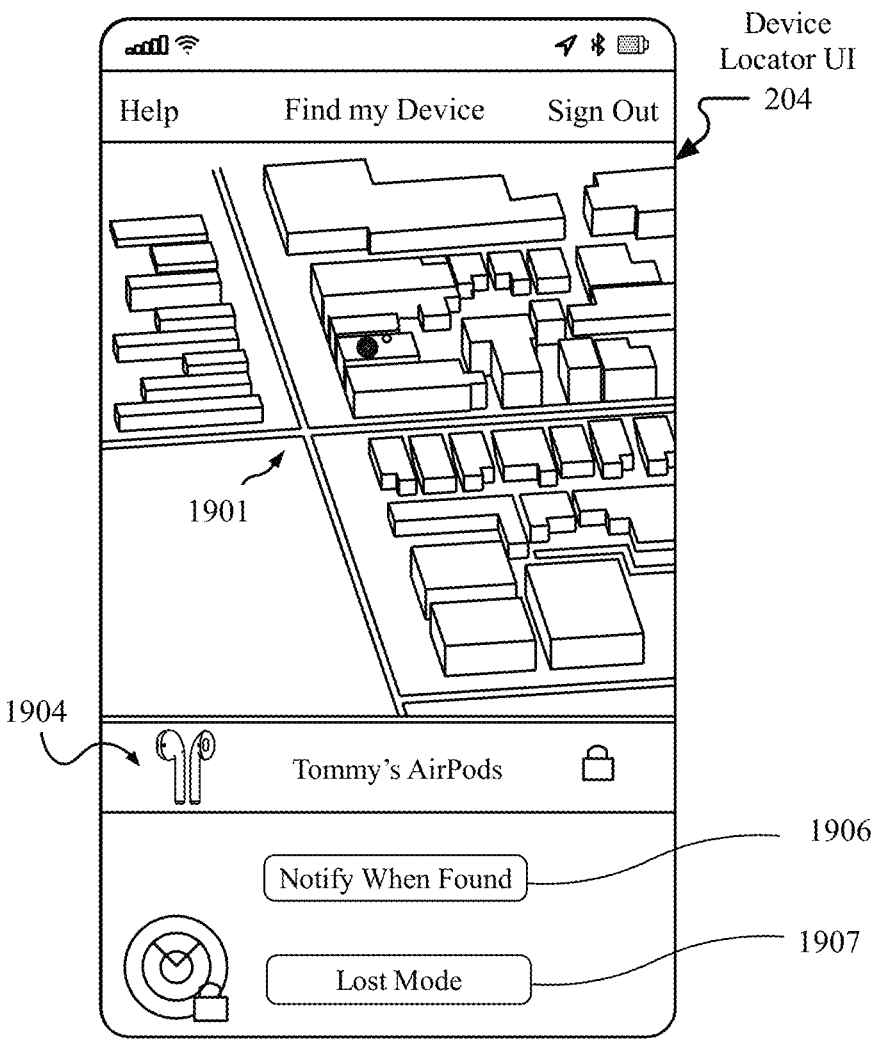
Figure 20:
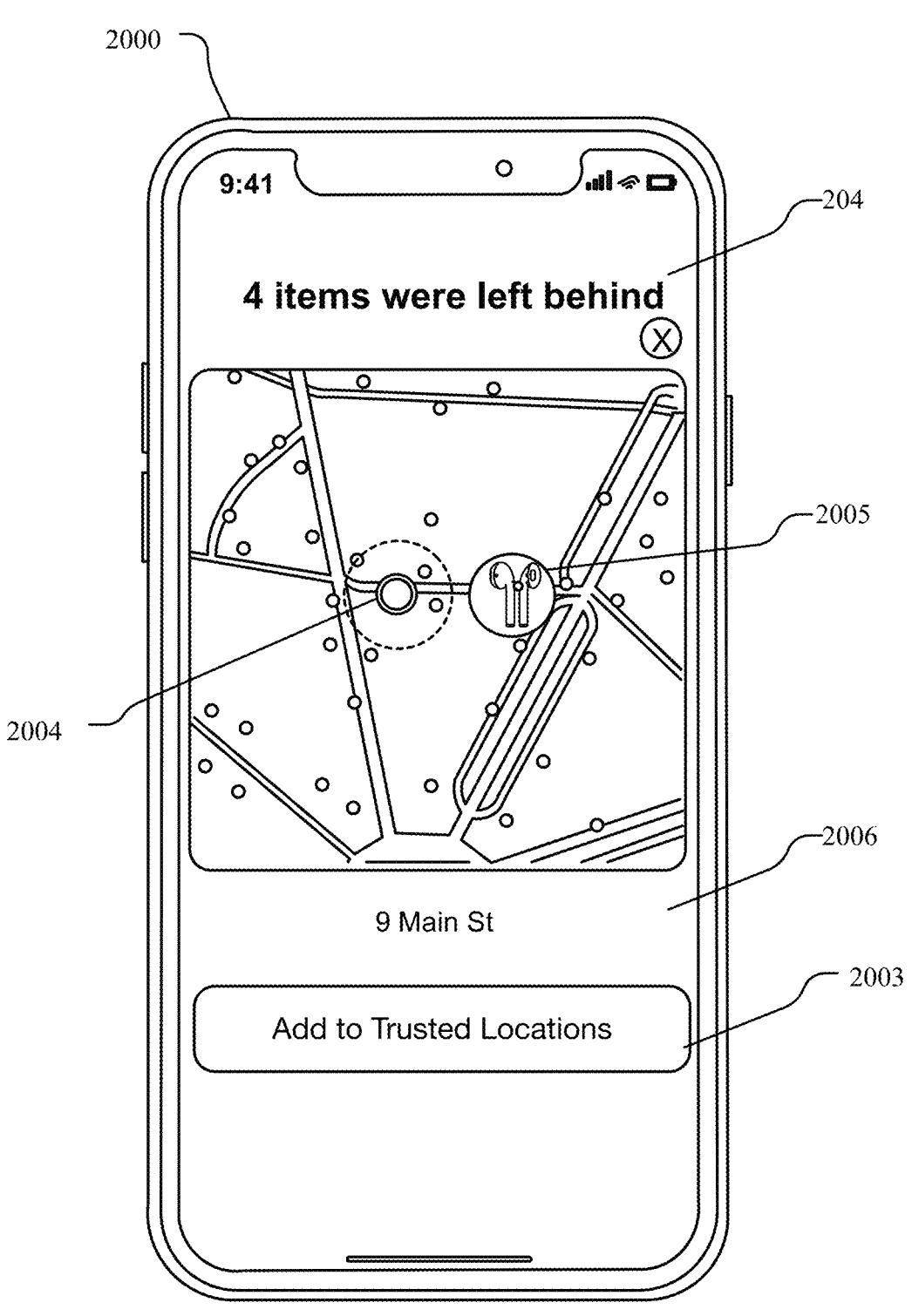

FIG. 18 shows a third graphical user interface of the device locator UI 204, according to an embodiment, which enables accessory devices 101 including devices in a device group to be found in a map. FIG. 19 shows a fourth graphical user interface of the device locator UI 204, according to an embodiment, which enables a wireless accessory to be set to a lost mode or notify when found. The device locator UI 204 can be displayed on an electronic device, which can be a mobile device 102, or any other type of electronic device described herein. FIG. 20 shows a fifth graphical user interface of the device locator UI 204, according to an embodiment, which enables a wireless accessory to add trusted locations. FIG. 21 shows a sixth graphical user interface of the device locator UI 203, according to an embodiment, which enables a proximity view using signal strength measurements.

As shown in FIG. 17, the device locator UI 204 can present a unified graphical interface on electronic device 1700 through which multiple different types of devices and accessories can be located, including wireless devices with network or cellular access and wireless accessories without native network access. The device locator UI 204 can include a map 1704 with a marker 1705 that shows the current or last known location of a wireless accessory device 101. The marker 1705 can be an icon, image, graphic or any other user interface element that identifies the accessory and conveys a location for the accessory. A selectable element 1707 in the device locator UI 204 can present an option to request not to be notified about particular items. A selectable element 1706 in the device locator UI 204 can present a description or name of the wireless device or accessory and can show an estimated distance between the wireless device or accessory and the current location of the electronic device 1800 as shown in FIG. 18.

As shown in FIG. 18, the device locator UI 204 can present a user interface that enables a wireless accessory view the item 1803 and 1805 as well as the distance from electronic device 1800. The third user interface can be displayed, in one embodiment, in response to the selection of the selectable element 1706 shown in FIG. 18. The third user interface can present a user interface element 1802 that represents and/or describes the wireless accessory in question, as well as the map 1801 and marker 1802 that show the current or last known location of the wireless accessory.

As shown in FIG. 19, the device locator UI 204 can present a fourth graphical user interface that enables a wireless accessory to be set to a lost mode. In one embodiment, when a wireless accessory cannot be located via the device locator UI 204, the map 1901 will not display a marker that indicates a location for the accessory. The device locator UI 204 can present the user interface element 1904 that represents and/or describes the wireless accessory in question and a set of selectable user interface elements. One selectable user interface element 1906 can present the option to notify the user when the accessory is found. When notify when found is enabled, in one embodiment the wireless accessory can be placed into a light lost mode. The electronic device associated with the device locator UI 204 can generate a set of public keys that the wireless accessory will broadcast with the beacon signal during a future time period (e.g., next 24 hours, next 48 hours, etc.). If a signal is detected by a finder device or smart home device 107 using one of the future keys, the device locator server can notify one or more electronic devices associated with the user.

Another selectable user interface element 1907 can place the wireless accessory into an explicit lost mode. When explicitly placed into lost mode, the wireless accessory 101 will be unable to be paired with other devices until the accessory 101 is unlocked by the user or owner that places the device into lost mode. When sending a request to place a wireless accessory into lost mode, the requesting user can be required to enter authenticating information to ensure that the requesting user is authorized to request that lost mode be initiated on the lost accessory. The authenticating information can include a username or password associated with an account of a user, such as a cloud services account to which the user, electronic device, and wireless accessory are associated. The authenticating information can also include biometric information, such as a fingerprint or facial recognition data.

In one embodiment, a message and contact information provided by the requesting user can be displayed on the user device to alert a person who finds the lost wireless accessory on how to contact the requesting user. In one embodiment, the message and contact information can be displayed when another user attempts to pair another electronic device with the lost accessory.

As shown in FIG. 20, the device locator UI 204 can present a fifth graphical user interface in electronic device 2000 that enables a designation of a known location 2006 shown on map with 2004 to become a trusted location with selection of selectable element 2003. The fifth user interface can be displayed, in one embodiment, in response to the selection of the selectable element 1803 shown in FIG. 18. The device locator UI 204 can present the user interface element 2005 that represents and/or describes the wireless accessory in question.

As shown in FIG. 21, the device locator UI 204 can present a sixth graphical user interface in electronic device 2100 with a proximity view using signal strength measurements. The proximity view 2124 for finding "Tommy's AirPods" has indicators 2122, 2126, 2130, 2132, 2134, and 2128 at various positions along the trajectory 2138 within the user interface 204. Each indicator may be user interface element that represent proximity to target wireless accessory device 101 by size, color, shape, color gradient, shading, pattern, and/or any other technique for a visual indicator within a user interface. The indicators may be displayed along the trajectory 2138 as the user moves through the location environment. In the proximity view 2104, for example, indicator 2106 is closest to the target wireless accessory device 101 along the trajectory 2138 that the user has taken to find the target wireless accessory device 101 as represented by a darker color and/or a larger size as compared to the other indicators. In some embodiments, user interface 204 proximity view may present ranging information using ranging measurements and present an arrow 2128 indicating the direction of the target wireless accessory device 101 and the distance 2136 to the target wireless accessory device 101. In other embodiments, the trajectory may be shown in a grid, such as a hexagonal grid, with visual indicators consisting of areas of the grid designated with colors, gradients, shading, and/or any other marking along the trajectory plotted on the grid to represent the proximity values for signal strength observed in the respective areas by the mobile device 102, smart home device 107, and/or combination thereof.

In an embodiment, signal strength measurements from signals received at the mobile device 102 may be used to represent proximity to the target device within the user interface to indicate when the mobile device 102 is proximate to the target device. In some embodiments, signal strength information for the smart home device 107 along the trajectory may be used to present proximity indicators. A "proximity view" 2104 as shown in FIG. 21 may present proximity information using visualization techniques to present the proximity information in relation to a target wireless accessory device 101. In an embodiment, the proximity view 2104 has visual indicators, such as user interface elements, positioned along a trajectory 2118 presented within the user interface 204 to represent a path the user has taken in their search. In some embodiments, the visual indicators may be user interface elements displayed with a gradient, a color, a color gradient, a size, a shape, and/or any other visualization technique to represent signal strength values and a corresponding defined proximity category (e.g., far, near, close, etc.) to the target device. The proximity view 2104 for finding "Tommy's AirPods" has indicators 2102, 2106, 2110, 2112, and 2114 at various positions along the trajectory 2118 within the user interface 204. Each indicator in proximity view 2104 may be a user interface element that represents proximity to the target wireless accessory device by size and color gradient within the user interface 204. In the proximity view 2104, for example, indicator 2106 is closest to the target wireless accessory device along the trajectory 2118 that the user has taken to find the target wireless accessory device as represented by a darker color and/or a larger size as compared to the other indicators (e.g., 2102, 2110, 2112, and 2114). Embodiments may use visual inertial odometry (VIO) measurements to determine the trajectory 2118 that a user has taken in their search within the user interface 204. VIO provides the ability to track movement of a mobile device 102 in an arbitrary initial coordinate system. VIO techniques include the analysis of a sequence of images collected with the mobile device to estimate camera motion over the sequence of images.

In some embodiments, the mobile device 102 may move to be within a threshold range of the target accessory device 101 allowing for a ranging process using communication between the mobile device and the target device to determine a distance from and direction to the target device. As shown in FIG. 22, a "ranging view" 2120 of the user interface 204 may provide a distance measurement 2116 in addition to the direction 2108 to the target device that may be selectively displayed. The proximity view 2104 for finding the target device may be used when ranging data for a ranging view 2120 is not available due to a target device not being within a threshold range of the mobile device 102, a target device 101 transmitter not being in a field of view of a receiver at the mobile device, and/or a mobile device does not have a nearly unobstructed view to the target device 101, in some embodiments. The target device 101 may be in the field of view of the mobile device 102 when the receiver at the mobile device 102 has a view of the target device transmitter.

In some embodiments, ranging using an ultra-wide band (UWB) radio technology may provide relatively precise location or distance data to a target device, but are a relatively short-range radio frequency (RF) technology wireless communication as compared to Bluetooth technology. In some embodiments, it may be desirable for the mobile device 102 UWB receiver to have line of sight to the target device transmitter or a nearly unobstructed view of the target device to obtain optimal ranging location data. Proximity information in the form of signal strength information may be relatively less precise in comparison to UWB but may cover a wider area offering a longer range and can be obtained from advertisements before the wireless radio connection is established. Bi-directional communication may not be established with a connection between the mobile device and target device, but advertisements received at the mobile device may provide signal strength information to aid in directing the user to the target device prior to establishing a connection, in some embodiments. The combination of techniques may assist the user in locating the target wireless accessory device.

In various embodiments, description is made with reference to figures. However, certain embodiments may be practiced without one or more of these specific details, or in combination with other known methods and configurations. In the following description, numerous specific details are set forth, such as specific configurations, dimensions and processes, etc., in order to provide a thorough understanding of the embodiments. In other instances, well-known semiconductor processes and manufacturing techniques have not been described in particular detail in order to not unnecessarily obscure the embodiments. Reference throughout this specification to "one embodiment" means that a particular feature, structure, configuration, or characteristic described in connection with the embodiment is included in at least one embodiment. Thus, the appearances of the phrase "in one embodiment" in various places throughout this specification are not necessarily referring to the same embodiment. Furthermore, the particular features, structures, configurations, or characteristics may be combined in any suitable manner in one or more embodiments.

In the discussion that follows, a computing device that includes a touch-sensitive display is described. It should be understood, however, that the computing device may include one or more other physical user-interface devices. The various applications that may be executed on the device may use at least one common physical user-interface device, such as the touch-sensitive surface. One or more functions of the touch-sensitive surface as well as corresponding information displayed on the device may be adjusted and/or varied from one application to the next and/or within a respective application. In this way, a common physical architecture (such as the touch-sensitive surface) of the device may support the variety of applications with user interfaces that are intuitive and transparent.

Some processes are described below in terms of some sequential operations. However, it should be appreciated that some of the operations described may be performed in a different order. Moreover, some operations may be performed in parallel rather than sequentially.

FIG. 23 is a block diagram illustrating an exemplary API architecture, which may be used in some embodiments of the invention. As shown in FIG. 23, the API architecture 2300 includes the API-implementing component 2310 (e.g., an operating system, a library, a device driver, an API, an application program, software or other module) that implements the API 2320. The API 2320 specifies one or more functions, methods, classes, objects, protocols, data structures, formats and/or other features of the API-implementing component that may be used by the API-calling component 2330. The API 2320 can specify at least one calling convention that specifies how a function in the API-implementing component receives parameters from the API-calling component and how the function returns a result to the API-calling component. The API-calling component 2330 (e.g., an operating system, a library, a device driver, an API, an application program, software or other module), makes API calls through the API 2320 to access and use the features of the API-implementing component 2310 that are specified by the API 2320. The API-implementing component 2310 may return a value through the API 2320 to the API-calling component 2330 in response to an API call.

It will be appreciated that the API-implementing component 2310 may include additional functions, methods, classes, data structures, and/or other features that are not specified through the API 2320 and are not available to the API-calling component 2330. It should be understood that the API-calling component 2330 may be on the same system as the API-implementing component 2310 or may be located remotely and accesses the API-implementing component 2310 using the API 2320 over a network. While FIG. 23 illustrates a single API-calling component 2330 interacting with the API 2320, it should be understood that other API-calling components, which may be written in different languages (or the same language) than the API-calling component 2330, may use the API 2320.

The API-implementing component 2310, the API 2320, and the API-calling component 2330 may be stored in a machine-readable medium, which includes any mechanism for storing information in a form readable by a machine (e.g., a computer or other data processing system). For example, a machine-readable medium includes magnetic disks, optical disks, random-access memory; read only memory, flash memory devices, etc.

Figure 24:
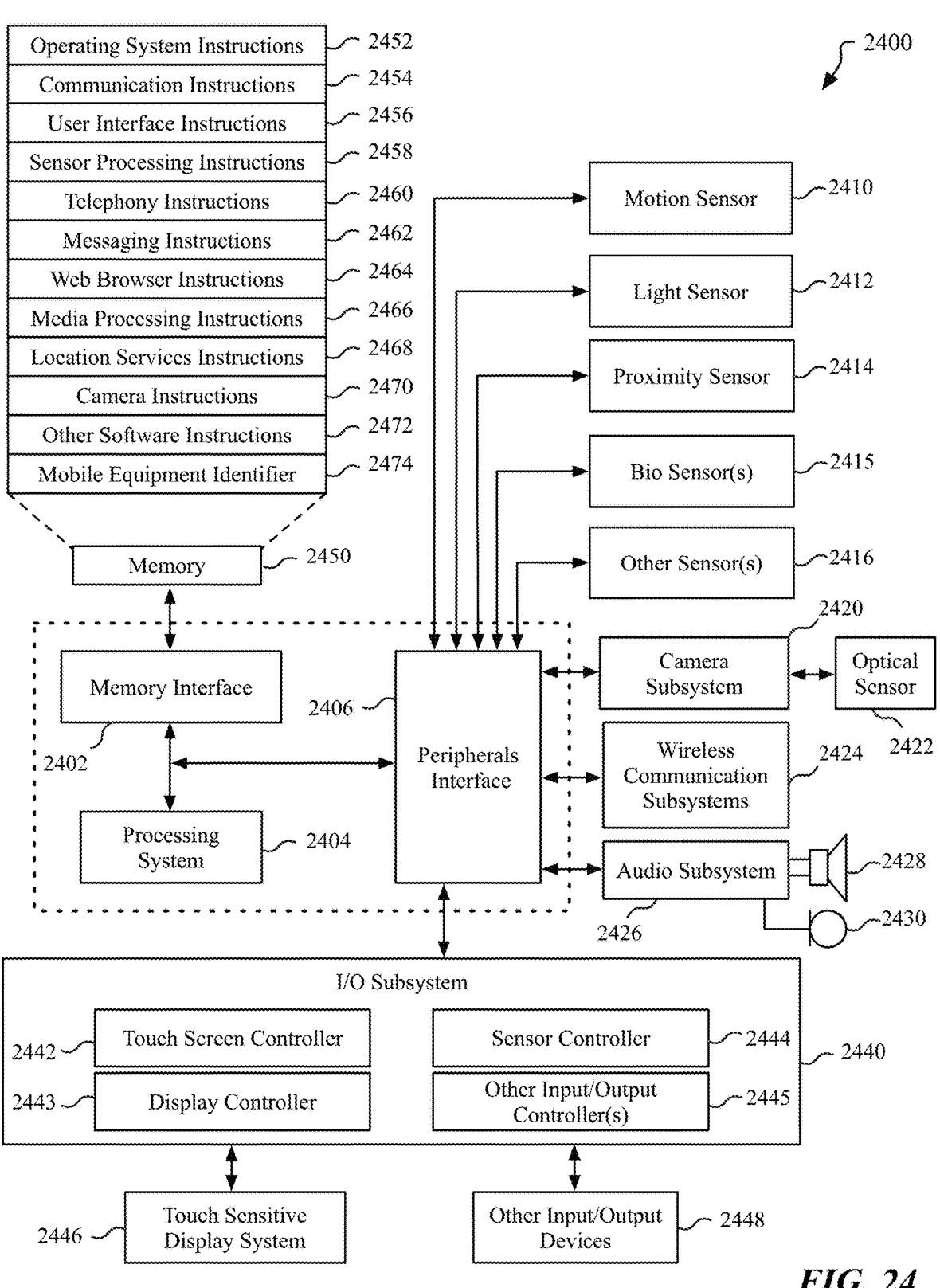
FIG. 24 is a block diagram of a device architecture for a mobile or embedded device, according to an embodiment.

FIG. 24 is a block diagram of a device architecture 2400 for a mobile or embedded device, according to an embodiment. The device architecture 2400 includes a memory interface 2402, a processing system 2404 including one or more data processors, image processors and/or graphics processing units, and a peripherals interface 2406. The various components can be coupled by one or more communication buses or signal lines. The various components can be separate logical components or devices or can be integrated in one or more integrated circuits, such as in a system on a chip integrated circuit.

The memory interface 2402 can be coupled to memory 2450, which can include high-speed random-access memory such as static random-access memory (SRAM) or dynamic random-access memory (DRAM) and/or non-volatile memory, such as but not limited to flash memory (e.g., NAND flash, NOR flash, etc.).

Sensors, devices, and subsystems can be coupled to the peripherals interface 2406 to facilitate multiple functionalities. For example, a motion sensor 2410, a light sensor 2412, and a proximity sensor 2414 can be coupled to the peripherals interface 2406 to facilitate the mobile device functionality. One or more biometric sensor(s) 2415 may also be present, such as a fingerprint scanner for fingerprint recognition or an image sensor for facial recognition. Other sensors 2416 can also be connected to the peripherals interface 2406, such as a positioning system (e.g., GPS receiver), a temperature sensor, or other sensing device, to facilitate related functionalities. A camera subsystem 2420 and an optical sensor 2422, e.g., a charged coupled device (CCD) or a complementary metal-oxide semiconductor (CMOS) optical sensor, can be utilized to facilitate camera functions, such as recording photographs and video clips.

Communication functions can be facilitated through one or more wireless communication subsystems 2424, which can include radio frequency receivers and transmitters and/or optical (e.g., infrared) receivers and transmitters. The specific design and implementation of the wireless communication subsystems 2424 can depend on the communication network(s) over which a mobile device is intended to operate. For example, a mobile device including the illustrated device architecture 2400 can include wireless communication subsystems 2424 designed to operate over a GSM network, a CDMA network, an LTE network, a Wi-Fi network, a Bluetooth network, or any other wireless network. In particular, the wireless communication subsystems 2424 can provide a communications mechanism over which a media playback application can retrieve resources from a remote media server or scheduled events from a remote calendar or event server.

An audio subsystem 2426 can be coupled to a speaker 2428 and a microphone 2430 to facilitate voice-enabled functions, such as voice recognition, voice replication, digital recording, and telephony functions. In smart media devices described herein, the audio subsystem 2426 can be a high-quality audio system including support for virtual surround sound.

The I/O subsystem 2440 can include a touch screen controller 2442 and/or other input controller(s) 2445. For computing devices including a display device, the touch screen controller 2442 can be coupled to a touch sensitive display system 2446 (e.g., touch-screen). The touch sensitive display system 2446 and touch screen controller 2442 can, for example, detect contact and movement and/or pressure using any of a plurality of touch and pressure sensing technologies, including but not limited to capacitive, resistive, infrared, and surface acoustic wave technologies, as well as other proximity sensor arrays or other elements for determining one or more points of contact with a touch sensitive display system 2446. Display output for the touch sensitive display system 2446 can be generated by a display controller 2443. In one embodiment, the display controller 2443 can provide frame data to the touch sensitive display system 2446 at a variable frame rate.

In one embodiment, a sensor controller 2444 is included to monitor, control, and/or processes data received from one or more of the motion sensor 2410, light sensor 2412, proximity sensor 2414, or other sensors 2416. The sensor controller 2444 can include logic to interpret sensor data to determine the occurrence of one of more motion events or activities by analysis of the sensor data from the sensors.

In one embodiment, the I/O subsystem 2440 includes other input controller(s) 2445 that can be coupled to other input/control devices 2448, such as one or more buttons, rocker switches, thumb-wheel, infrared port, USB port, and/or a pointer device such as a stylus, or control devices such as an up/down button for volume control of the speaker 2428 and/or the microphone 2430.

In one embodiment, the memory 2450 coupled to the memory interface 2402 can store instructions for an operating system 2452, including portable operating system interface (POSIX) compliant and non-compliant operating system or an embedded operating system. The operating system 2452 may include instructions for handling basic system services and for performing hardware dependent tasks. In some implementations, the operating system 2452 can be a kernel.

The memory 2450 can also store communication instructions 2454 to facilitate communicating with one or more additional devices, one or more computers and/or one or more servers, for example, to retrieve web resources from remote web servers. The memory 2450 can also include user interface instructions 2456, including graphical user interface instructions to facilitate graphic user interface processing.

Additionally, the memory 2450 can store sensor processing instructions 2458 to facilitate sensor-related processing and functions; telephony instructions 2460 to facilitate telephone-related processes and functions; messaging instructions 2462 to facilitate electronic-messaging related processes and functions; web browser instructions 2464 to facilitate web browsing-related processes and functions; media processing instructions 2466 to facilitate media processing-related processes and functions; location services instructions including GPS and/or navigation instructions 2468 and Wi-Fi based location instructions to facilitate location based functionality; camera instructions 2470 to facilitate camera-related processes and functions; and/or other software instructions 2472 to facilitate other processes and functions, e.g., security processes and functions, and processes and functions related to the systems. The memory 2450 may also store other software instructions such as web video instructions to facilitate web video-related processes and functions; and/or web shopping instructions to facilitate web shopping-related processes and functions. In some implementations, the media processing instructions 2466 are divided into audio processing instructions and video processing instructions to facilitate audio processing-related processes and functions and video processing-related processes and functions, respectively. A mobile equipment identifier, such as an International Mobile Equipment Identity (IMEI) 2474 or a similar hardware identifier can also be stored in memory 2450.

Each of the above identified instructions and applications can correspond to a set of instructions for performing one or more functions described above. These instructions need not be implemented as separate software programs, procedures, or modules. The memory 2450 can include additional instructions or fewer instructions. Furthermore, various functions may be implemented in hardware and/or in software, including in one or more signal processing and/or application specific integrated circuits.

Figure 25:
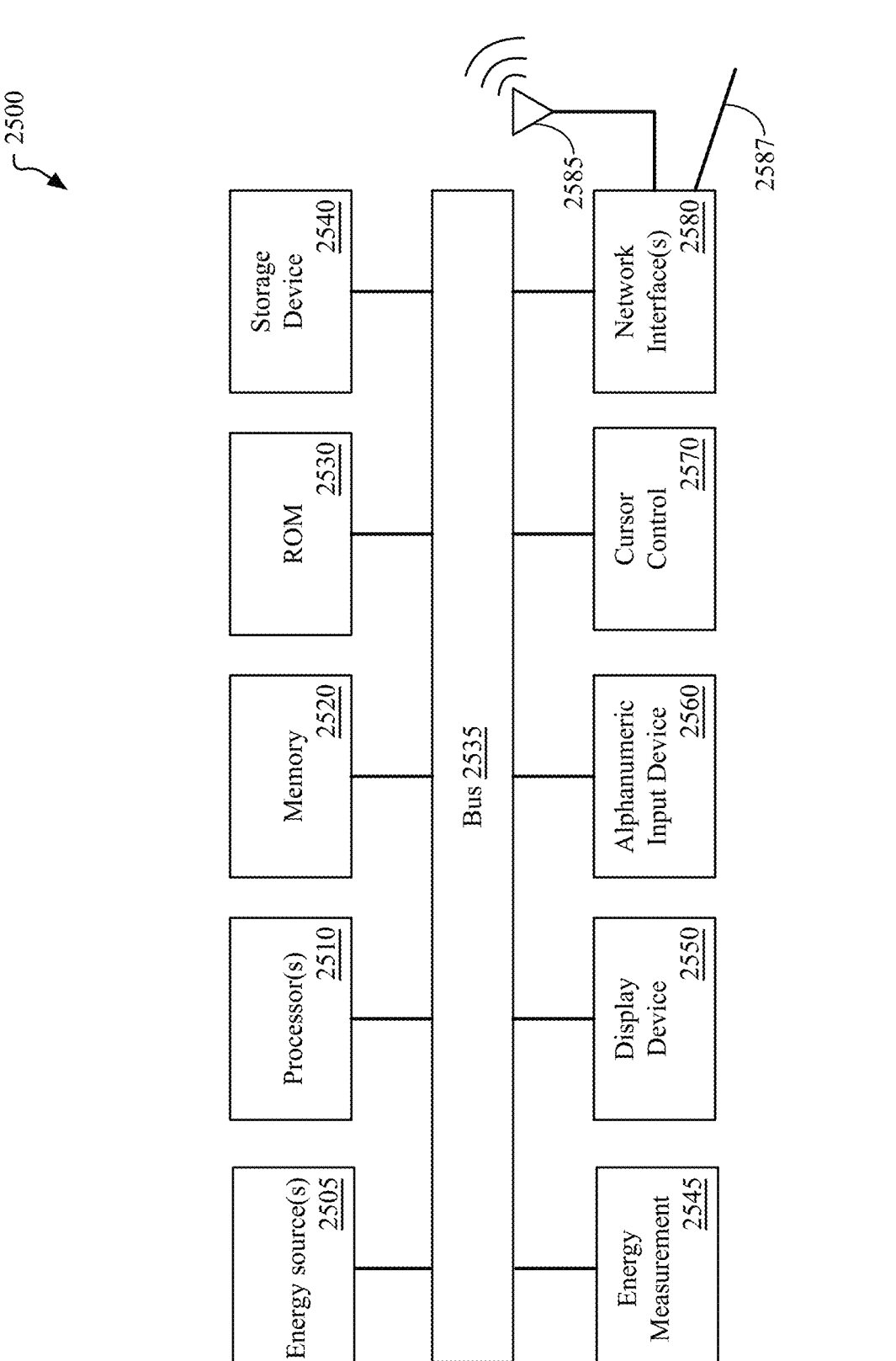
FIG. 25 is a block diagram of a computing system, according to an embodiment.

FIG. 25 is a block diagram of a computing system 2500, according to an embodiment. The illustrated computing system 2500 is intended to represent a range of computing systems (either wired or wireless) including, for example, desktop computer systems, laptop computer systems, tablet computer systems, cellular telephones, personal digital assistants (PDAs) including cellular-enabled PDAs, set top boxes, entertainment systems or other consumer electronic devices, smart appliance devices, or one or more implementations of a smart media playback device. Alternative computing systems may include more, fewer and/or different components. The computing system 2500 can be used to provide the computing device and/or a server device to which the computing device may connect.

The computing system 2500 includes bus 2535 or other communication device to communicate information, and processor(s) 2510 coupled to bus 2535 that may process information. While the computing system 2500 is illustrated with a single processor, the computing system 2500 may include multiple processors and/or co-processors. The computing system 2500 further may include memory 2520 in the form of random access memory (RAM) or other dynamic storage device coupled to the bus 2535. The memory 2520 may store information and instructions that may be executed by processor(s) 2510. The memory 2520 may also be main memory that is used to store temporary variables or other intermediate information during execution of instructions by the processor(s) 2510.

The computing system 2500 may also include read only memory (ROM) 2530 and/or another data storage device 2540 coupled to the bus 2535 that may store information and instructions for the processor(s) 2510. The data storage device 2540 can be or include a variety of storage devices, such as a flash memory device, a magnetic disk, or an optical disc and may be coupled to computing system 2500 via the bus 2535 or via a remote peripheral interface.

The computing system 2500 may also be coupled, via the bus 2535, to a display device 2550 to display information to a user. The computing system 2500 can also include an alphanumeric input device 2560, including alphanumeric and other keys, which may be coupled to bus 2535 to communicate information and command selections to processor(s) 2510. Another type of user input device includes a cursor control 2570 device, such as a touchpad, a mouse, a trackball, or cursor direction keys to communicate direction information and command selections to processor(s) 2510 and to control cursor movement on the display device 2550. The computing system 2500 may also receive user input from a remote device that is communicatively coupled via one or more network interface(s) 2580.

The computing system 2500 further may include one or more network interface(s) 2580 to provide access to a network, such as a local area network. The network interface(s) 2580 may include, for example, a wireless network interface having antenna 2585, which may represent one or more antenna(e). The computing system 2500 can include multiple wireless network interfaces such as a combination of Wi-Fi, Bluetooth®, near field communication (NFC), and/or cellular telephony interfaces. The network interface(s) 2580 may also include, for example, a wired network interface to communicate with remote devices via network cable 2587, which may be, for example, an Ethernet cable, a coaxial cable, a fiber optic cable, a serial cable, or a parallel cable.

In one embodiment, the network interface(s) 2580 may provide access to a local area network, for example, by conforming to IEEE 802.11 wireless standards and/or the wireless network interface may provide access to a personal area network, for example, by conforming to Bluetooth standards. Other wireless network interfaces and/or protocols can also be supported. In addition to, or instead of, communication via wireless LAN standards, network interface(s) 2580 may provide wireless communications using, for example, Time Division, Multiple Access (TDMA) protocols, Global System for Mobile Communications (GSM) protocols, Code Division, Multiple Access (CDMA) protocols, Long Term Evolution (LTE) protocols, and/or any other type of wireless communications protocol.

The computing system 2500 can further include one or more energy sources 2505 and one or more energy measurement systems 2545. Energy sources 2505 can include an AC/DC adapter coupled to an external power source, one or more batteries, one or more charge storage devices, a USB charger, or other energy source. Energy measurement systems include at least one voltage or amperage measuring device that can measure energy consumed by the computing system 2500 during a predetermined period of time. Additionally, one or more energy measurement systems can be included that measure, e.g., energy consumed by a display device, cooling subsystem, Wi-Fi subsystem, or other frequently used or high-energy consumption subsystem.

Although the embodiments have been described in language specific to structural features and/or methodological acts, it is to be understood that the appended claims are not necessarily limited to the specific features or acts described. The specific features and acts disclosed are instead to be understood as embodiments of the claims useful for illustration.

What is claimed is:

1. An electronic device comprising:
a communications radio;
memory to store instructions; and
one or more processors to execute the instructions, wherein the instructions cause the one or more processors to:
receive, from an owner electronic device, a request for location information for a target accessory device associated with the owner electronic device, wherein the request includes a data packet with at least one public key associated with the target accessory device;
receive a beacon signal from a wireless device and determine at least one proximity value to the wireless device from the beacon signal;
perform a comparison between a key from the received beacon signal for the wireless device and the at least one public key; and
selectively send location information to the owner electronic device based on a result from the comparison, wherein the location information includes the at least one proximity value and information on a defined space within a location environment, wherein the defined space is associated with the electronic device, and wherein the location environment comprises a bounded area including the defined space.

2. The electronic device of claim 1, wherein executing the instructions further causes the one or more processors to:
determine that the received beacon signal does not contain the at least one public key; and
send information indicating that the electronic device is not in wireless communication range to the target accessory device.

3. The electronic device of claim 1, wherein executing the instructions further causes the one or more processors to:
receive, from the owner electronic device, an indication that the at least one proximity value for the electronic device is a highest value as compared to at least one other proximity value from a set of electronic devices.

4. The electronic device of claim 3 wherein executing the instructions further cause the one or more processors to:
establish a wireless radio connection with the target accessory device.

5. The electronic device of claim 3, further comprising:
a wireless controller including a ranging sensor, wherein executing the instructions further causes the one or more processors to:
determine a range and a direction to the target accessory device via the ranging sensor of the wireless controller during a bi-directional ranging operation;

42 determine a target position estimate for the target accessory device relative to the electronic device based on the range and direction to the target accessory device; and
send, to the owner electronic device, at least one of the target position estimate for the target accessory device, a defined space identifier for the electronic device, or an indicator for the direction to the target accessory device.

6. The electronic device of claim 3, wherein executing the instructions further causes the one or more processors to:
receive a request from the target accessory device including at least one of a request to play audio, a request to send a target position of the target accessory device to the owner electronic device, or a request to send location information for the electronic device to the owner electronic device.

7. The electronic device of claim 3, wherein executing the instructions further causes the one or more processors to:
send a request, to the target accessory device, to increase a beaconing rate.

8. The electronic device of claim 5, wherein the bi-directional ranging operation comprises a ranging operation performed via an ultra-wideband radio.

9. The electronic device of claim 5, wherein executing the instructions further cause the one or more processors to:
present a signal strength proximity view and a ranging view by presenting at least one indicator of the proximity value to the target accessory device from the electronic device and the indicator for the direction to the target accessory device along a trajectory in a user interface.

10. The electronic device of claim 1, wherein the electronic device is a voice activated virtual assistant.

11. The electronic device of claim 1, wherein the proximity value is a signal strength measurement value.

12. The electronic device of claim 1, wherein executing the instructions further causes the one or more processors to:
detect whether an occupant is proximate to the defined space for the electronic device and adjust playback of content requested by the owner electronic device.

13. A method comprising:
sending, from a wireless device, a beacon signal comprising at least one public key; and
performing, by the wireless device, a bi-directional ranging operation with a smart home device to produce location information associated with the wireless device, wherein the smart home device is selected to communicate with the wireless device by an owner electronic device associated with the wireless device.

14. The method of claim 13, the method further comprising:
sending, the smart home device, audio content for playback.

15. The method of claim 13, the method further comprising:
ceasing bi-directional ranging operation with the smart home device; and
performing a bi-directional ranging operation with the owner electronic device.

16. A method comprising:
sending, by an owner electronic device, a request, to one or more smart home devices, for location information of a target accessory device associated with the owner electronic device, wherein the request includes a data packet with at least one public key associated with the target accessory device;

receiving, by the owner electronic device, one or more proximity values from the one or more smart home devices; and presenting, by the owner electronic device via a user interface, location information for at least one smart home device of the one or more smart home devices, the at least one smart home device selected based on a comparison between the proximity values to the target accessory device.

17. The method of claim 16, further comprising:

selectively presenting within the user interface at least one of a ranging view, a signal strength proximity view, or a ranging and signal strength proximity view, wherein presenting the ranging view comprises:

determining a range and a direction to a target accessory device via a ranging sensor of a wireless controller during a bi-directional ranging operation;

determining a target position estimate for the target accessory device relative to the owner electronic device based on the range and direction to the target accessory device; and presenting the ranging view comprises displaying at least one of the target position estimate for the target accessory device and an indicator for the direction to the target accessory device.

18. An electronic device comprising:

a communications radio;

a speaker;

memory to store instructions; and one or more processors to execute the instructions, wherein the instructions cause the one or more processors to:

receive a request for location information for a target accessory device associated with an owner electronic device, wherein the request includes a data packet with at least one public key;

receive a beacon signal from a wireless device and determine at least one signal strength value from the beacon signal;

determine that the received beacon signal for the wireless device contains the at least one public key;

estimate at least one proximity value to the target accessory device based on the at least one signal strength value;

send the at least one proximity value to the owner electronic device;

receive a request, from the owner electronic device, to play content for the target accessory device, wherein the owner device selects the electronic device to play content based on the proximity value; and adjust playback of the content based on an occupancy value for a defined space, the electronic device designated as located proximate to the defined space.

19. The electronic device of claim 18, wherein adjusting the playback comprises:

reducing volume of content based on the occupancy value.

20. The electronic device of claim 18, wherein adjusting the playback comprises:

receiving a wireless communication from the owner electronic device and detect an increase in the occupancy value for the defined space; and increasing volume for the playback of the content.

21. The electronic device of claim 18, wherein adjusting the playback comprises:

detect an increase in the occupancy value for the defined space based on at least one of received audio or sensor data; and decrease volume for the playback of the content.

22. The electronic device of claim 18, wherein the instructions cause the one or more processors to further:

receive an indication from another smart home device that the owner electronic device is proximate to the defined space for the electronic device; and increasing volume for the playback of the content.

* * * * *